US011156627B2

(12) United States Patent
Ahlfors

(10) Patent No.: US 11,156,627 B2
(45) Date of Patent: Oct. 26, 2021

(54) AUTOMATED CELL PROCESSING SYSTEMS AND METHODS

(71) Applicant: Genesis Technologies Limited, St. Michael (BB)

(72) Inventor: Jan-Eric Ahlfors, Laval (CA)

(73) Assignee: GENESIS TECHNOLOGIES LIMITED, Saint Michael (BB)

( * ) Notice: Subject to any disclaimer, the term of this patent is extended or adjusted under 35 U.S.C. 154(b) by 0 days.

(21) Appl. No.: 16/311,345

(22) PCT Filed: Jun. 20, 2017

(86) PCT No.: PCT/IB2017/053674
§ 371 (c)(1),
(2) Date: Dec. 19, 2018

(87) PCT Pub. No.: WO2017/221155
PCT Pub. Date: Dec. 28, 2017

(65) Prior Publication Data
US 2020/0025782 A1    Jan. 23, 2020

Related U.S. Application Data

(60) Provisional application No. 62/352,468, filed on Jun. 20, 2016.

(51) Int. Cl.
*G01N 35/10* (2006.01)
*B01L 1/02* (2006.01)
(Continued)

(52) U.S. Cl.
CPC ............ *G01N 35/1002* (2013.01); *B01L 1/02* (2013.01); *B01L 1/04* (2013.01); *G01N 35/0099* (2013.01);
(Continued)

(58) Field of Classification Search
None
See application file for complete search history.

(56) References Cited

U.S. PATENT DOCUMENTS

| 8,784,735 B2 | 7/2014 | Winther et al. | |
| 2004/0215362 A1* | 10/2004 | Kokubo | A61L 2/04 700/130 |

(Continued)

FOREIGN PATENT DOCUMENTS

| WO | WO 2010/130302 A1 | 11/2010 |
| WO | 2011/050476 | 5/2011 |

OTHER PUBLICATIONS

International Search Report in International Application No. PCT/IB2017/053674, dated Nov. 17, 2017.
(Continued)

*Primary Examiner* — Kathryn Wright
(74) *Attorney, Agent, or Firm* — Knobbe, Martens, Olson & Bear, LLP

(57) ABSTRACT

Systems and methods for automated cell processing of biological samples, such as cells for use in cell therapy and regenerative medicine. Systems for automated processing of batches derived from biological samples comprise: a closed and sterile enclosure; a plurality of reagent containers; at least one reagent dispenser; a quality control module for analyzing at least one characteristic of a batch; a harvesting module; a robotic module; and a control unit (CU) communicatively coupled to the at least one reagent dispenser, the quality control module, the harvesting module and the robotic module for controlling the automatic processing of batches. The automatic processing may be executable without handling by a human operator. The system may be configured to automatically process the plurality of batches without cross-contamination between batches, e.g., under GMP conditions.

20 Claims, 31 Drawing Sheets

(51) Int. Cl.
  *B01L 1/04* (2006.01)
  *G01N 35/00* (2006.01)
(52) U.S. Cl.
  CPC ....... *B01L 2300/06* (2013.01); *B01L 2300/14* (2013.01); *G01N 2035/00277* (2013.01); *G01N 2035/00306* (2013.01); *G01N 2035/1051* (2013.01)

(56) References Cited

U.S. PATENT DOCUMENTS

| | | |
|---|---|---|
| 2006/0151185 A1 | 7/2006 | Tagaki et al. |
| 2006/0275888 A1* | 12/2006 | Hibino ................. C12M 23/50 435/286.2 |
| 2009/0042281 A1* | 2/2009 | Chang ................. C12M 41/48 435/287.2 |
| 2009/0298129 A1* | 12/2009 | Spence ................. B01L 3/5085 435/91.2 |
| 2011/0206643 A1 | 8/2011 | Fulga et al. |
| 2012/0220034 A1 | 8/2012 | Ahlfors et al. |
| 2012/0288936 A1 | 11/2012 | Ahlfors et al. |
| 2013/0130361 A1* | 5/2013 | Okano ................. C12M 23/44 435/286.1 |
| 2014/0038291 A1 | 2/2014 | Ahlfors et al. |
| 2014/0106386 A1 | 4/2014 | Umeno et al. |
| 2016/0160184 A1 | 6/2016 | Ahlfors et al. |

OTHER PUBLICATIONS

Written Opinion in International Application No. PCT/IB2017/053674, dated Nov. 17, 2017.
International Preliminary Report on Patentability in International Application No. PCT/IB2017/053674, dated Nov. 7, 2018.

* cited by examiner

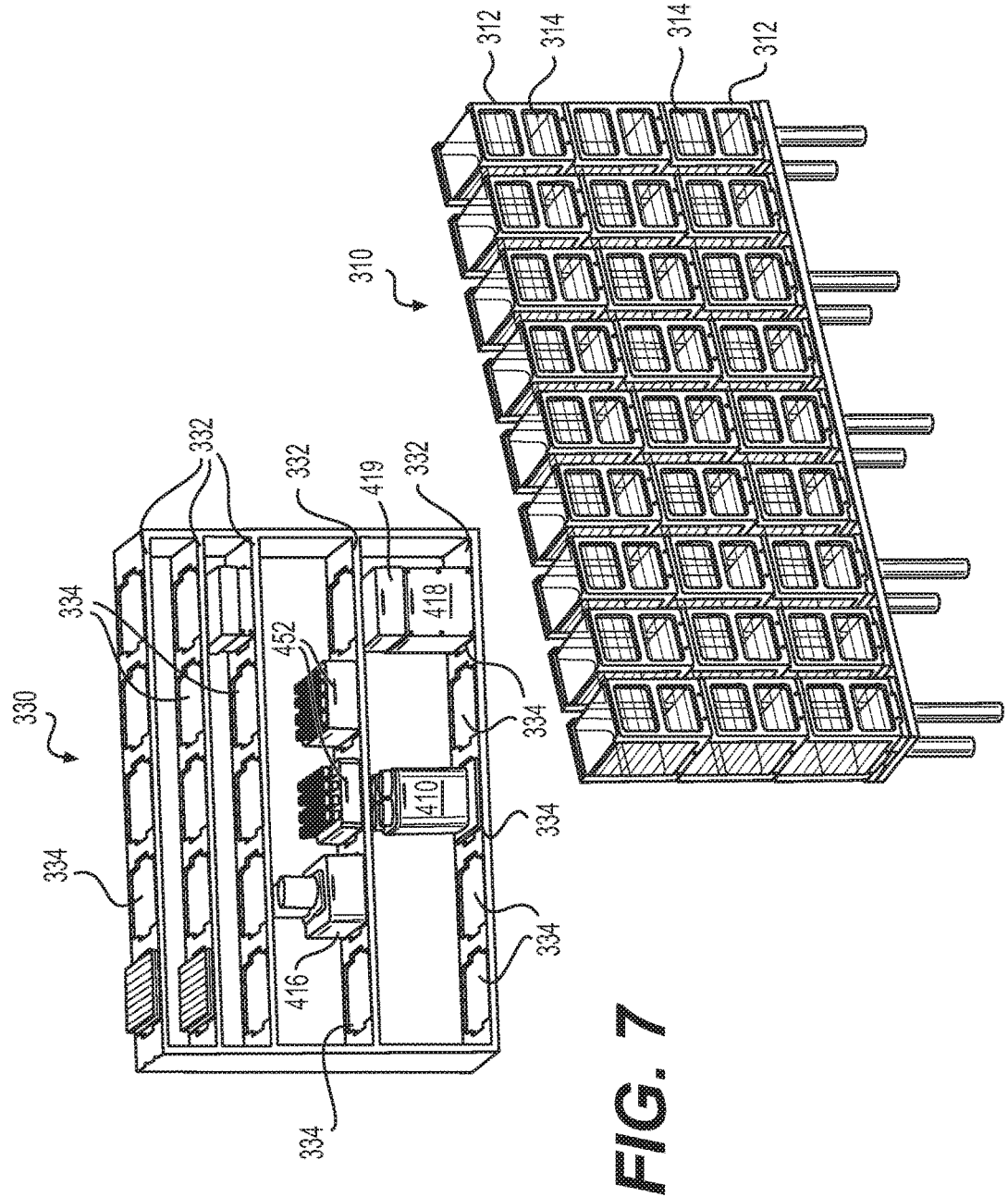

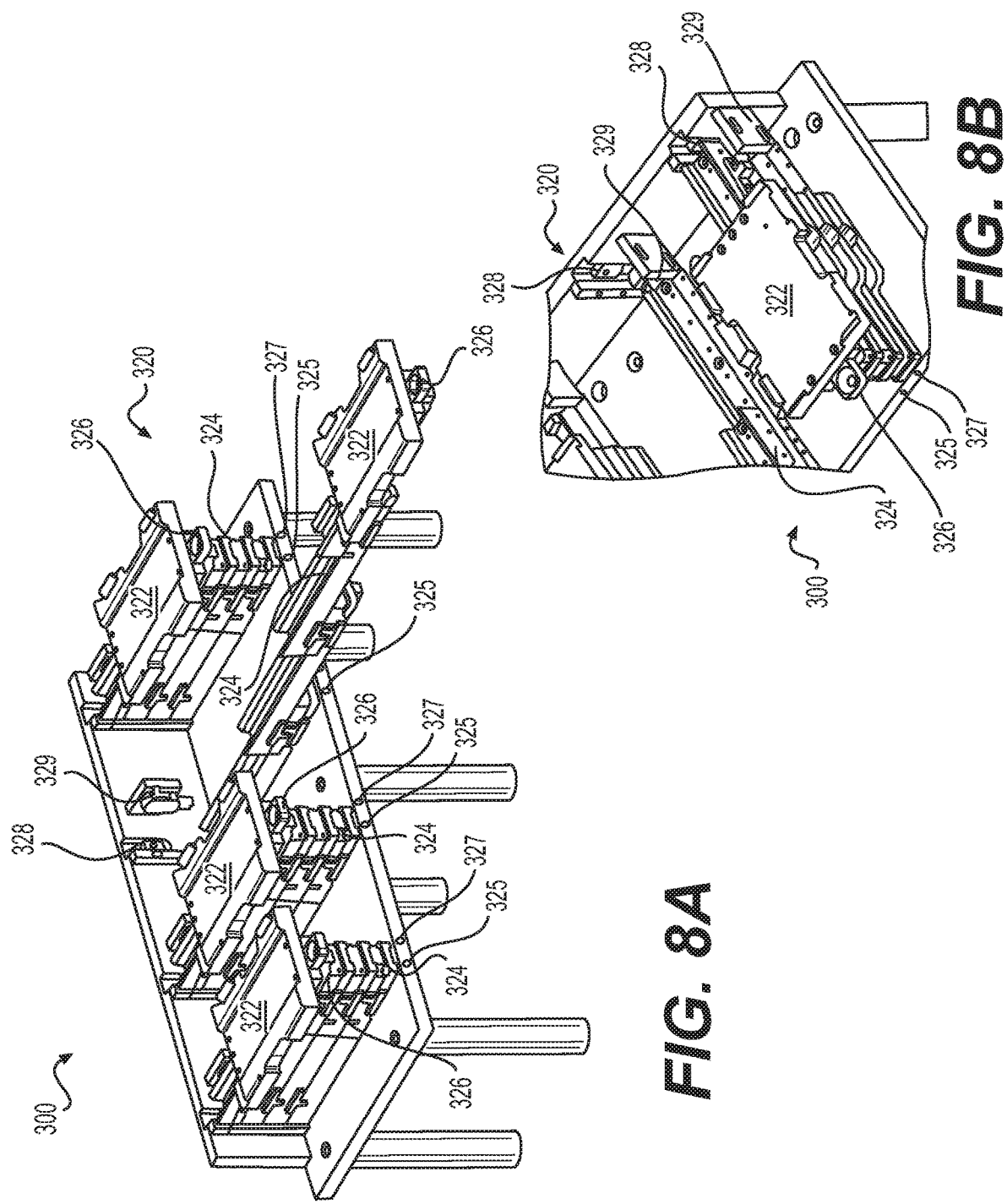

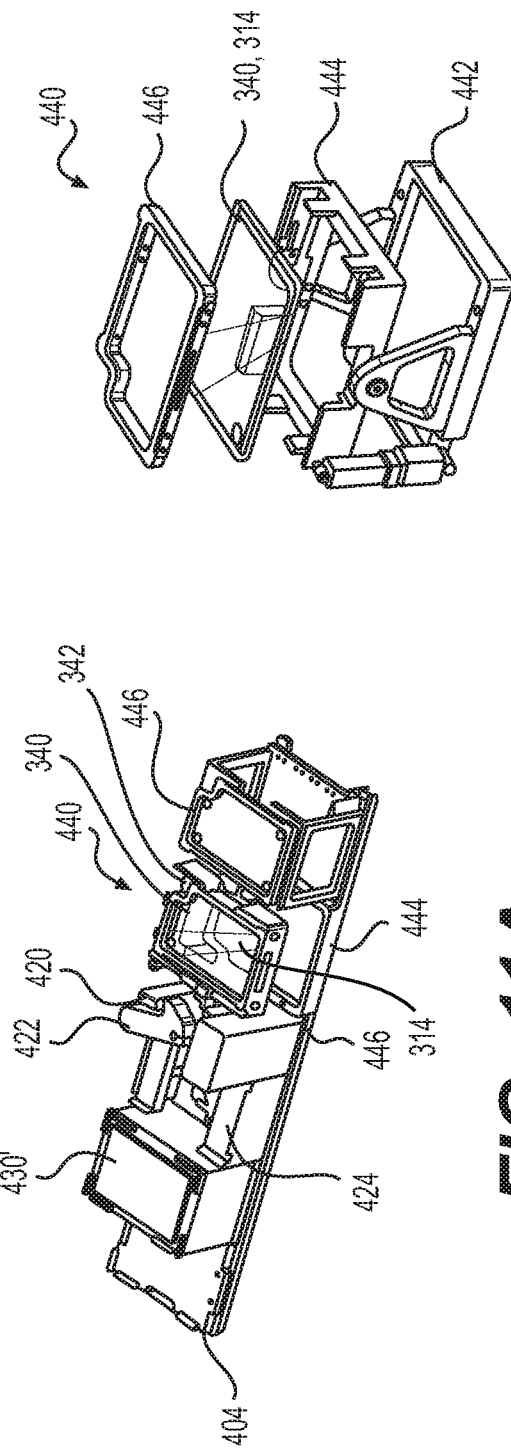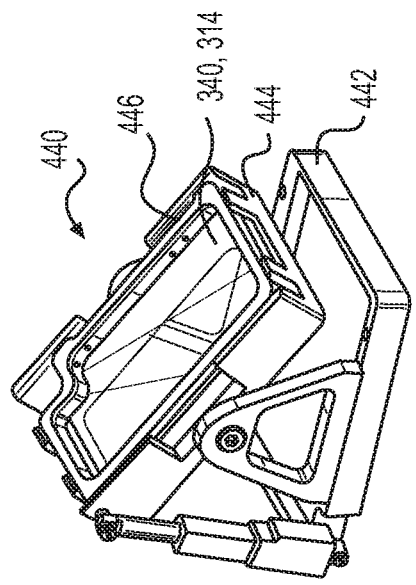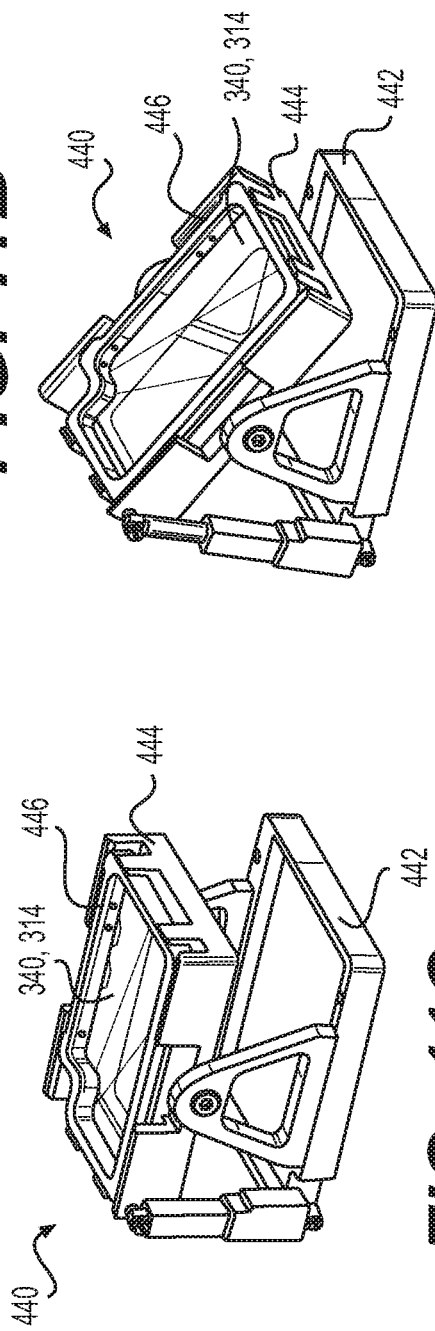
FIG. 11A
FIG. 11B
FIG. 11C
FIG. 11D

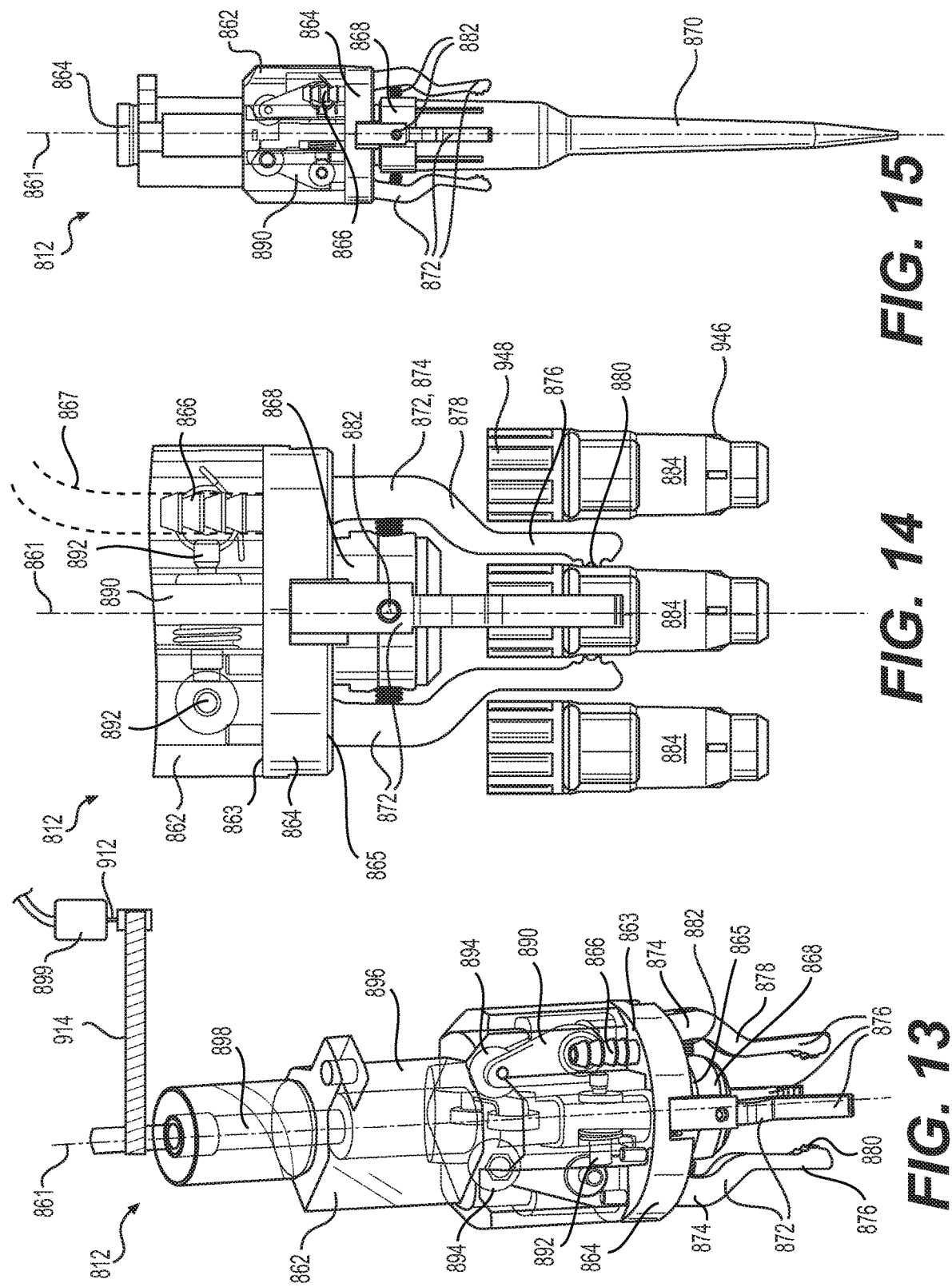

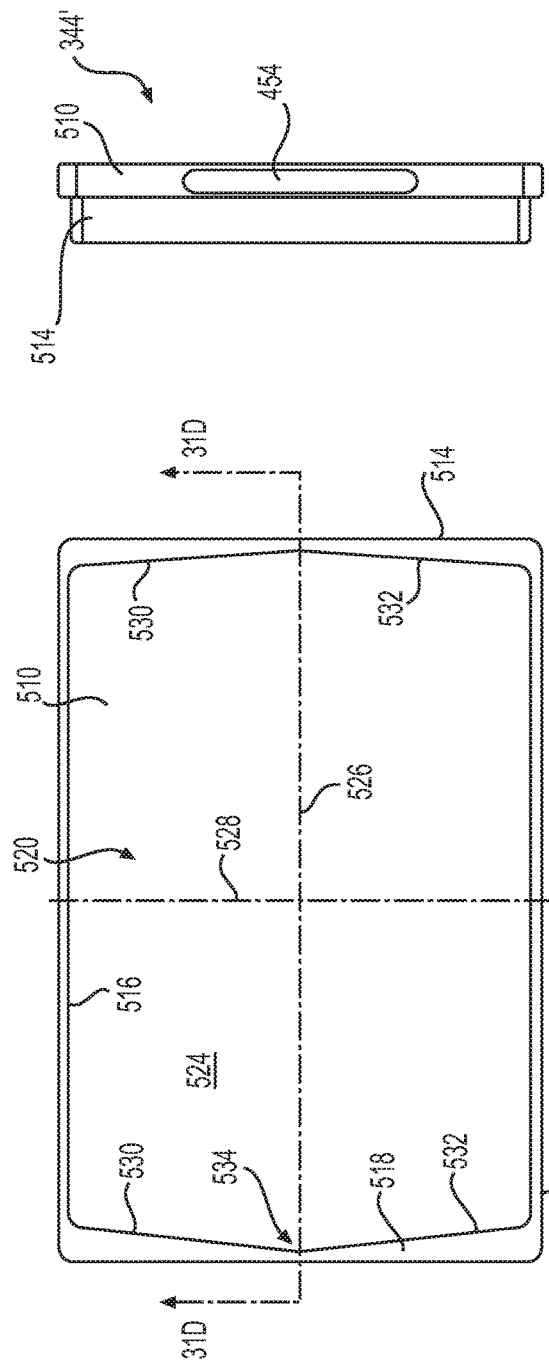

AUTOMATED CELL PROCESSING SYSTEMS AND METHODS

CROSS-REFERENCE TO RELATED APPLICATIONS

This application is a U.S. National Phase of International Application No.: PCT/M2017/053674, filed Jun. 20, 2017, designating the U.S. and published in English on Dec. 28, 2017 as WO 2017/221155 A1, which claims the benefit of U.S. Provisional Patent Application No. 63/352,468 filed on Jun. 20, 2016, the entirety of which is incorporated herein by reference.

FIELD OF THE INVENTION

The present disclosure relates to the field of cell processing employing automated systems and, more particularly, relates to apparatus and method for processing cells for use in cell therapy and regenerative medicine, as well as other biological samples.

BACKGROUND

Stem cell therapies hold much promise for regenerative medicine. Stem cells have the potential to develop into many different cell types in the body and can theoretically divide without limit to replenish cells in need of repair. There are different types of stem cells with varying ranges of commitment options. Embryonic stem cells hold great potential for regenerative medicine, however, they have many disadvantages including the possibility of transplant rejection and possible teratoma formation if the cells are not properly differentiated prior to transplantation. Adult stem cells such as neural stem cells (NSC) and oligodendrocyte precursor cells (OPC) have a more restricted developmental potential than embryonic stem cells and generally differentiate along their lineage of origin. While adult neural stem cells also represent a promising treatment option for neurodegenerative disorders, there are numerous disadvantages, including difficulty of isolation, limited expansion capability, and immune rejection of transplanted donor cells. The same or similar limitations apply for most other cells and stem cells.

For a stem cell to graft permanently and efficiently (in a functional manner) into a patient's tissue, the stem cell is ideally autologous (i.e., the patient's own). There is a desire therefore in the medical, scientific, and diagnostic fields to reprogram an easily obtainable cell (such as a somatic cell) from a patient into a stem-like cell, preferably without fusing or exchanging material with an oocyte or another stem cell, for use in stem cell therapy. Methods for generating safe and efficacious autologous stem cells for a specific tissue, organ or condition to be treated, as well as new stem cells with new or unique features such as enhanced potency and/or safety, have been reported. For example, Ahlfors et al. describe methods of reprogramming easily obtainable cells to highly desirable multipotent or unipotent cells, including stem-like cells and progenitor-like cells as well as cell lines and tissues, by a process of in vitro dedifferentiation and in vitro reprogramming (International PCT Application Publication No. WO2011/050476, U.S. Patent Application Publication Nos. US20120220034, US20120288936, and US20140038291). Such cells can potentially be transplanted back into a patient to regenerate damaged or lost tissue in a wide range of disorders and conditions such as Parkinson's disease, multiple sclerosis, heart disease, spinal cord injury, cancer, and so on.

However, the use of such cells in human therapy is severely restricted by the limitations of current production methods which are long, labor-intensive, inefficient, and expensive. Realizing the full potential of cell therapies, especially autologous stem cell therapies, will require addressing the challenges inherent in obtaining appropriate cells for millions of individuals while meeting the regulatory requirements of delivering therapy and keeping costs affordable. It is estimated that, using current production methods for iPS cells (induced pluripotent stem cells) or reprogrammed cells, two people working in a single clean room can only process about 20 samples per year, assuming that no samples are lost due to bacterial or cross contamination or human error, and the costs of production are prohibitive. In addition to this, several quality control personnel are needed to determine the identity, purity, potency, etc. of the cells as well as ensuring the cell product is not contaminated. Many of these same challenges and requirements apply for producing or maintaining various cell lines, e.g., for research purposes, as well as for producing biological products or biomaterials where cells or tissues are involved.

Generally, with current production methods, only one cell-line can be processed at a time to ensure no risk of cross-contamination, and equipment must be sterilized between each sample. It may take weeks or months to process one cell line. In order to meet Good Manufacturing Practices (GMP) guidelines e.g., for human somatic cell therapy, all steps must be performed in a clean room meeting CLIA or other requirements and in the presence of at least two persons. Multiple complex and precisely-timed steps must be performed, along with safety testing and analytical testing for quality control throughout, all of which must be documented in detail. Cells must also meet stringent safety and potency standards for approval for human therapeutic use. Clearly there is a need for improved methods of generating specific cells suitable for particular human therapeutic applications especially from autologous human cells and other types of cells, in particular to increase the speed and efficiency of cell processing and quality control analysis while reducing the risk of cross-contamination between cell lines and the risk of human error, in order to meet regulatory guidelines and at affordable cost.

U.S. Pat. No. 8,784,735 describes an apparatus for automated processing of biological samples. There is described an apparatus for automated processing of at least one biological sample accommodated on a carrier member, such as a slide, by applying a predetermined amount of reagents in a predetermined sequence according to a processing protocol, said apparatus comprising: a housing frame; at least one processing section for accommodating at least one slide, the at least one processing section being provided within the housing; a hood cover protecting the at least one processing section in said housing, wherein the hood cover completely encloses the processing section defining an interior space; and wherein the apparatus further comprises a climate control device provided to control the environment within the interior space. While the disclosed apparatus and methods are suitable for processing fixed biological samples, they cannot be used to process live biological samples such as dividing cells and cell lines.

Commercially available cell culture processing systems such as Cellmate™ (Sartorius Stedim, Wilmington, Del., U.S.A.) provide full automation of processes needed to culture cells in roller bottles and T-flasks. Such systems offer large volume, single cell-line production including automated cell seeding, enzymatic and mechanical harvesting, cell sheet rinsing, media changing, and transient transfection. The Cellmate™ system was developed for a GMP environment. However, such systems can only be used in a clean room and can only process one cell-line at a time, as they do not control for cross-contamination between cell lines. They are not fully automated, still requiring human handling for certain steps or functions (such as capping and uncapping tubes) and other analytical assays. Although the Cellmate™ system can measure cell count, cell viability, and cell confluency, it cannot perform other quality control tests needed to meet GMP regulations (such as tests for identity, potency, purity, sterility, etc.).

CompacT SelecT™ (Sartorius Stedim, Wilmington, Del., U.S.A.) provides an automated cell culture system for maintaining and expanding multiple cells lines, including plating cells ready for assaying, harvesting cells, performing transfections, and determining cell number and viability. The system includes a flask incubator, an aseptic processing environment, and various plating modules, along with barcoded tracking. However, the system can only be used in a clean room and can only process one cell-line at a time, as it does not control for cross-contamination between cell lines. The system is suitable only for expanding cells, not for processing of cells (such as reprogramming) and cannot perform quality control tests needed to meet GMP regulations. The system is not fully automated, still requiring human handling for certain steps or functions. For example, in order to reload supplies into the system, it must be manually opened and re-stocked.

Fulga et al. (U.S. Patent Application Publication No. 2011/0206643) describes an automated cell processing system for receiving a tissue containing a multiplicity of cells belonging to multiple cell types, and automatically increasing both the proportion and the absolute number of cells of at least one of the multiple cell types as compared with at least another of the multiple cell types. A self-scraping cell culture assembly comprising a generally annular dish defining a generally flat, circularly-shaped cell growth surface; a cover arranged for sealing engagement with the annular dish; and at least one scraper blade mechanically associated with the cover, whereby rotation of the cover relative to the dish provides scraping of cells from the circularly-shaped cell growth surface. The system also includes an automated packaging functionality. However, the system is not fully automated and has many of the limitations of other systems described above.

SUMMARY

It is an object of the present invention to ameliorate at least some of the inconveniences present in the prior art.

There are provided herein systems and methods for automated processing of biological samples that are executable without handling by a human operator and/or are capable of processing a plurality of batches at the same time without cross-contamination between batches, optionally under conditions that meet GMP guidelines and regulations.

In some implementations, systems are designed to maintain sterility to such an extent that they need not be operated in a clean room. For example, the system can be restocked with consumables such as reagents, media, plasticware and the like without disturbing the sterility of the system or exposing the system to the outside environment. In some implementations, systems can perform Quality Control (QC) tests such as verifying cell identity, cell purity, cell potency, and/or batch sterility (i.e., no contamination), during or after processing. In some implementations, end-to-end processing is provided, i.e., a biological sample is introduced into the system and the desired end product is presented by the system after processing, without requiring handling by a human operator. In some implementations, monitoring, tracking and recording systems keep detailed records of every step of the process, including QC testing. Such records can be used for quality assurance purposes and to verify that all applicable regulations have been met. In some implementations, quality assurance (QA) of the end product and/or end product release is performed without requiring a human operator. In some implementations, the product is stored and/or packaged for transport after completion of QC and QA without requiring a human operator.

In some implementations, therefore, systems and methods described herein may provide one or more of the following advantages: allowing processing of multiple biological samples or batches in sequence or at the same time without cross-contamination between samples/batches and/or under GMP conditions (conditions that meet Good Manufacturing Practices (GMP) guidelines or regulations); allowing fast, efficient, and/or affordable processing; being executable without human intervention during the processing (except to restock consumables, which can be done without interrupting processing or disrupting sterility/the aseptic environment); providing fully automated end-to-end processing, that may also include storage and/or packaging of the final end product; obviating the need for personnel operating in a clean room e.g., meeting CLIA requirements; having integrated analytical and quality control (QC) capabilities, including all QC testing required for GMP guidelines and regulations; providing detailed reports of the processing for quality assurance purposes; and verifying automatically that the end product meets applicable regulations and is suitable for its intended purpose, such as human therapy. In some implementations, systems and methods described herein provide increased efficiency and quality of processing over previous systems.

Systems and methods may be used for a wide variety of processing on many different types of biological samples. For example, systems and methods may be used to reprogram or transform cells of a first type (such as somatic cells, stem cells, progenitor cells) to cells of a desired second type (such as multipotent, unipotent, or pluripotent cells) for use e.g. in human therapy. Systems and methods may be used for direct reprogramming of cells; for production of multipotent, unipotent, or pluripotent cells; for production of stem-like or progenitor-like cells; for production of induced pluripotent stem cells (iPSCs); for production of embryonic stem cells; and for production of other cells useful for therapeutic, diagnostic, or research purposes. Methods of in vitro dedifferentiation and in vitro reprogramming are detailed in, for example, International PCT Application Publication No. WO2011/050476, U.S. Provisional Application No. 61/256,967, U.S. patent application Ser. No. 14/958,791, and U.S. Patent Application Publication Nos. US20120220034, US20120288936, and US20140038291, all of which are hereby incorporated by reference in their entirety. Systems and methods may also be used for growth or expansion of cells; for transfection of cells, including stable transfection; for gene editing, including gene insertion, gene deletion, and gene correction; for treatment of cells, e.g., with compounds, antibodies, or other active agents; for inducing differentiation of cells; and combinations thereof. Cells may be manipulated or treated before, during, or after expansion depending on the starting number of cells and the desired end product. Systems and methods may also be used for generation of biomaterials (e.g., tissues, matrices, etc.), generation of biologics (e.g., proteins, antibodies, vaccines, growth factors, etc.), processing of tissues into single cells and/or extraction of extracellular matrix components, for growth of tissues, and for growth or expansion of cells and cell lines, as well as for screening or discovery research. For example, systems and methods may be used to express and purify therapeutic proteins, antibodies, growth factors, and the like; produce a tissue matrix from a blood sample; isolate and expand a desired cell type from a population of cells; purify extracellular matrix components; expand a cell line; differentiate cells; reprogram or transform cells; transfect cells to introduce vectors, plasmids, RNAs, therapeutic molecules, and the like; repair genetic mutations in cells; and so on. It is contemplated that other applications for processing a product or determining an end product are possible and neither the type of processing nor the type of biological sample being processed is meant to be particularly limited. As used herein, the term "processing" is meant to encompass broadly any such modification, extraction, purification, maintenance, production, expression, growth, culturing, transformation, expansion or treatment of biological samples, particularly live biological samples such as dividing cells and cell lines and tissues containing dividing cells and cell lines. In certain implementations, a "biological sample" does not include samples that have been treated with a fixative agent, e.g., for histological examination.

In a first broad aspect, there is provided a system for automated processing of batches, the batches being derived from biological samples, the system comprising: a closed and sterile (i.e., aseptic) enclosure; a plurality of reagent containers; at least one reagent dispenser; a quality control module for analyzing at least one characteristic of a batch; a harvesting module; a robotic module; and a control unit (CU) communicatively coupled to the at least one reagent dispenser, the quality control module, the harvesting module and the robotic module for controlling the automatic processing of the batches, the automatic processing being executable without handling by a human operator. The system may further comprise numerous components, modules, processing stations, etc., as described herein. In some implementations, the enclosure is at least a Class 10 or ISO 4 environment. In some implementations, the system is configured to automatically process a plurality of batches. In some implementations, the system is configured to automatically process the plurality of batches in compliance with good manufacturing practice (GMP) regulations or guidelines, i.e., under GMP conditions. In some implementations, at least one of the quality control module, the harvesting module, and the robotic module is housed inside the enclosure, automatic processing of cells being conducted inside the enclosure.

In a second broad aspect, there is provided a system for automated processing of a plurality of batches, the batches being derived from biological samples, the system comprising: a closed and sterile (i.e., aseptic) enclosure; a plurality of reagent containers; at least one reagent dispenser; a quality control module for analyzing at least one characteristic of a batch; a harvesting module; a robotic module; and a control unit (CU) communicatively coupled to the at least one reagent dispenser, the quality control module, the harvesting module and the robotic module for controlling the automatic processing of the batches, the system being configured to automatically process the plurality of batches without cross-contamination between batches. In some implementations, the system is configured to automatically process the plurality of batches at the same time using sequential processing. In some implementations, the system is configured to automatically process the plurality of batches in compliance with good manufacturing practice (GMP) regulations or guidelines, i.e., under GMP conditions. In some implementations, the automatic processing is executable without handling by a human operator. The system may further comprise numerous components, modules, processing stations, etc., as described herein. In some implementations, the enclosure is at least a Class 10 or ISO 4 environment. In some implementations, at least one of the quality control module, the harvesting module, and the robotic module is positioned inside the enclosure, automatic processing of cells being conducted inside the enclosure.

In some implementations, systems described herein further comprise an isolator, the enclosure being selectively fluidly connected to the isolator, and objects from outside the system being received into the enclosure via the isolator, objects from inside the enclosure being passed out of the system via the isolator. In some implementations, the system further comprises a biological safety cabinet (BSC), the isolator being selectively fluidly connected to the BSC, and objects from outside the system being received into the isolator via the BSC, objects from inside the enclosure being passed out of the system by passing from the enclosure to the isolator and from the isolator to the BSC via the isolator.

In some implementations, two or more systems are selectively fluidly connected to each other, e.g., via an incubator, a freezer, or other similar component disposed outside the enclosures and selectively fluidly connected to each enclosure or system.

In a third broad aspect, there is provided an automated method for processing a batch in a closed and sterile (i.e., aseptic) enclosure, the batch being derived from a biological sample inserted into the enclosure, the automated method comprising: automatically processing the batch with one or more reagents; automatically analyzing at least one characteristic of the batch; and after automatically processing the batch, automatically harvesting the batch for reception outside the enclosure; the automated method being executable without any handling by a human operator. In some implementations the batch comprises a plurality of batches, and the method comprises automatically processing each of the plurality of batches without cross-contamination between batches. In some implementations, the method is executed in compliance with good manufacturing practice (GMP) regulations and guidelines, i.e., under GMP conditions, and/or in a class 10 environment.

In a fourth broad aspect, there is provided an automated method for processing a batch in a closed and sterile (i.e., aseptic) enclosure, the batch being derived from a biological sample inserted into the enclosure, the automated method comprising: automatically processing the batch with one or more reagents; automatically analyzing at least one characteristic of the batch; and after automatically processing the batch, automatically harvesting the batch for reception outside the enclosure; wherein the automated method is capable of processing a plurality of batches without cross-contamination between batches. In some implementations, the plurality of batches are processed at the same time using sequential processing. In some implementations, the plurality of batches are processed in compliance with good manufacturing practice (GMP) guidelines, e.g., under GMP conditions. In some implementations, the automated method is executable without any handling by a human operator.

In some implementations, methods provided herein further comprise quality control (QC) testing during and/or after processing, such as tests for identity, potency, purity, and sterility. In some implementations, methods provided herein further comprise analytical and/or diagnostic testing, such as determination of cell number, viability, and confluency, presence or absence of specific cell markers, growth or differentiation profile, activity, detection of gene mutations, and the like. In some implementations, methods provided herein further comprise monitoring, tracking and/or recording details of every step of the process, including QC testing, for quality assurance purposes and to verify that all applicable regulations have been met.

In some implementations, systems and methods provided herein include functionalities which expand cells and which conduct quality control (QC) testing before, during and/or after cell expansion, such as tests for identity, potency, purity, and sterility, in accordance with GMP requirements. It should be understood that many QC assays may be conducted by the system, including without limitation cell-based assays, fluorescent-, colorimetric- or luminescent-based assays, cell morphology and cell time-dependent behavior (such as differentiation) assays, flow cytometry based assays, PCR based assays, endotoxin, *mycoplasma* and sterility assays, cell viability, cell number, cell confluency, and the like.

In some implementations, systems and methods provided herein include functionalities which expand cells and purify cells after expansion. In some implementations, systems and methods provided herein include functionalities which expand multiple cell lines at the same time without cross-contamination between cell lines. For example, functionalities may be included which ensure that no more than one sample is open at the same time in the enclosure. Similarly, reagent and supply containers are not opened when a sample container is open. Other included functionalities include those which reduce particle generation; allow sterilization of the system between cell processing steps; and functionalities for capping, uncapping, and recapping containers, which ensure that containers are not kept open longer than necessary and that containers are not open when or if a sample container is open; and the like. Particle monitoring can be used to pause processing steps until particle counts have gone below a pre-set threshold that ensures no cross-contamination between samples, and/or no cross-contamination from samples to stock reagents. Such functionalities facilitate processing of multiple batches at the same time without cross-contamination between batches.

In some implementations, systems and methods provided herein include functionalities that isolate cells from a starting tissue sample in preparation for further expansion or other processing.

In some implementations, systems and methods provided herein include functionalities that freeze or thaw cells.

In some implementations, systems and methods provided herein include functionalities that package cells, e.g., for transport or storage.

In some implementations, systems and methods provided herein include functionalities that provide cells in vials or cassettes for transport or storage.

In some implementations, systems and methods provided herein include one or more, two or more, three or more, or all of the following functionalities: 1) isolation of cells from starting tissue or from a mixture of various cell types; 2) identification and tracking of cell samples, e.g., using barcodes, positional information, and the like; 3) cell processing, e.g., expansion, purification (including enrichment or depletion, e.g. via magnetic antibodies), activation, reprogramming, gene editing (gene insertion, deletion, correction), transfection, and other desired manipulations of cells. Functionalities for analytical, e.g., marker expression level analysis (e.g., via fluorescent antibody staining and analysis), cell behaviour analysis including determination of differentiation profile, diagnostic testing to identify e.g. gene mutations, and QC testing including tests for identity, purity and sterility (optionally including endotoxin and mycoplasma testing), as well as for determination of cell number, confluency and viability, may also be included and can be conducted at any time before, during or after cell processing; 4) storage and transport, e.g., freezing cells in vials if desired or placing live cultures in a transport container (such as a Petaka™ cassette), packaging cells for transport, and the like; and 5) additional cell analytical capabilities as desired, such as purification of desired cell types, selection of a desired potency, removal of dead cells, magnetic cell sorting, and the like.

In some implementations, systems and methods provided herein include functionalities which provide a complete record of cell processing from start to finish for Quality Assurance (QA) verification, in accordance with GMP requirements. The system can verify that all steps were performed properly and check all assay results (e.g., pass/fail results). Further, systems and methods may include functionalities for tracking batches, e.g., using barcodes and positional memory, in accordance with GMP guidelines. Further, QA analysis may include testing for sterility, contaminants (such as endotoxin and mycoplasma), and other tests as may be desired in accordance with GMP guidelines and other applicable regulations.

In some implementations, systems and methods provided herein include one or more, two or more, three or more, or all the following functionalities: 1) cell processing; 2) quality control; 3) quality assurance; 4) harvesting of cells and preparation for storage or transport and 5) analytical testing of cells (such as, without limitation, diagnostic testing). In some implementations, systems and methods provided here may further include functionalities for sample preparation, e.g., for isolating cells for processing from a starting biological sample.

In some implementations, systems and methods provided herein include a functionality which handles reagents under GMP conditions. Reagents are automatically imported into the enclosure, verified (e.g., using a barcode reader), opened, dispensed into aliquots, and stored by the system. Such reagents can be automatically introduced into the enclosure in the manufacturer's packaging, obviating the need for a human to open a reagent container. In some implementations, a functionality which robotically transports materials into and out of the enclosure is included. In some implementations, a functional testing of a reagent is performed to ensure it meets specifications, optionally together with sterility, endotoxin and/or mycoplasma testing.

In some implementations, systems and methods provided herein include a control unit which performs fully automated processing without human intervention. The control unit not only executes processing steps but decides which steps to follow in order to produce a desired end product. For example, the control unit can determine which steps to perform depending on assay data obtained at various steps during the processing.

In some implementations, systems provided herein comprise a plurality of systems connected together. For example, a first system may be connected to a second system through a freezer or an incubator which is placed between the two systems and connected separately to each one. Alternatively, two enclosures may be connected to each other. It should be understood that a plurality of systems can be connected together in this way, either directly (enclosure-to-enclosure)

or through a shared component such as a freezer, a refrigerator, an incubator, etc. The number of systems that can be connected in this way is not particularly limited.

In some implementations, systems provided herein comprise one or more, two or more, three or more, four or more, five or more, more than five, or all of the following automated components, or a combination thereof: (1) a robotic aspirator with disposable tips with the capability of changing the tip after each use or between samples, such that cross-contamination between samples is reduced or eliminated without requiring sterilization of the robotic aspirator component; (2) one or more decapper modules, for opening and closing a screwcap lid of containers, including large (>10 ml containers); (3) a centrifuge, cell sorter or magnet, e.g., for purifying cell mixtures (which can optionally also be achieved by e.g. magnetic cell separation) or obtaining a cell pellet or for collection or removal of cells; (4) an incubator for incubating cells; (5) a confluency reader or cell counter for determining cell number and/or cell confluency in a sample or in a cell-containing vessel; (6) a direct liquid to plate fill station or continuous flow robotic reagent dispenser for dispensing a volume of liquid directly into a cell-containing vessel (e.g., volumes>5 ml); and (7) a tilt module for aspiration or collection of cells or of cell culture media, optionally as a magnetic separation tilt module.

In some implementations, systems provided herein comprise a sealed enclosure configured to minimize particle generation, e.g.: including a centrifuge placed below deck and sealed from the enclosure during use; including a vertical waste chute in which solid waste is dropped, sized so that waste does not hit the edges of the chute during disposal, and placed under strong enough negative pressure so no entry of particles from the chute into the enclosure occurs; including closable vents for sealing the enclosure to allow sterilization of the enclosure; including a functionality which provides rapid clean air for rapidly exchanging all the air in the system with clean air of the system; and other such functionalities and components as are described herein.

In some implementations, systems provided herein comprise a magnetic separation tilt module, e.g., for magnetic separation or transfection of cells. In some implementations, systems provided herein comprise an on-deck temperature-controlled freezer, such as a Grant freezer, for freezing of samples or to allow manipulation of samples and reagents at subzero temperatures.

In some implementations, systems provided herein comprise a tilt module configured to hold cell culture transport trays (such as Petaka™ trays) for loading or removing samples from transport trays.

In some implementations, systems provided herein comprise autoclavable bottle or tube holders that hold bottles or tubes to allow automated decapping and capping as well as automated transport of the bottle(s) or tube(s) within the system.

In some implementations, systems provided herein comprise a direct fill to cell processing container media fill station with dripping and overflow control.

In some implementations, systems provided herein comprise a robotic aspirator with changeable, sterile, disposable tips, with the capability of the system changing the tip by itself (without human intervention) after each use or between samples, such that cross-contamination between samples is eliminated or reduced without requiring sterilization of the vacuum aspirator component. In some implementations, the robotic aspirator further comprises an integrated tube and tip gripper. The robotic aspirator is designed to prevent any backflow or dripping by maintaining continuous negative pressure through the tip orifice (until disposal), and the tip being replaced between each use or batch. The fluid flow channels of the robotic aspirator through which aspirated fluid flows away from the tip can be further sterilized at, for example, the bleach station at regular intervals.

In some implementations, systems provided herein comprise autoclavable tip holders with system-closable lids, i.e., lids that can be opened and closed using robotic systems.

In some implementations, systems provided herein comprise a robotic module for robotic transport of materials into and out of the enclosure.

In some implementations, systems provided herein comprise a module for collecting biologicals and other macromolecules secreted or produced by cells, which can be optionally further purified and/or tested for identity, potency (e.g., activity assays) and/or sterility, and optionally vialed and/or freeze-dried and/or packaged.

In some implementations, systems and methods provided herein are fully automated, the above functionalities being carried out without human or hands-on intervention.

In some implementations, the fully automated systems and methods provided herein are conducted in a fully-enclosed processing environment that is aseptic and able to meet regulatory requirements for a "clean room", e.g., GMP requirements, CLIA requirements, and the like. Further, a plurality of batches can be processed at the same time under these conditions without cross-contamination between batches. In another broad aspect, there are provided methods for processing biological samples using the automated systems and methods described herein.

In another broad aspect, there are provided batches and biological samples prepared using the automated systems and methods described herein. A wide variety of biological materials may be prepared using the systems and methods described herein, including without limitation cells, tissue matrices, proteins, antibodies, vaccines, therapeutics, extracellular matrix components, and the like. In some implementations, cells are stem cells, stem-like cells, unipotent cells, multipotent cells, pluripotent cells, somatic cells, cell lines, immortalized cells, yeast or bacterial cells. Such cells may be prepared for example through reprogramming, transformation, or differentiation from another cell type. In particular implementations, the cells are autologous cells that are prepared from a starting biological sample from a patient for transplantation back into the same patient, e.g., autologous stem, stem-like, multipotent, unipotent, or somatic cells prepared for therapeutic use in the patient. In some implementations, the cells prepared are neural stem cells, neural stem-like cells, neural precursor cells, neural progenitor cells, neuroblasts, neurons, cardiac cells, hematopoietic cells, cells of ectoderm, mesoderm or endoderm lineage, pluripotent cells, multipotent cells, unipotent cells, somatic cells, naturally occurring cells, non-naturally occurring cells, prokaryotic cells, and/or eukaryotic cells. It should be understood that many different types of cells may be prepared using systems and methods described herein, and the type of cell is not meant to be limited.

In one implementation, there is provided a unipotent or multipotent cell prepared using the automated systems and methods described herein. In another implementation, there is provided a population of multipotent, unipotent, somatic, or stem-like cells prepared using the automated systems and methods described herein.

In some implementations, there are provided methods for reprogramming a cell of a first type to a desired cell of a different type that is multipotent or unipotent using the automated systems and methods described herein, the cell of a first type being a somatic cell, a stem cell, or a progenitor cell, the automated process executable by the systems described herein, the methods comprising steps of: introducing into the cell of a first type using robotic means an agent capable of remodeling the chromatin and/or DNA of the cell, wherein the agent capable of remodeling the chromatin and/or DNA is a histone acetylator, an inhibitor of histone deacetylation, a DNA demethylator, and/or a chemical inhibitor of DNA methylation; transiently increasing intracellular levels of at least one reprogramming agent in the cell of a first type using robotic means, wherein the at least one reprogramming agent increases directly or indirectly the endogenous expression of at least one multipotent or unipotent gene regulator to a level at which the gene regulator is capable of driving transformation of the cell of a first type into the multipotent or unipotent cell; using robotic means to maintain the cell of a first type in culture conditions supporting the transformation of the cell of a first type to the multipotent or unipotent cell for a sufficient period of time to allow a stable expression of a plurality of secondary genes characteristic of the phenotypical and/or functional properties of the multipotent or unipotent cell, where one or more of the secondary genes is not characteristic of phenotypical and functional properties of an embryonic stem cell and wherein stable expression of the plurality of secondary genes occurs in the absence of the reprogramming agent, whereby at the end of said period of time the cell of a first type has been transformed into the multipotent or unipotent cell, and where the multipotent or unipotent cell expresses at least one marker characteristic of the cell of a first type.

In another broad aspect, there is provided a robotic aspirator comprising: a robotic arm configured to move in at least one direction; a body connected to the robotic arm; and an aspiration member comprising a fluid flow channel connected to the body, the aspiration member being configured for connection to a pump means; the body being configured to hold a disposable tip for providing fluid connection between the disposable tip and the fluid flow channel of the aspiration member; fluid being aspirated through the disposable tip and the fluid flow channel when the disposable tip is fluidly connected to the fluid flow channel and the aspiration member is connected to the pump means. In some implementations, the robotic aspirator further comprises a plurality of prongs connected to the body, the prongs being moveable between a tip holding position and a retracted position, the prongs being configured in the tip holding position to hold the disposable tip for providing fluid connection between the disposable tip and the fluid flow channel of the aspiration member. In some implementations of the robotic aspirator, the disposable tips are capable of being disengaged from the fluid flow channel without handling by a human operator. In some implementations the prongs can hold tubes.

Methods of automatically aspirating a sample using the robotic aspirator described herein are also provided. In some implementations, there is provided a method of aspirating using a robotic arm having a fluid flow channel and a plurality of prongs configured to selectively hold a disposable tip in fluid connection with the fluid flow channel, the method comprising: moving the prongs to retain the disposable tip in fluid connection with the fluid flow channel, the prongs being selectively moveable and optionally further configured to grip at least one object other than the disposable tip; and evacuating the fluid flow channel to aspirate liquid through the disposable tip and the fluid flow channel.

In some implementations, the method comprises, after aspirating liquid, disengaging the prongs from the disposable tip; and stopping evacuation of the fluid flow channel to disengage the disposable tip from the fluid flow channel. In some implementations, the disposable tip disengages from the fluid flow channel without handling by a human operator.

Embodiments of the present invention each have at least one of the above-mentioned object and/or aspects, but do not necessarily have all of them. It should be understood that some aspects of the present invention that have resulted from attempting to attain the above-mentioned object may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the present invention, as well as other aspects and further features thereof, reference is made to the following description which is to be used in conjunction with the accompanying drawings, where:

FIG. 6 is a perspective view, taken from a front and right side, of a left rack of a storage area of FIG. 5;

FIG. 7 is a perspective view, taken from a front and right side, of a right rack of a storage area of FIG. 5;

FIG. 8A is a perspective view, taken from a front and right side, of a center portion of a storage area of FIG. 5;

FIG. 8B is a close up perspective view, taken from a front, top and left side, of one of the transfer trays of the center portion of the storage area of FIG. 8B;

FIG. 11A is a perspective view, taken from a rear, top and left side, of a portion of the deck 910 of FIG. 9 showing a tilt module for cell processing trays, a media fill station, transport container tilt module, and a transport holder adaptor station;

FIG. 11B is a close-up exploded perspective view, taken from a front and right side, of the transport container tilt module;

FIG. 11C is a close-up perspective view, taken from a front and right side, of the transport container tilt module shown in an untilted position;

FIG. 11D is a close-up perspective view, taken from a front and right side, of the transport container tilt module shown in an untilted position;

FIG. 13 is a perspective view, taken from a front and top of an example robotic arm of a robotic module of the ACPS of FIG. 3A having a robotic aspirator/gripper;

FIG. 14 is a front plan view of the example robotic aspirator/gripper of FIG. 14 holding a tube;

FIG. 15 is a front plan view of the example robotic arm of FIG. 14 having an aspirator tip attached thereto;

FIG. 31A is a top plan view of another implementation of a cell processing tray;

FIG. 31B is a front elevation view of the cell processing tray of FIG. 31A;

FIG. 31C is a side elevation view of the cell processing tray of FIG. 31A; and

FIG. 31D is a cross-sectional view of the cell processing tray of FIG. 31A, taken along the line 31D.

DETAILED DESCRIPTION

There are described herein methods and systems that can be used for transforming a cell of a first type, such as a somatic cell, a stem cell, or a progenitor cell, to a cell of a desired second type, such as a pluripotent, multipotent, or unipotent cell. The described methods and systems are provided in order to illustrate certain implementations of the methods and systems. It should be expressly understood that other implementations are possible. In particular, it should be understood that methods and systems can be used for a wide variety of biological sample processing, including generation of biomaterials (e.g., tissues, matrices, etc.), generation of biologics (e.g., proteins, antibodies, growth factors, etc.), growth of cells and cell lines, in addition to cell transformation and cell reprogramming.

Figure 1A:
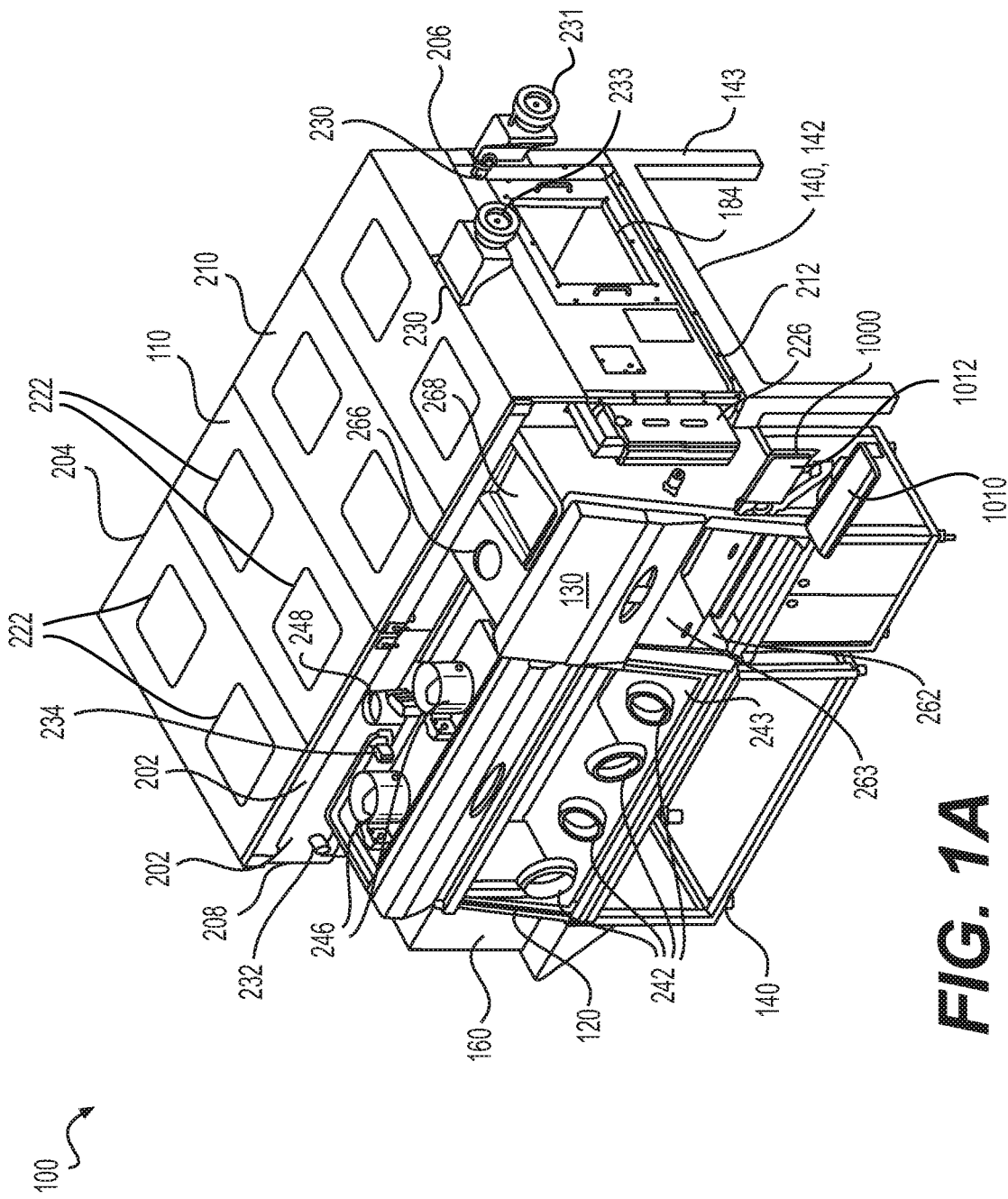
FIG. 1A is a perspective view, taken from a front, top and left side, of an automated cell processing system (ACPS) in accordance with an implementation of the present technology.
Figure 1B:
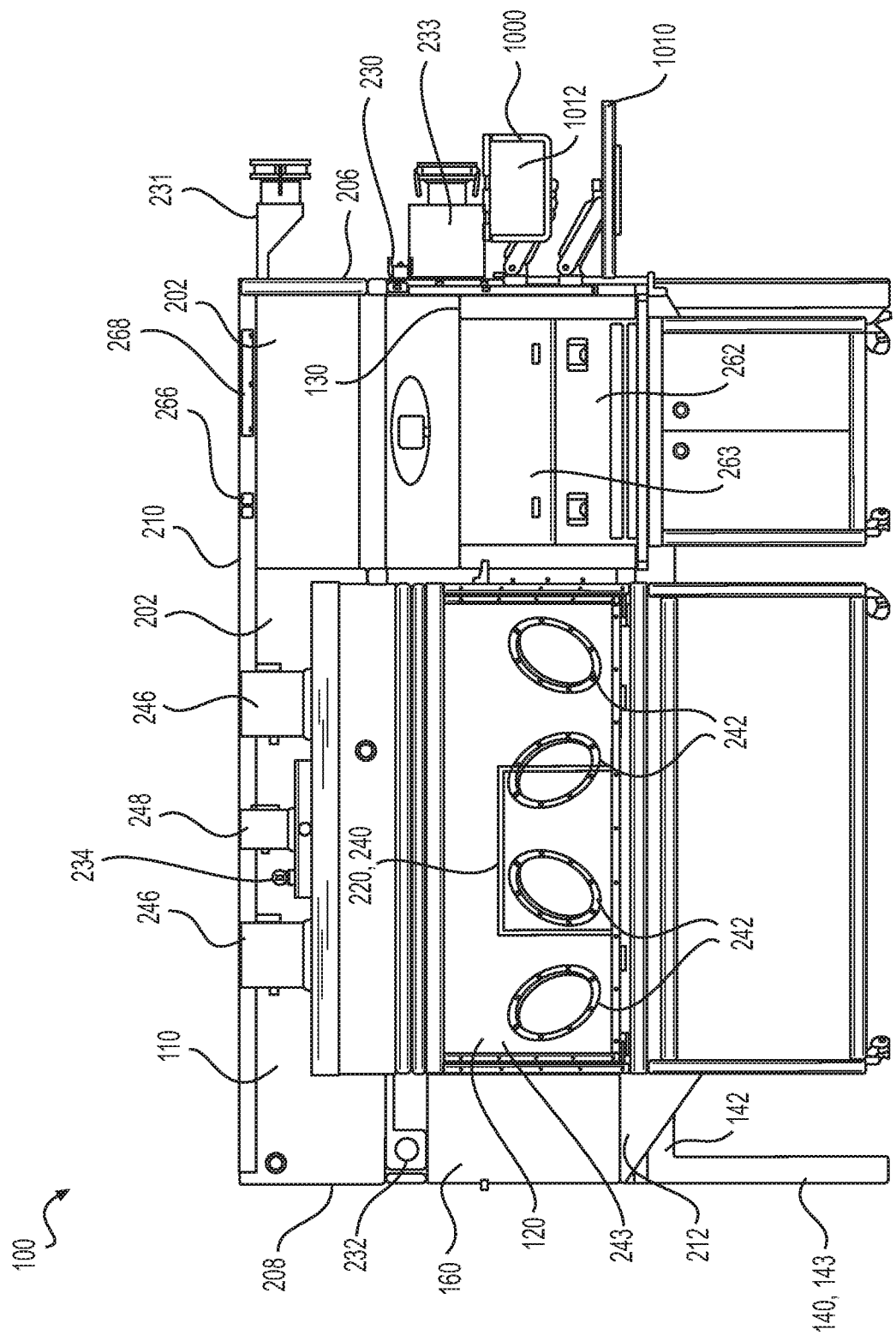
FIG. 1B is a front elevation view of the ACPS of FIG. 1A.
Figure 1C:
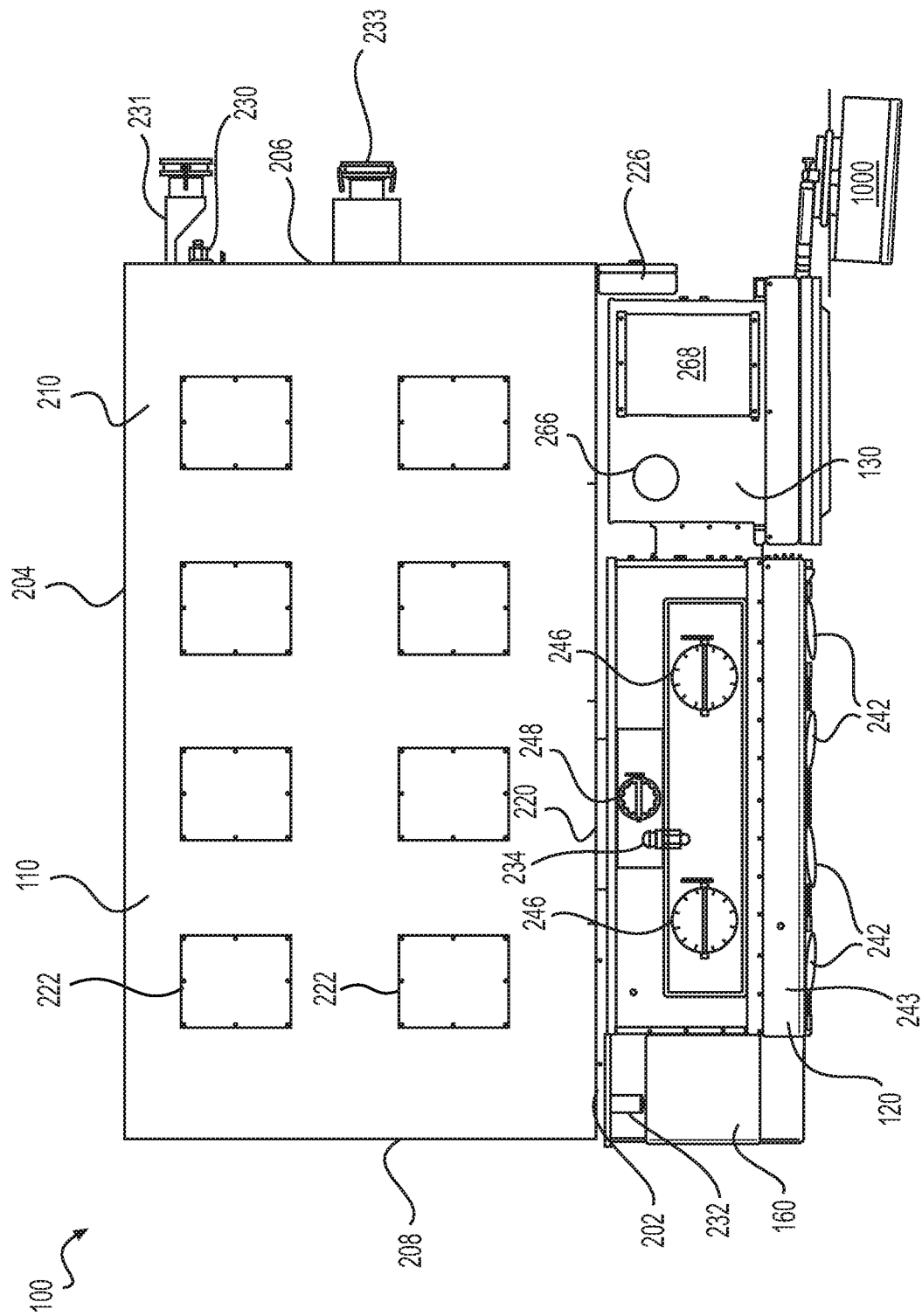
FIG. 1C is a top plan view of the ACPS of FIG. 1A.
Figure 2:
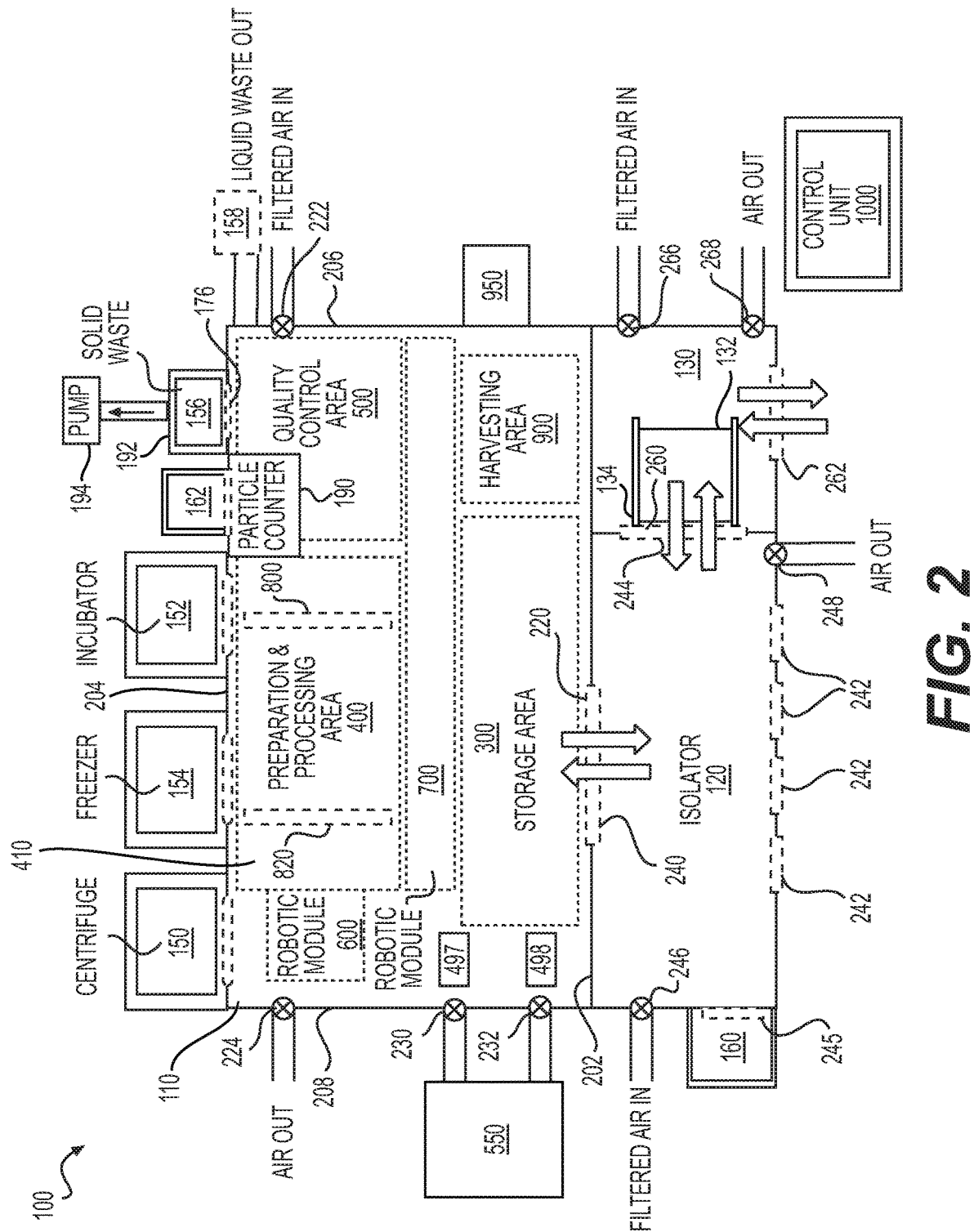
FIG. 2 is a schematic illustration of the ACPS of FIG. 1A.

With reference to FIGS. 1A to 2, an automated cell processing system (ACPS) 100 for an automated method of cell processing includes an enclosure 110. The enclosure 110 is connected to an isolator 120 and via the isolator 120 to a biological safety cabinet (BSC) 130.

The ACPS 100 also includes various equipment such as refrigerators, incubators, freezers and the like some of which are disposed inside the enclosure 110, the isolator 120, or the BSC 130, and some of which are disposed outside the enclosure 110, the isolator 120, and/or the BSC 130, so as to be accessible from within the enclosure 110, the isolator 120, and/or the BSC 130.

The ACPS 100 includes a control unit 1000 configured to control the automated cell processing as will be described in further detail below.

Enclosure

With reference to FIGS. 1A to 3A, the enclosure 110 is a rectangular chamber constructed of four side walls 202, 204, 206, 208, an upper wall 210, and a bottom wall 212. The side walls include a front wall 202, a rear wall 204, a left side wall 206 and a right side wall 208. Terms such as left, right, front and rear are defined herein as would be understood by a person standing on the bottom wall 212 within the enclosure 110 and facing forwardly towards the isolator 120. The walls are made of metal but it is contemplated that the walls could be made of any suitable material.

The front wall 202 has an isolator connection port 220 which connects to a complementary port 240 of the isolator 120. The isolator connection port 220 is rectangular in shape but it is contemplated that the isolator connection port 220 could be other than rectangular. The isolator connection port 220 is normally closed by a gate (not shown) and opened only to allow transfer objects between the enclosure 110 and the isolator 120. The enclosure 110 is thus in selective fluid connection with the isolator 120.

Eight air inlets 222 are defined in the upper wall 210 of the enclosure. Each air inlet 22 has a HEPA (High Efficiency Particulate Air) or ULPA (Ultra Low Particulate Air) filter (not shown). An air flow system which includes impellers mounted inside the enclosure 110 pushes air into the enclosure 110 through the HEPA filter provided in the air inlet port 222 and maintains circulation of air through the enclosure 110. It is contemplated that there could be more than one air inlet 222. It is contemplated that other appropriate air filter, such as an ULPA (Ultra Low Penetration Air) filter, could also be used in place of the HEPA air filter.

Two air outlets 224 are formed in the bottom wall 212. Additional air outlets 225 (FIG. 3A) are also provided near the bottom of the front wall 202 and the bottom of the rear wall 204. It is contemplated the number and configuration of the air outlets 224 could be different than as shown. In some implementations, airflow in the enclosure 110 is laminar. In some implementations the laminar airflow can be used to divide the space within the enclosure 110 into a plurality of portions. The portions inside the enclosure 110 created by the laminar flow could be used to process different batches, as will be described below in further detail, without increasing risk of cross contamination between the batches. The enclosure 110 is maintained at a positive air pressure relative to the ambient pressure in the room housing the automated cell processing system 100, and relative to the isolator 120. Rapid air exchange in the enclosure 110 helps to remove any contaminant particles that may have entered the enclosure 110 and thereby reduces the probability of exposure of objects housed inside the enclosure 110 to the contaminants that enter the enclosure 110.

Figure 22:
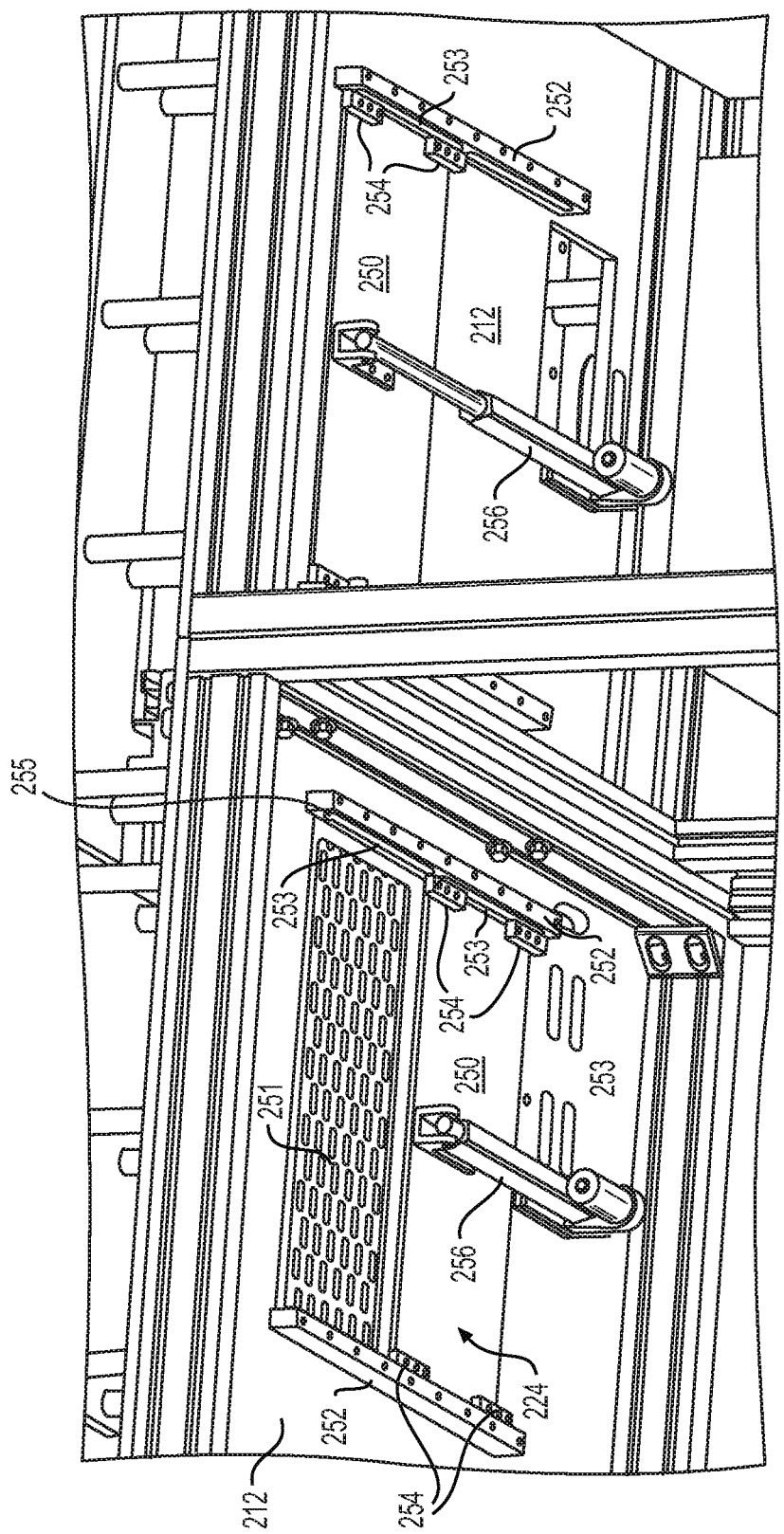
FIG. 22 is a close-up perspective view, taken from a bottom, front and right side of two air outlets of the enclosure of FIG. 3A along with the corresponding automated gates for selectively closing the air outlets.
Figure 23:
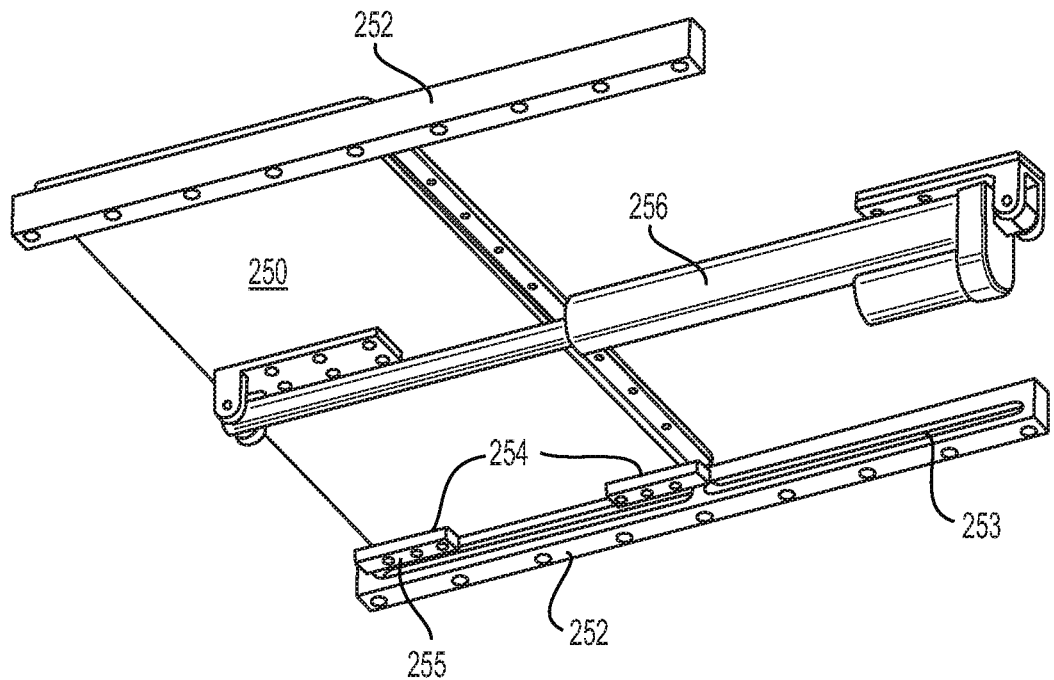
FIG. 23 is a close-up perspective view, taken from a bottom, front and right side, of one of the air outlets and corresponding gate of FIG. 22 with the gate being shown in a position where the air outlet is fully closed.
Figure 24:
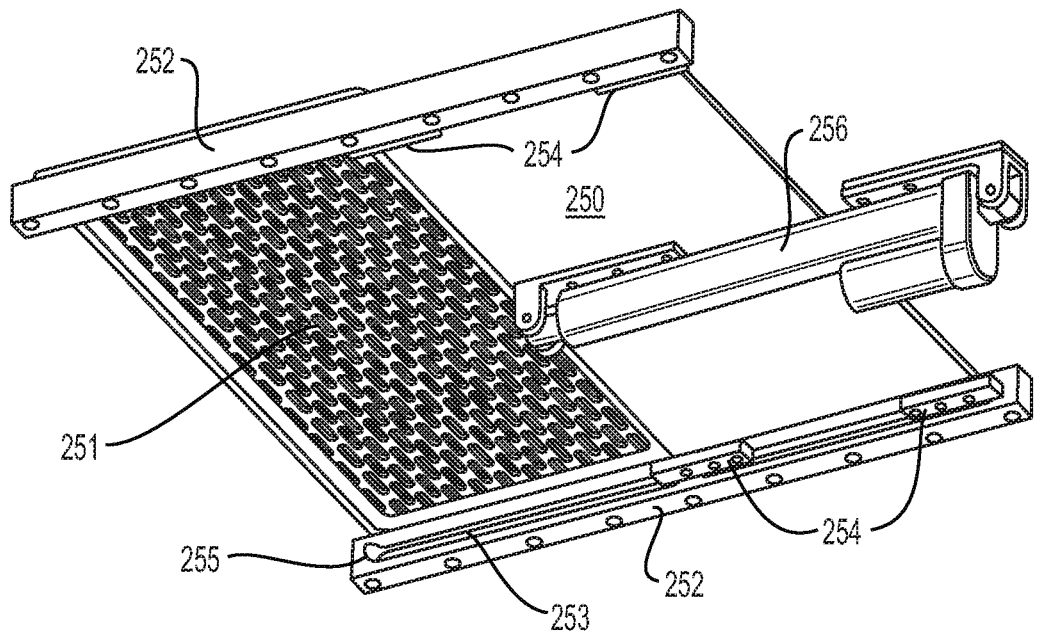
FIG. 24 is a close-up perspective view, taken from a bottom, front and right side, of the air outlet and gate of FIG. 23 with the gate being shown in a position where the air outlet is fully open.

The air outlets 224 along the floor 224 are closeable (for example, during sterilization of the enclosure 110) by automated gates 250. The air outlets 225 formed defined in the front and rear walls 202, 204 are also closeable (for example, during sterilization of the enclosure 110). All of the outlets 224 formed in the bottom wall 212 are generally similar and as such, one of the outlets 224 and the automated gate 250 covering the outlet 224 will now be described. With reference to FIGS. 22 to 24, the outlet 224 is covered with a mesh screen 251 which is made of stainless steel in the illustrated implementation. It is contemplated that the screen 251 could be made of any suitable material. The screen 251 ensures and prevents objects from outside the enclosure 110 from entering the inside of the enclosure 110, or objects inside the enclosure 110 from falling through the outlet 224. The gate 250 is slidably mounted to a pair of flanges 252 mounted on opposite sides of the outlet 224. The flanges 252 are generally mirror images, each having a groove 253 facing the groove 253 of the opposite flange 252. The opposing grooves 253 extend parallel to the bottom wall 212 except at the end where each groove 253 forms a ramp 255 bending towards the bottom wall 212. The gate 250 has two guiding elements 254 connected along each side, one at each end of the side of the gate 250. Each guiding element 254 is shaped and sized to be received in the groove 253 and slide or roll therein. The guiding elements 254 move along the grooves 253 to guide the gate 250 between a closed position where the outlet 224 is sealed and an open position. In the closed position, one of the guiding elements 254 on each side is received in the ramp 255 bending towards the bottom wall 212. The ramp 255 pushes the gate 250 towards the bottom wall 212 to ensure sealing between the gate 250 and the bottom wall 212. In the open position, the guiding elements 254 are disposed in groove 253 outside the groove end 255. An electrical actuator 256 is connected to the gate 250 for moving the gate 250 so as to slide or roll the guiding elements 254 along the corresponding grooves 253. The actuator 256 is connected to the control unit 1000 for controlling the opening and closing of the air outlets 224. In the illustrated implementation, the actuator 256 is controlled to move the gate 250 between a position where the air outlet 224 is fully open or a position where the air outlet 224 is fully closed. It is contemplated that the gate 250 could be controlled to maintain the gate 250 in a position where the outlet 224 is partially open.

A sterilant inlet 230 is defined in the left side wall 206 for introducing sterilant into the enclosure 110 for sterilization of the space inside the enclosure 110. The sterilant inlet 230 is configured for attachment of a fluid conduit to receive sterilant (in gas or vapour form in the illustrated implementation) and to deliver the received sterilant into the interior of the enclosure 110 as a sterilant vapor mist or spray. The sterilant air inlet 230 has a cover to prevent entry of foreign particles when not in use.

A sterilant outlet 232 is also defined in the front wall 202 for removing air and sterilant from the enclosure 110. The sterilant outlet 232 is configured for attachment of a fluid conduit leading to a pump for removing sterilant vapour, gas or air from the enclosure 110.

A catalytic converter inlet 231 is defined in the left side wall 206 for introducing air into the enclosure for recirculating air through a catalytic converter to convert the sterilant vapor to harmless and biodegradable water vapor and oxygen at the end of a sterilization procedure. The catalytic converter inlet 231 is configured for attachment of a fluid conduit and has a cover to prevent entry of foreign particles when not in use.

A catalytic converter outlet 233 is also defined in the left side wall 206 above the HEPA or ULPA filters and configured for removing air from the enclosure through these HEPA and ULPA filters and through a catalytic converter in order to more rapidly neutralize the vapour sterilant otherwise lodged into the extensive surface area of the HEPA or ULPA filters. The catalytic converter outlet 233 is configured for attachment of a fluid conduit leading to a catalytic converter and a pump for removing air and sterilant vapour from the enclosure 110.

It is contemplated that the sterilant inlet and outlet 230, 232 could each be defined in a location other than that shown herein, and configured differently than as shown herein. It is contemplated that the catalytic converter inlet and outlet 231, 233 could each be defined in a location other than that shown herein, and configured differently than as shown herein.

The sterilant inlet and outlet 230, 232 are connected to an automated enclosure sterilization unit 550 for decontamination of the interior of the enclosure 110. The automated enclosure sterilization unit 550 will be described below in further detail.

Various access ports are provided in the walls of the enclosure 110. In the bottom wall 212, as can be seen best in FIG. 3C, the enclosure 110 has access ports 170, 172, 174, 176, 178 for accessing various process equipment such as a centrifuge 150, a freezer 152, an incubator 154, and a waste receptacle 156. The bottom wall 212 also defines recesses 171 and 175 in which a robotic module 600 and a cryofreezer 460 are mounted respectively. It is contemplated that one or both of the recesses 171, 175 could be omitted or that other recesses could be formed for mounting of other components. An access port defined in the left side wall 206 is closed by a side panel 184.

It should also be understood that the number, shape, size, position and configuration of the ports of the enclosure 110 could be other than that shown herein. It should also be understood that the number, shape, size, position and configuration of the inlets and outlets (such as for air, sterilant and the like) of the enclosure 110 could be other than that shown herein.

The enclosure 110 generally remains sealed except for transferring objects (samples, reagent containers, containers for samples, other labware, and the like) between the enclosure 110 and the isolator 120, or other process equipment, such as incubators, centrifuges, freezers, storage cabinets and the like that may be connected to the enclosure 110 for the automated processing of cells. The connection between the enclosure 110 and these other process equipment is a sealed connection, and the enclosure 110 is maintained at a positive pressure relative to the interior of the process equipment to reduce entry of contaminant particles from the process equipment into the enclosure 110.

The enclosure 110 is generally considered a sterile/aseptic environment and maintained as a class 10 cleanroom (having fewer than 10 particles of a size greater than or equal to 0.5 microns per cubic square foot) in order to conform with good manufacturing practice (GMP) guidelines. The terms "sterile" and "aseptic" are used interchangeably herein to mean microbially sterile, i.e., not contaminated by microorganisms such as endotoxin, mycoplasma, bacteria, etc., or by other infectious agents such as viruses. Thus it should be understood that the enclosure 110 is designed to be aseptic and microbial-free and this is determined by assays and processes in the system that test and measure for microbial contamination, such as endotoxin, mycoplasma, and direct microbial detection assays, to ensure that samples/batches are not contaminated.

The term "good manufacturing practice (GMP)" is used to refer to regulations for medicinal products established by government regulatory bodies such as the U.S. Food and Drug Administration (FDA) and the European Medicines Agency (EMEA) to ensure safety and efficacy of products for clinical use. As used herein, the term "under GMP conditions" means under conditions that meet Good Manufacturing Practices (GMP) guidelines or regulations, i.e., so that the end product can be released for clinical use. It is noted that GMP regulations and recommended guidelines may vary nationally but in general require strict control in GMP production facilities for the manufacturing of pharmaceutical or cellular products, including quality control and quality assurance programs. Such facilities typically require "clean rooms", which are classified in four classes (AD) depending on air purity, based on the number of particles of two sizes (≥0.5 µm, ≥5 µm), or are in accordance with Clinical Laboratory Improvement Amendments (CLIA) regulations; other parameters such as temperature, humidity, and pressure are often taken into account and monitored because of their potential impact on particle generation and microorganism proliferation; materials and staff flows are separated and unidirectional to minimize cross contamination; documentation of all activities is necessary; and so on. GMP regulations for cell therapy products generally include at least some of the following: demonstration of preclinical safety and efficacy; no risk for donors of transmission of infectious or genetic diseases; no risk for recipients of contamination or other adverse effects of cells or sample processing; specific and detailed determination of the type of cells forming the product and what are their exact purity and potency; and in vivo safety and efficacy of the product.

Figure 3A:
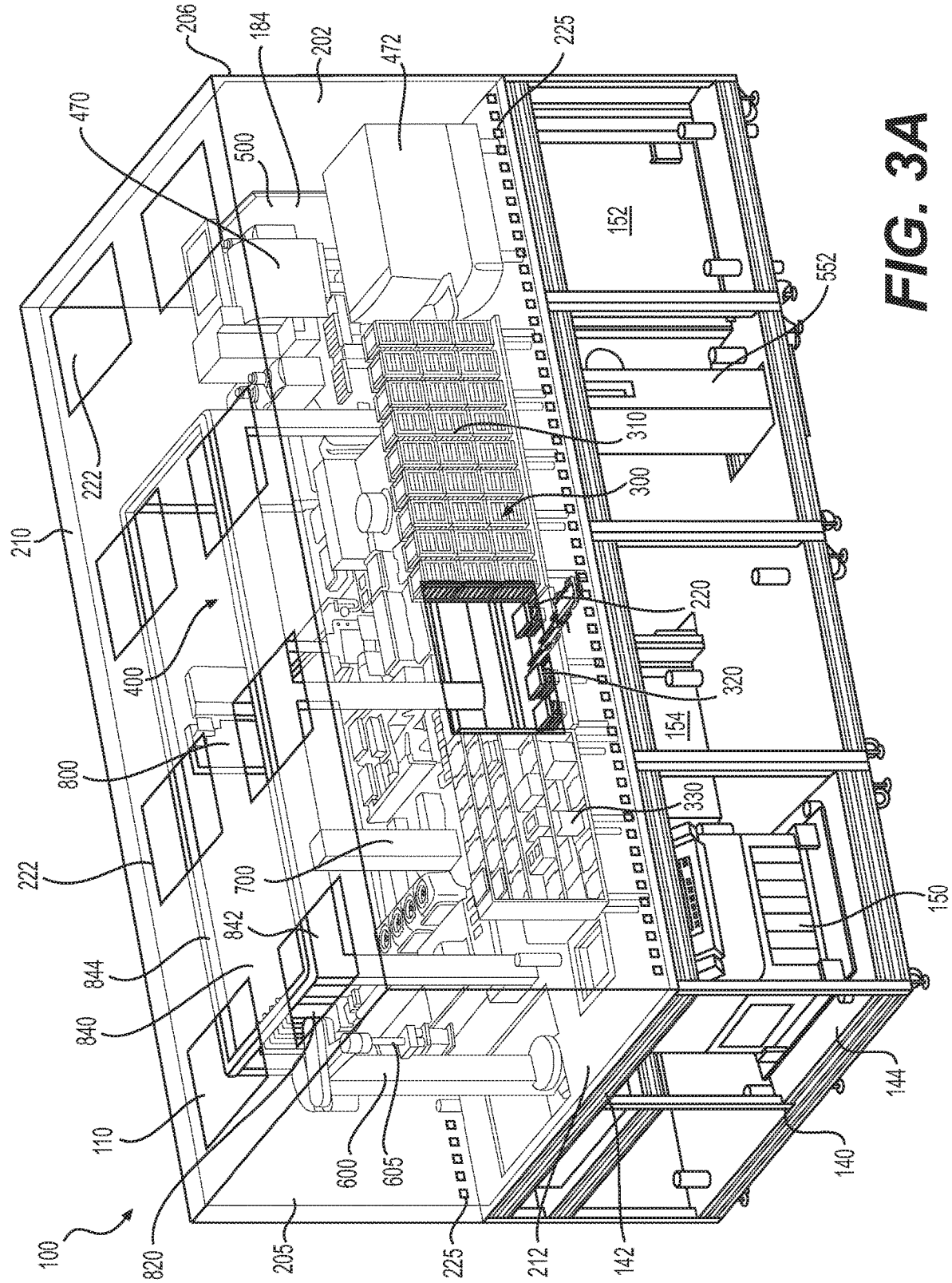
FIG. 3A is a perspective view, taken from a front and right side, of a portion of the ACPS of FIG. 1A with an isolator, a biological safety cabinet and a control unit removed for clarity.
Figure 3B:
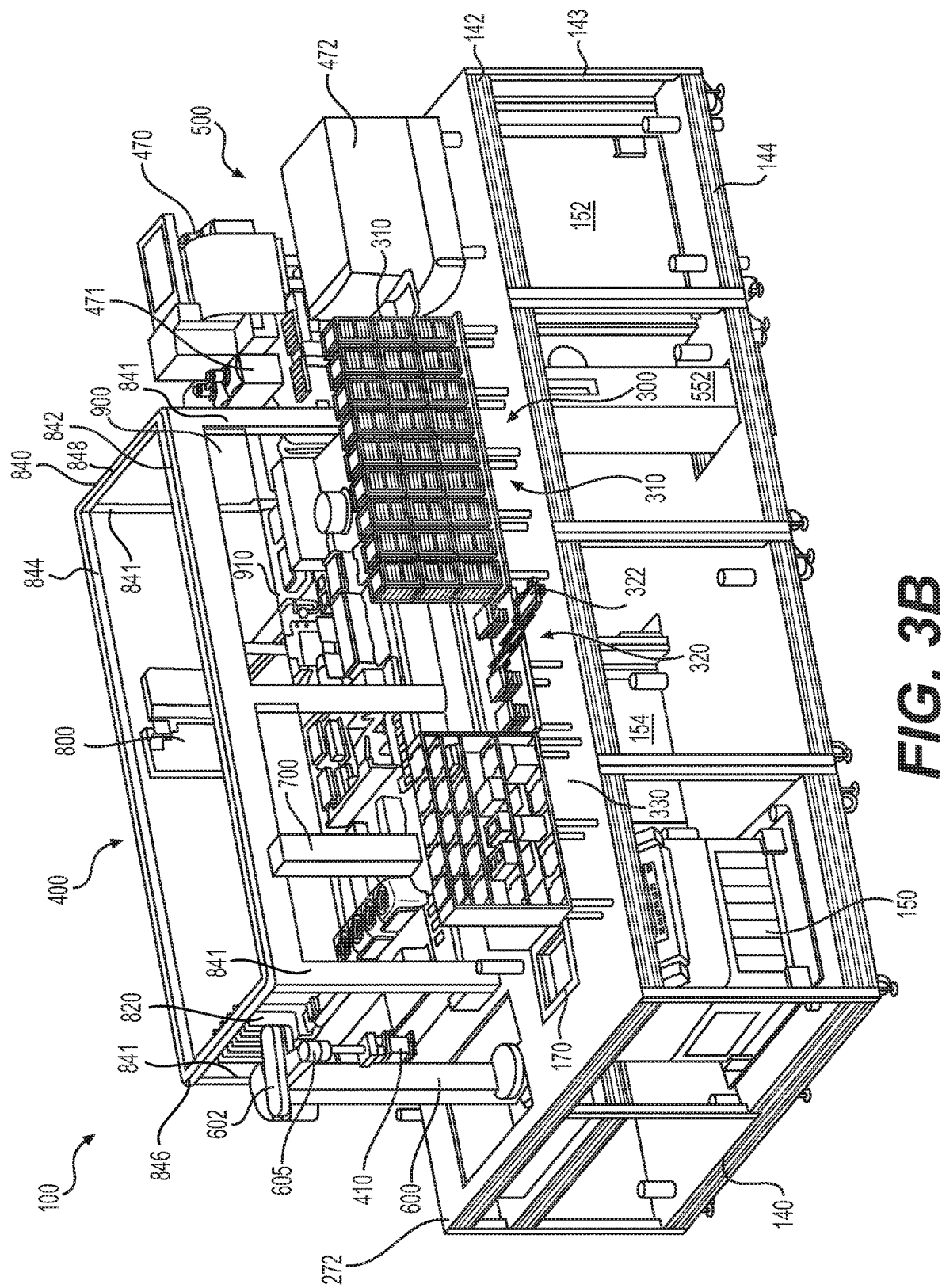
FIG. 3B is a perspective view, taken from a front and right side, of the portion of the ACPS of FIG. 3A, with the top wall and side walls of the enclosure being removed for clarity.
Figure 3C:
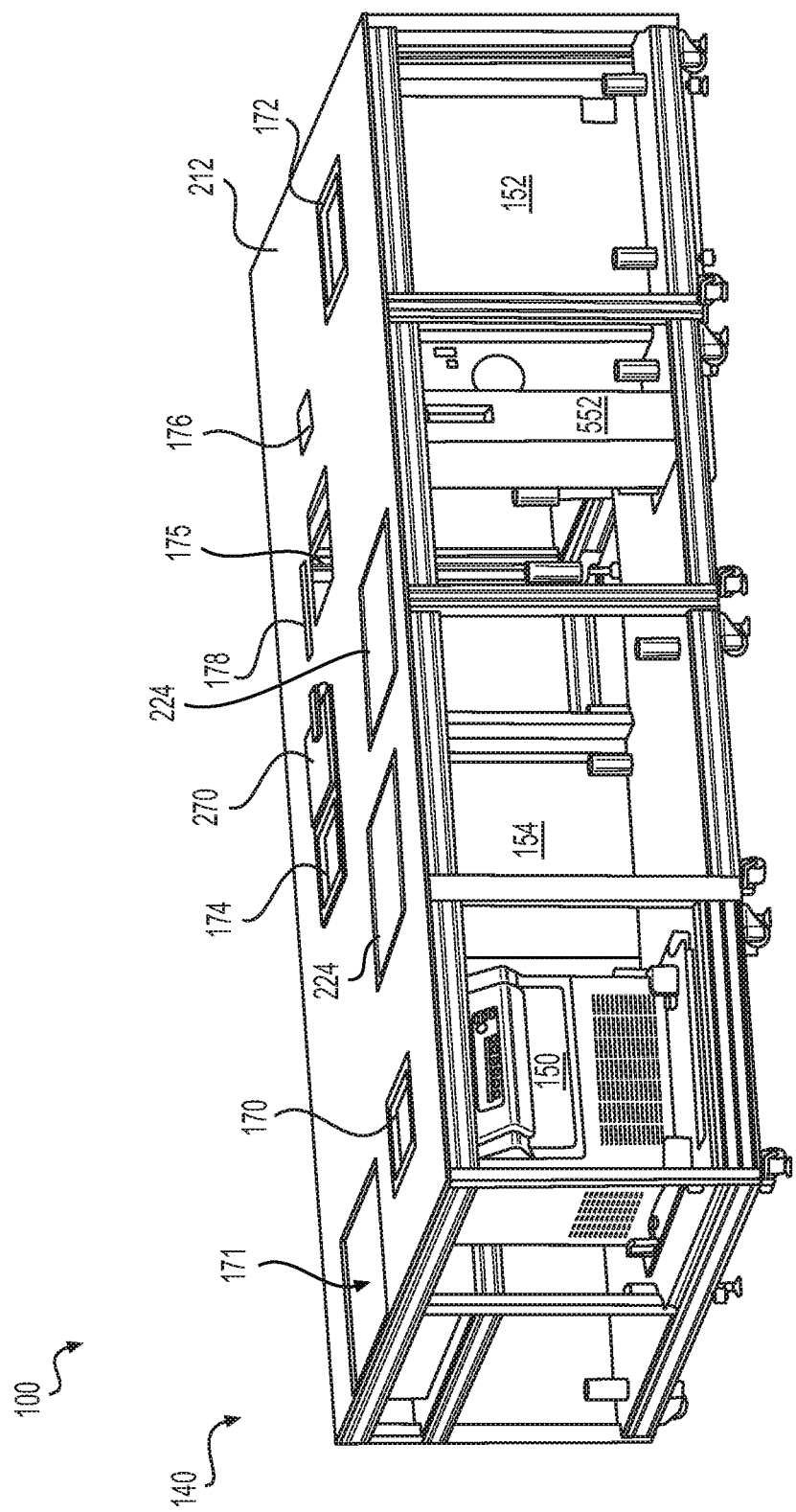
FIG. 3C is a perspective view, taken from a front and right side, of the bottom wall of the enclosure and the table of FIG. 3A shown in isolation.

As can be seen best in FIG. 3C, the enclosure 110 is supported on a rectangular frame 140 having an upper portion 142 formed by upper horizontal frame members and a lower portion 144 formed by lower horizontal frame members. The frame 140 includes vertical frame members 143 extending between the upper and lower horizontal frame members 142, 144. The lower portion 144 is supported on wheels to facilitate repositioning of the frame 140 but it is contemplated that the wheels could be omitted. The lower portion 144 supports other components of the ACPS 100 as will be described below. In some implementations, such as that shown in FIGS. 1A to 1C, upper portion 142 is supported on the floor by the vertical frame members 143 with the lower portion 144 and the wheels being omitted.

The centrifuge 150, the incubator 152, freezer 154, and the waste receptacle 156 are supported on the lower portion 144. The centrifuge 150 has an access port on its upper portion, and is supported on the lower portion 144 such that the access port (not labeled) of the centrifuge 150 is aligned with the corresponding centrifuge access port 170 of the lower bottom wall 212. The space inside the centrifuge 150 is thus accessible from inside the enclosure 110 via the aligned access ports in the bottom wall 212 of the enclosure 110 and the upper portion of the centrifuge 150. Similarly, each of the incubator 152, freezer 154, and the waste receptacle 156 has an access port defined in their respective upper walls. The incubators 152, freezer 154, and the waste receptacle 156 are each supported on the lower portion 144 so as to align their respective access ports with the corresponding access port of the bottom wall 212 of the enclosure 110. It is contemplated that the lower portion 144 could be omitted and one or more of the centrifuge 150, the incubators 152, freezer 154, and the waste receptacle 156 could be placed on the room floor below the upper portion 142 supporting the enclosure 110. It is also contemplated that the one or more of the centrifuge 150, the incubator 152, freezer 154, and the waste receptacle 156 could be connected to a wall of the enclosure 110 other than the bottom wall 212. For example, the side walls of the enclosure 110 could have access ports (such as the access port covered by side panel 184) for connecting to one or more of the centrifuge 150, the incubator 152, freezer 154, and the waste receptacle 156.

A panel 226 mounted on the wall of the BSC 130 includes a display for pressure and other environmental characteristics of the enclosure 110 and manual override switches for various elements inside the enclosure 110 such as a light switch, impellers associated with air inlets 222, other mixing fans used during sterilization of the enclosure 110, and the like, which are controlled automatically by the control unit 1000 during routine operation of the ACPS 100.

The enclosure 110 houses various components of the ACPS 100 as will be described below.

Isolator

With reference to FIGS. 1A to 2, the isolator 120 is disposed in front of the front side wall 202 of the enclosure 110. The isolator 120 is a generally rectangular chamber defined by four side walls, an upper wall and a lower wall. The rear side wall has an enclosure access port 240 connected to the isolator access port 220 of the enclosure 110. A gasket (not shown) is installed around the enclosure access port 240 for forming a sealed connection between the isolator 120 and the enclosure 110. The enclosure access port 220 and the isolator access port 220 are selectively covered by a gate that is opened for passing objects (such as chemical supplies, lab ware, tissue samples, and the like) between the isolator 120 and the enclosure 110. The gate is an automated gate that is connected to the control unit 1000 for controlling the opening and closing of the ports 220, 240 connecting the isolator 120 to the enclosure 110.

The front wall of the isolator 120 is in the form of a hinged window 243 (hingedly connected at the upper edge in the illustrated implementation) and can be opened to access the interior space of the isolator 120 for cleaning and maintenance, for example. In the illustrated implementation, the front wall 243 is made of tempered glass but it could be made of any suitable material. It is contemplated that the front wall could be fixed and not openable for access to the interior. Four glove ports 242 (the gloves being removed in the figures for clarity) are provided in the front wall 243 to allow a human user to manipulate objects placed inside the isolator 120 while maintaining the environmental isolation and sterility of the interior of the isolator 120. In the illustrated implementation, the passage of objects between the isolator 120 and the enclosure 110 occurs via the automated transfer trays 322 (FIG. 3B). When the transfer tray 322 is extended into the isolator 120 through the ports 220, 240, a human operator using the glove ports 242 moves objects between the transfer tray 322 and the isolator 120. It is contemplated that a robotic module could be provided in the isolator for moving objects between the transfer tray 322 and the isolator 120 and/or the BSC 130. It is also contemplated that the transfer trays 322 could be manually actuated instead of or in addition to being electrically actuated. It is also contemplated that the passage of objects between the isolator 120 and the enclosure 110 could be performed fully manually, i.e. by a human operator using the glove ports 242 to transfer objects through the ports 220, 240 with or without the use transfer trays 322.

A BSC connection port 244 is defined in the right side wall of the isolator 120 for connection to the BSC 130. A sealed door (not shown) extending across the port 244 can be opened to allow passage of objects between the BSC 130 and the isolator 120. An interlock mechanism is provided to ensure that the enclosure access port 240 is closed when the BSC connection port 244 is open and vice versa.

The isolator 120 has two air inlets 246 provided with a HEPA air filter and an air outlet 248 for maintaining circulation of HEPA filtered air through the isolator 120. A sterilant outlet 234 is also provided top wall of the isolator for removing air and sterilant from the isolator 120. The isolator 120 can thus be sterilized via a sterilization unit (for example the sterilization unit 550) connected to the enclosure 110 by keeping the enclosure connection port 240 open during sterilization of the enclosure 110. The sterilant outlet 234 is configured for attachment of a fluid conduit leading to a pump for removing sterilant vapour, gas or air from the isolator 120. Impeller fans (not shown) are also provided in the isolator 120 to maintain optimal circulation of air and/or sterilant through the isolator 120. The isolator 120 is maintained at a positive air pressure relative to the BSC 130 and at a negative pressure relative to the enclosure 110 so that air flows out of the enclosure 110 into the isolator 120 when the connection ports 220, 240 are open, thereby reducing the possibility of contamination due particles entering the enclosure 110 from outside. It is contemplated the number and configuration of the air inlets and outlets 246, 248 could be different than as shown herein. The isolator has an access port 245 (shown schematically in FIG. 2) on the right side wall for connection to a refrigerator 160 for storing reagent and other media containers.

The isolator 120 is used to transfer samples and other objects from larger containers to smaller containers before passing into the enclosure 110. In some implementations, the outer protective packaging of objects may be removed in the isolator 120 before passing into the enclosure 110. In some implementations, the isolator 120 could house one or more reagent containers.

In some implementations, the isolator 120 has an automated sterilization system (such as the system 550 shown schematically in FIG. 2) for sterilizing the isolator 120, for example with hydrogen peroxide.

Biological Safety Cabinet (BSC)

With reference to FIGS. 1A to 2, the BSC 130, also in the form of a generally rectangular chamber defined by four side walls, an upper wall and a lower wall, is disposed on a right side of the isolator 120. The BSC 130 has an isolator connection port 260 defined in its left side wall and connected to the BSC connection port 244 of the isolator 120. An access port 262 in the front wall of the BSC 130 is used for transferring objects into and out of the ACPS 100 by a human and/or robotic operator. The access port 262 is covered by a sliding gate 263 that is opened for transferring objects therethrough. In the illustrated implementation, the sliding gate 263 is made of tempered glass but it could be made of any suitable material. An interlock mechanism is provided to ensure that the isolator connection port 260 is closed when the access port 262 is open and vice versa. As shown schematically in FIG. 2, a transfer tray 132 mounted on rails 134 is used to transfer objects between the isolator 120 and the BSC 130. In the illustrated implementation objects can be placed on the transfer tray 132 by a human operator and the transfer tray 132 could be actuated manually to move the transfer tray 132 between the isolator 120 and the BSC 130. It is however contemplated that the transfer tray 132 could be electrically actuated and that objects could be moved to/from the transfer tray 132 robotically by a robotic arm provided in the BSC 130 and/or in the isolator 120.

The BSC 130 has an air inlet 266 covered with a HEPA air filter and an air outlet 268 for maintaining circulation of HEPA filtered air through the BSC 130. It is contemplated the number and configuration of the air inlets and outlets 266, 268 could be different than as shown herein. Impeller fans can be optionally provided in the BSC 130 to maintain air circulation through the BSC 130. The BSC 130 is maintained at a positive air pressure relative to the ambient air in the room housing the system 100, and at a negative pressure relative to the isolator 120 so that air flows out of the isolator 120 into the BSC 130 when the connection ports 244, 260 are open, thereby reducing the possibility of contamination due particles entering the enclosure 110 from outside. In the illustrated implementation, the BSC 130 is maintained as a class 100 cleanroom environment (having fewer than 100 particles of a size greater than or equal to 0.5 microns per cubic square foot). It is however contemplated that the BSC 130 could be maintained at a higher or lower level of cleanroom environment.

The BSC 130 is used to as a location to manually clean or sterilize the outer surface of objects (or the outer packaging of a container of sterile objects) before passing the objects into the isolator 120, and thereby into the enclosure 130. After sterilizing the outer surface of objects placed inside the BSC 130, the sliding gate is closed to cover the front access port 262. HEPA filtered air is then circulated through the BSC 130 for a predetermined amount of time to reduce the number of particles in the air before opening the isolator connection port 260 for passing objects from the BSC into the isolator 120.

It is contemplated that the configuration of any of the enclosure 110, the isolator 120, and the BSC 130 and/or the connections therebetween could be different than as shown herein. For example, the number, dimension, placement of the access ports in any one or more of the enclosure 110, the isolator 120, and the BSC 130 could be different. It is also contemplated that one or both of the isolator 120 and the BSC 130 could be omitted, for example if the enclosure 110 were placed in a cleanroom. It is further contemplated that isolator 120 and BSC 130 can be replaced by a robotic system that places sterile or aseptic materials on the tray 322 (or on another transport system) for introducing objects to or retrieving objects from enclosure 110.

If all the connecting ports 220, 240, 244, 260, 262 connecting between the enclosure 110 and the isolator 120, the isolator 120 and the BSC 130, and the BSC 130 and the external environment are open, air flows from the enclosure 110 to the isolator 120, from the isolator 120 to the BSC 130, and from the BSC to the room or external environment due to the positive pressure in the enclosure 110 relative to the isolator 120, the positive pressure in the isolator 120 relative to the BSC 130, the positive pressure in the BSC 130 relative to the room or external environment.

As mentioned above, in the ACPS 100, the enclosure 110 can access various equipment needed for the cell processing.

In the illustrated implementation of the ACPS 100, the centrifuge 150 is a Hettich™ Rotanta robotic centrifuge which includes a robotic arm inside the centrifuge for transferring objects into and out of the centrifuge 150. The centrifuge 150 is normally sealed from the enclosure 110 except for the sealed inner chamber of the centrifuge 150 being open to the space inside the enclosure 110 while samples are being loaded into and unloaded therefrom. The inner chamber of the centrifuge 150 is maintained at a slight negative pressure relative to the enclosure 110. The centrifuge 150 is installed under the deck 910 (described in further detail below) so that particles generated by the centrifuge 150 do not enter the enclosure 110 when the access ports 170 therebetween are open. The centrifuge 150 may be associated with a barcode reader or other device to verify and record the identity of containers entering and exiting the centrifuge 150 in order to track different steps during cell processing as desired for complying with GMP regulations. The control unit 1000 is communicatively coupled to the centrifuge 150 for automated cell processing.

In the illustrated implementation of the ACPS 100, the incubator 152 is a Liconic™ STR240 which includes a robotic arm inside the incubator for transferring objects into and out of the incubator 152. The incubator 152 is sealed from the enclosure 110 and maintained at a slight negative pressure relative to the enclosure 110 so that particles generated in the incubator 152 do not enter the enclosure 110 when the access ports 172 therebetween are open. In some implementations, the incubator 152 is constructed in a way that prevents contamination (for example, including features such as a chamber fully constructed of copper alloy, HEPA filters, a sterile water vapour generator instead of a water pan inside incubator, and the like). The incubator 152 is connected to an automated incubator sterilization unit 552 for decontamination of the interior of the incubator 152. The automated incubator sterilization unit 552 is disposed adjacent the incubator 152 and supported on the lower portion 144 of the frame 140. The automated incubator sterilization unit 552 will be described below in further detail. The incubator 152 can be independently sterilized, for example using $ClO_2$ gas, while the cells are in a secondary incubator or in the enclosure 110. The incubator 152 also has a barcode reader to verify and record the identity of containers entering and exiting the incubator 152 in order to track different steps during cell processing as desired for complying with GMP regulations. The control unit 1000 is communicatively coupled to the incubator 152 for automated cell processing and to the automated incubator sterilization unit 552 for sterilization of the incubator 152.

In the illustrated implementation of the ACPS 100, the freezer 154 is a Liconic™ STR 44 which includes a lift 155 (FIG. 9) for transferring objects into and out of the freezer 154. The freezer 154 also has a barcode reader to verify and record the identity of containers entering and exiting the freezer 154 in order to track different steps during cell processing as desired for complying with GMP regulations. The control unit 1000 is communicatively coupled to the freezer 154 for automated cell processing. In the illustrated implementation, the freezer 154 is provided with a double door (one door 270 of the double doors being shown in FIG. 3C) instead of one door closeable to seal the enclosure 110 from the freezer 154. The door 270 is an insulation door for providing additional insulation and is automatically closed during sterilization of the enclosure 110 to prevent condensation of certain sterilants (hydrogen peroxide vapor, for example) around the freezer door which would be colder than the ambient temperature if the freezer door lacked the insulation door. The insulation door 270 is a slidable door mounted to the upper surface of the bottom wall 212 of the enclosure 110. The insulation door 270 is actuated by an electric actuator which connected to the control unit 1000 and thereby controlled by the control unit 1000 for closing of the insulation door 270 during sterilization procedures.

The refrigerator 160 in the illustrated implementation of the ACPS 100 is maintained at 4° C. and used to store reagent containers. The interior of the refrigerator 160 is accessible via the isolator 120 through an access port in the right side of the isolator 120. The reagent container is placed in the refrigerator 160 by a human operator and connected to a media fill line which extends through the isolator 120 to a media fill station 420 in the enclosure 110. It is contemplated that the refrigerator 160 could also be provided with a double door including an insulation door similar to the freezer 154 described above.

In some implementations, the ACPS 100 includes a robotic cryostorage unit 162 (shown schematically in FIG. 2) for storing containers after cell processing has been completed. In the illustrated implementation, the cryostorage unit 162 is an Askion™ C-line System cryostorage unit. The cryostorage unit 162 is connected to the enclosure 110 by a sealed connection similar to that of the freezer 154 or centrifuge 150 as described above. The cryostorage unit 162 could also have its own robotic system (including for example a robotic arm) to allow automatically storing and retrieving of containers therefrom into the enclosure 110 without handling by a human operator.

Components of the ACPS Inside the Enclosure

With reference to FIGS. 2, 3A, 3B and 4, inside the enclosure 110, the ACPS 100 has a storage area 300, a sample preparation and processing area 400, a quality control area 500, a harvesting area 900 and robotic modules 600, 700 and 800, 820.

In the illustrated implementation of the ACPS 100, the storage area 300 is located proximate the front wall of the enclosure 110 rearward of the isolator connection port 220, and the robotic module 700 is disposed rearward of the storage area 300. In the illustrated implementation of the ACPS 100, the cell processing area 400 is located rearward of the robotic module 700, the robotic module 600 is disposed on a right side of the cell processing area 400 proximate the right side wall of the enclosure 110, and the robotic modules 800, 820 are disposed above the cell processing area 400. In the illustrated implementation of the ACPS 100, the harvesting area 900 is disposed on a left side of the cell processing area 400, and the quality control area 500 is disposed on a left side of the harvesting area 900. In some implementations, the quality control area 500 is also disposed vertically higher than the harvesting area 900 and the cell processing area 400.

Generally, the storage area 300 includes a plurality of storage modules, the processing area 400 includes a plurality of cell processing modules, the harvesting area 900 includes one or more harvesting modules and the quality control area 500 includes one or more quality control modules. Some modules may perform functions related to one or more of cell processing, harvesting and quality control, and thus these modules could be considered to be more than one type of module, for example, a cell processing module and a harvesting module. For example, a particular processing station, such as a tilt module could also be used for harvesting as will be described below. Additionally, any one or more of the areas (storage area 300, processing area 400, quality control area 500 and harvesting area 900) could be divided and located in physically separated locations. In the illustrated implementation in FIG. 2, the sample preparation and processing areas are shown in the same location, however they could be located in physically separated locations. Similarly, any combination of the above mentioned areas could be overlapping in the same location or could be located in physically separated locations.

In the illustrated implementation of the ACPS 100, the robotic module 700 accesses the storage area 300, the cell processing area 400, and the quality control area 500. In the illustrated implementation of the ACPS 100, the robotic module 600 accesses the right portion of the cell processing area 400 and the centrifuge 150. It is however contemplated that the relative position of the various components, areas and modules within the enclosure 110 could be different than as shown herein.

Figure 29B:
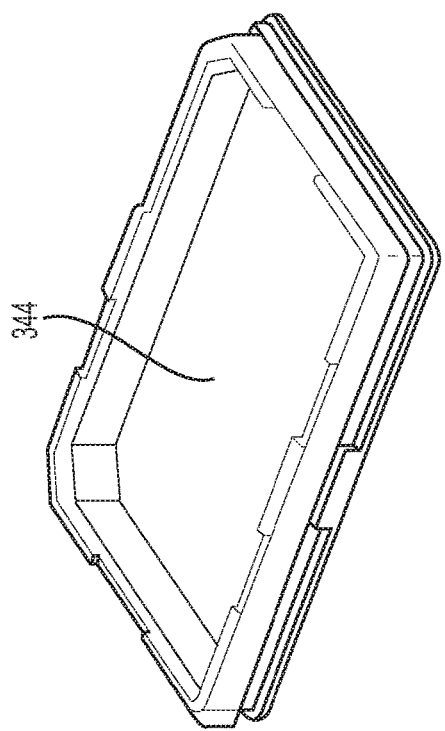
FIG. 29B is a close-up perspective view of a cell processing tray according to some implementations.
Figure 29A:
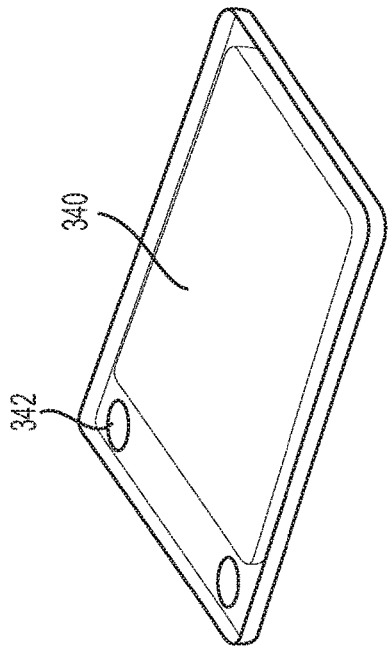
FIG. 29A is a close-up perspective view of a transport tray according to some implementations.
Figure 29D:
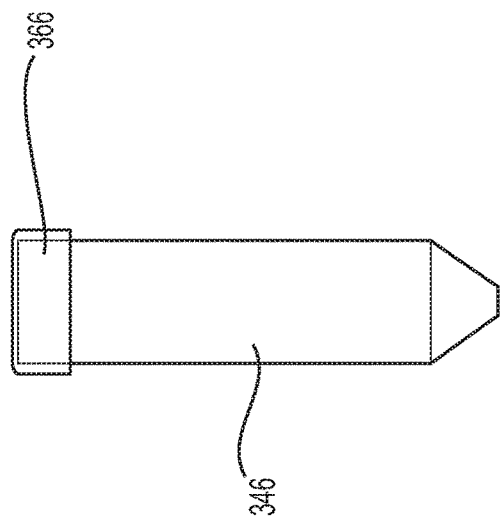
FIG. 29D is a close-up perspective view of a centrifuge tube according to some implementations.
Figure 29C:
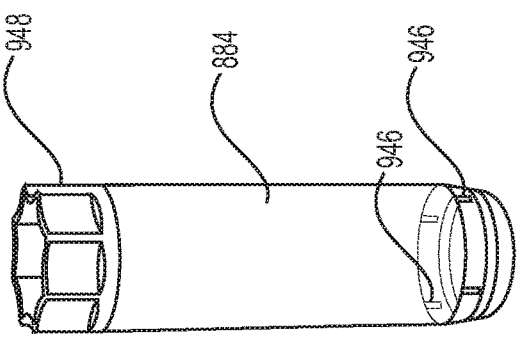
FIG. 29C is a close-up perspective view of a storage tube according to some implementations.

The ACPS 100 is configured for the robotic handling of various types of cell processing containers 314 including trays, flasks, bottles, tubes and vials. Examples of trays include cell processing trays 344 such as Omni™ trays shown in FIG. 29B, cell processing trays 344' shown in FIG. 31A to 31D, transport trays 340 such as Petaka™ trays shown in FIG. 29A, and the like. Examples of tubes include centrifuge tubes 346 (for example, Falcon™ tubes shown in FIG. 29D), storage tubes 884 (for example, Micronic™ tubes as shown in FIG. 29C), and the like. The storage tubes 884 are also referred to herein as vials 884 or cryovials 884 when used for storage and transport in cryogenic conditions. Examples of flasks include spinner flasks (not shown), multilayer flasks 350 (Millipore™ Millicell HY 3-layer cell culture flask T-600) shown in FIG. 20A, and the like. Examples of cell processing bottles include roller bottles (not shown) and the like. It should be understood that the above examples are not intended to be limiting and the term cell processing containers 314 as used herein could encompass any type of containers which are known to be used for storing, treating, expanding and transporting batches. The ACPS 100 is also configured for the robotic handling of various types of reagent containers such as the reagent bottle 836 shown in FIG. 16.

Figure 4:
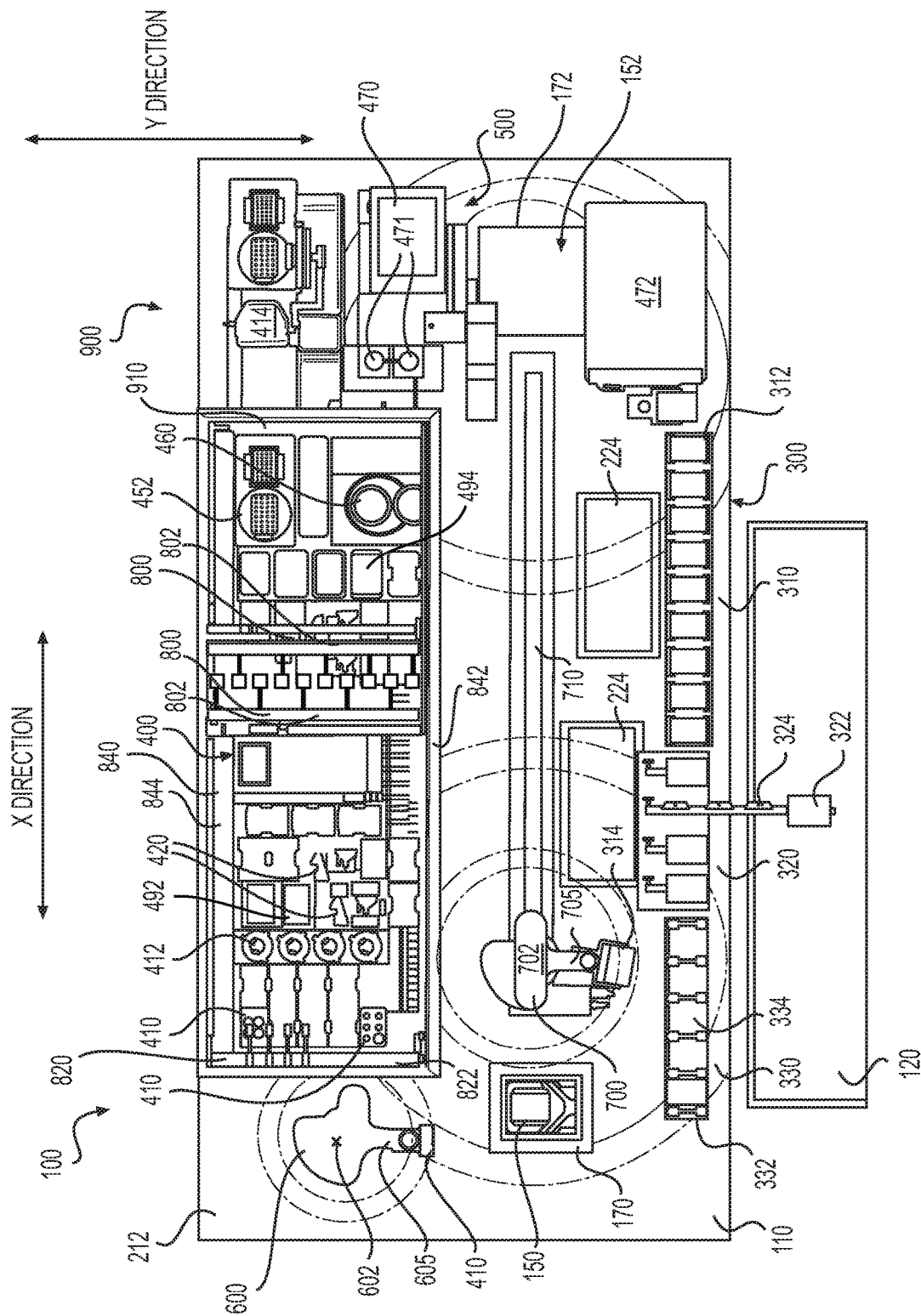
FIG. 4 is a top plan view of components housed within the enclosure, the bottom wall of the enclosure and the isolator of FIG. 3A.
Figure 5:
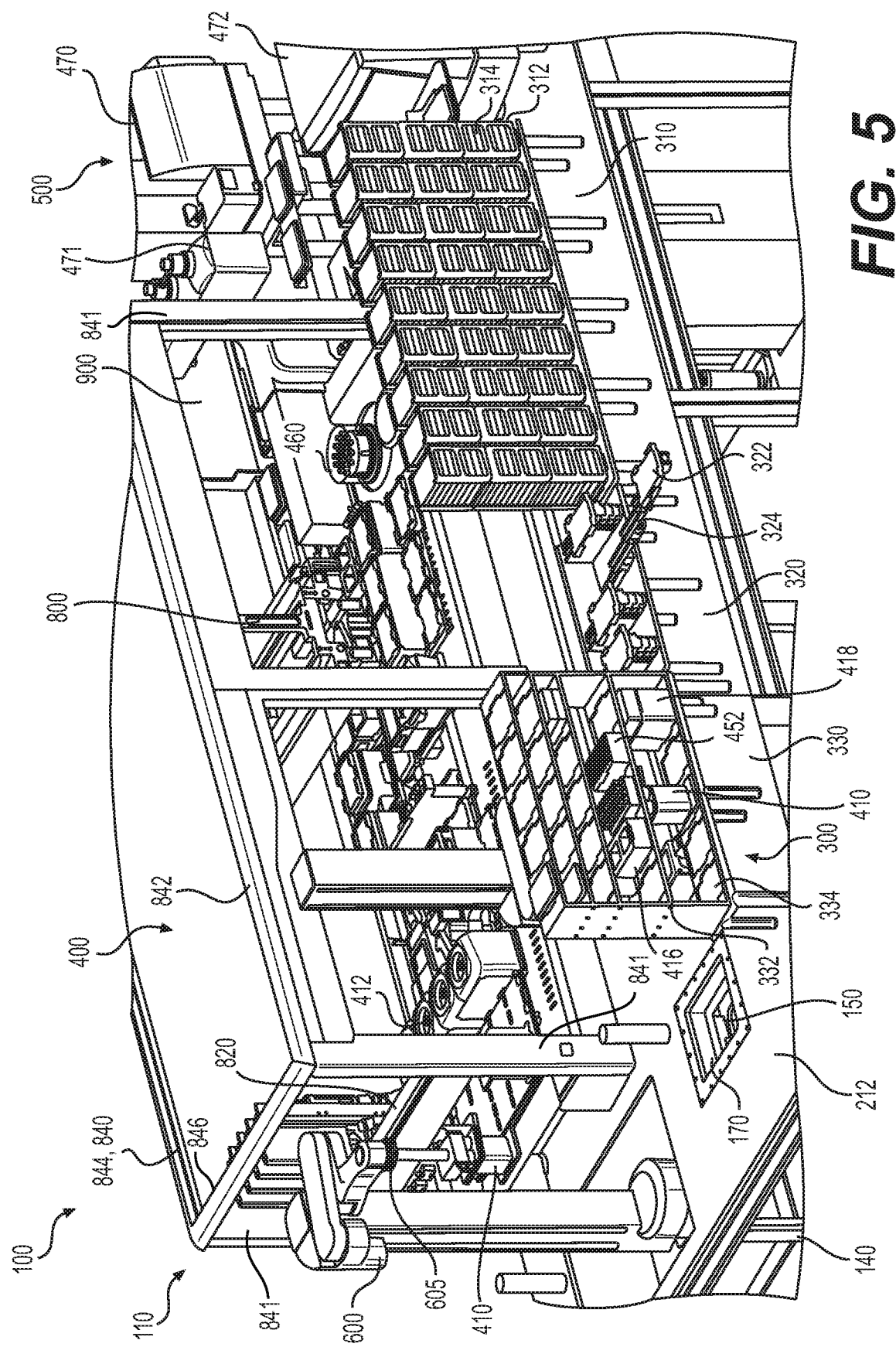
FIG. 5 is a close up perspective view, taken from a front and right side, of some of the components housed within the enclosure of FIG. 4.

As can be seen best in FIGS. 4 and 5, the storage area 300 includes a left storage module 310, a central storage module 320, and a right storage module 330.

In the illustrated example stacking arrangement, the left storage module 310 holds stacks of carriers 312 for containers used for processing cells as can be seen best in FIG. 6. The left storage module includes a 9×3 array of carriers 312, each carrier 312 being capable of holding eight cell processing trays 344, 344' (FIG. 29B). The stackable carriers 312 allow the multiple cell processing trays 344 to be moved and stored together. The ACPS 100 also provides for cell processing containers 314 and reagent containers such as reagent bottles 836 to be stored at, or subject to, temperatures below −100° C. to +100° C., and be kept in the dark if needed.

In the illustrated example stacking arrangement, the right storage module 330 is configured to hold labware for cell processing as can be seen best in FIG. 6. The right storage module 330 includes five shelves 332 for storing labware with each shelf having five discrete positions 334 or trays 334 for holding labware. The labware stored in the shelves 332 of the right storage module 330 can be accessed (removed from shelf or placed thereon) in a random access manner. The vertical spacing between the consecutive shelves 332 of the right storage module 330 is not uniform in order to provide storage for labware of different heights.

In the example stacking arrangement seen best in FIGS. 4, 5, 8A and 8B, the central storage module 320 includes four transfer trays 322 mounted at one end of a telescoping guide rails 324. The transfer trays 322 are configured to support objects (cell processing trays, other labware, chemical reagent containers, and the like) on the upper surface of the transfer tray 322. The transfer trays 322 are located just rearward of the isolator connection port 220 when in their "home" position, and can be moved into the isolator 120 by extending the telescoping guide rails 324. The transfer trays 322 can be loaded or unloaded in the isolator 120. In the illustrated implementation, the transfer trays 322 are manually pulled into the isolator 120 by a user extending their arm into the glove port. The guide rail 324 could alternately be mechanically actuated by a cable and pulley system (not shown) to extend the guide rails 324 and thereby to move the transfer tray 322 forward and rearward. The outer end (end that extends in and out of the enclosure 110) of each guide rail 324 is provided with a bracket 326 having an aperture to facilitate gripping of the outer end by a hook or by another implement for pulling the guide rail out 324 and pushing the guide rail in to the enclosure 110. The inner end of the guide rail 324 is disposed in front of a wall having a magnet 328 and a positive stop rail to detect when the guide rail 324 is retracted completely and the transfer tray 322 is in its "home" position. A switch 329 (an adjustable position single pole double throw in the illustrated implementation) connected to the magnet is used to light a green LED 325 when the transfer tray 322 is in its home position (guide rail 324 retracted completely), and to light a red LED 327 when the transfer tray 322 is out of its home position (guide rail 324 extended or improperly seated). When disposed in the home position inside the enclosure 110, the transfer tray 322 can be accessed by the robotic arm 705 of the robotic module 700.

In the illustrated implementation, the transfer trays 322 can be extended out into the isolator 120 by a distance of 400 mm from their home position in the enclosure 110. The transfer trays 322 are mounted so as to be disposed spaced apart from a neighboring transfer tray by a distance of 125 mm in order to provide sufficient clearance for a gripper member of a robot arm to handle objects placed in the tray 322.

It should be understood that the storage area 300 could be configured differently and could include different kinds of storage modules than that shown herein.

The enclosure 110 includes a raised platform 910, referred to hereinafter as a deck 910. The sample preparation and processing area 400 and the harvesting area 900 are generally provided on the deck 910. The deck 910 includes various sample preparation and processing modules and harvesting modules which will now be described with reference to FIGS. 4 to 31D.

The deck 910 is constructed in a modular manner having thereon multiple stations with similar footprints. In the illustrated implementation, the stations are configured for objects having a footprint conforming to an SBS standard format. For example, some of the stations have a tray 404 (FIGS. 9 to 11A) defining a slot for receiving objects having the SBS footprint. The deck 910 also includes stations for objects that are not of SBS format. It is contemplated that some or all of the stations of the deck 910 could be configured for a different format, and/or that deck 910 could be configured differently than as shown herein.

Figure 9:
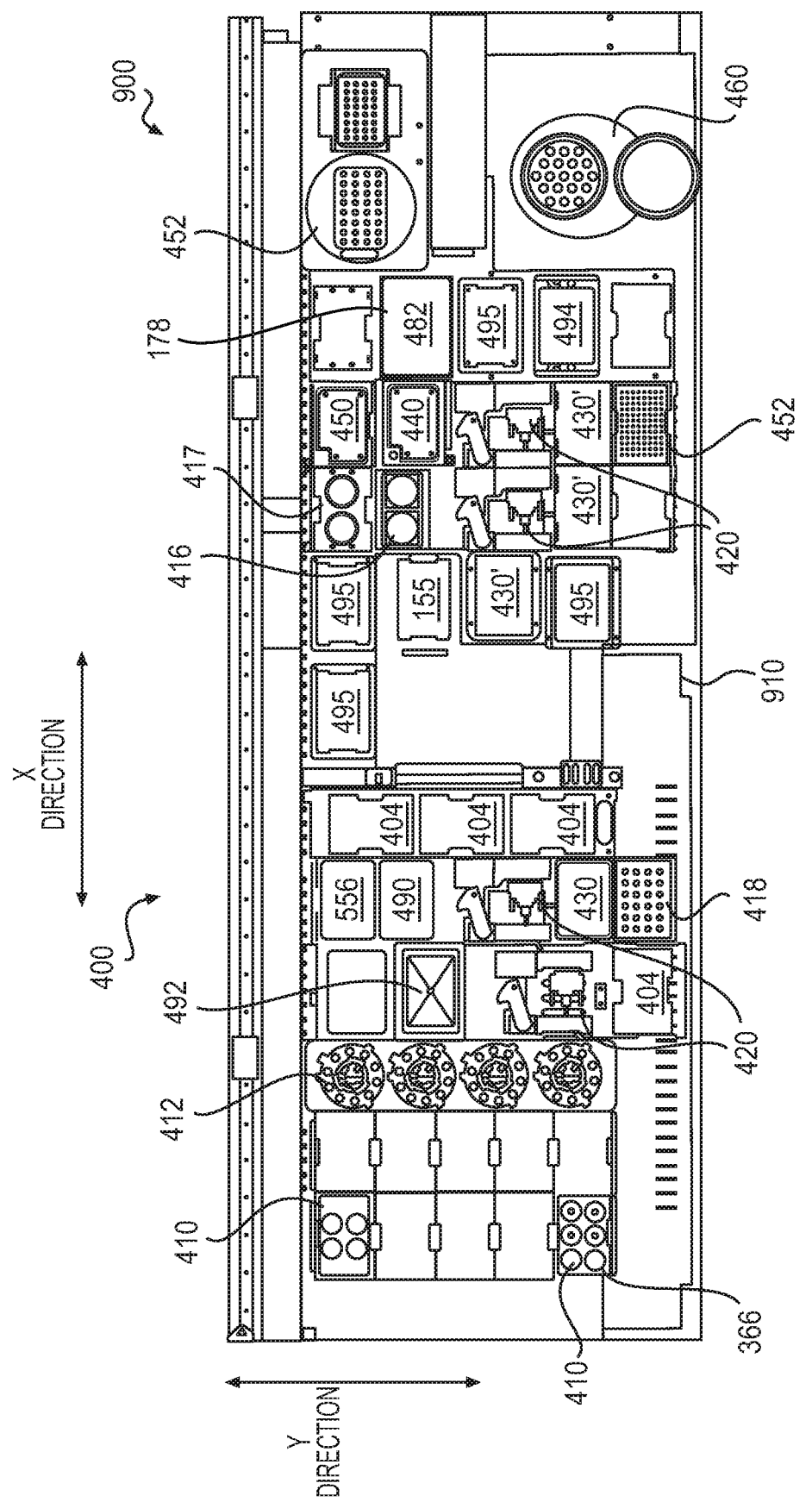
FIG. 9 is a top plan view of a deck housed within the enclosure of FIG. 3A.
Figure 16:
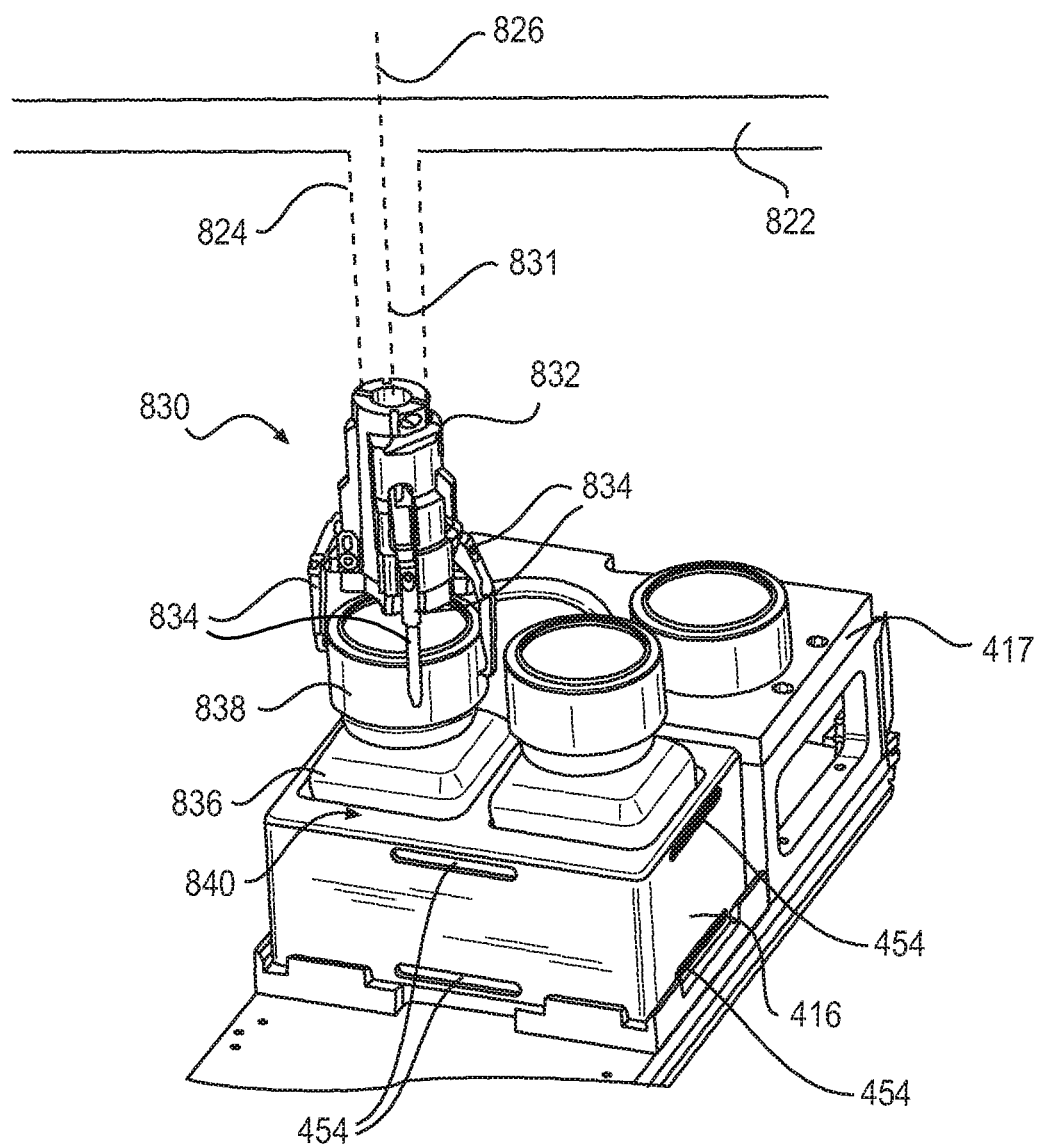
FIG. 16 is a perspective view, taken from a front, top and left side, of another robotic arm having a decapper and shown decapping a reagent container.

A number of holders for different types of containers such as vials, tubes, reagent containers and the like are positioned at various stations on the deck 910. As an example, a centrifuge tube station includes centrifuge tube holders 410 (FIGS. 4, 5 and 7) for centrifuge tubes 346 (e.g., Falcon™ centrifuge tubes in the illustrated implementation of the ACPS 100). In the illustrated implementation of the ACPS 100, the centrifuge tube stations with the centrifuge tube holders 410 are located on the right side of the deck 910 near the centrifuge access port 170. Each centrifuge tube holder 410 has a body with a plurality of receptacles with each receptacle being configured to receive a centrifuge tube 346 therein. The base of the holder 410 is shaped to be complementary to a SBS format slot. The holder 410 is configured such that the spacing between neighboring receptacles is large enough to allow clearance for the centrifuge tube 346 to be handled by a robotic arm having a tube gripper, for example, for placing the centrifuge tube in the centrifuge 150. As further examples, with reference to FIG. 9, a pipette tip holder 418 holding pipette tips and a vial holder 452 holding vials 884 (FIG. 14) are found at other stations of the deck 910. Holders (for example, holders 418, 452) are also provided with lids, for example the lid 419 for the pipette tip holder 418 as can be seen in FIG. 7. As another example, as best seen in FIGS. 9 and 16, the deck 910 includes a reagent container station having a reagent container holder 416 for two reagent containers in the form of bottles 836 and a reagent bottle cap holder 417 for holding two reagent container caps 838 when the cap 838 is removed from the reagent container 836.

The deck 910 includes several decapping modules configured to remove the cap from a container such as a centrifuge tube.

With reference to FIGS. 4 and 16B, in the illustrated implementation of the ACPS 100, four centrifuge tube decapping modules 412 are located on a left side of the centrifuge tube holders 410. In the illustrated implementation, the centrifuge tube decapping module 412 is a Hamilton™ STAR Liquid Handler Decapper Module. Each centrifuge tube decapping module 412 is configured to hold a centrifuge tube 346 and loosen the cap 366 of the centrifuge tube 346 before the cap 366 is completely unscrewed by a robotic decapping gripper 830 (described below). Each centrifuge tube decapping module 412 has a body defining a generally cylindrical receptacle for receiving a centrifuge tube 346. Three gripper wheels extend into the receptacle to selectively engage the cap 366 of a tube 346 disposed in the for loosening or tightening the cap 366 of the centrifuge tube 346. Once loosened, the cap 366 of the centrifuge tube 346 can be completely unscrewed and removed from the centrifuge tube 346 by a decapping gripper (for example the decapping gripper 830 described below in further detail) that can grip and rotate the cap 366 as well as move the cap 366 in the vertical direction (Z-direction) to separate the cap 366 from the centrifuge tube 346 held in the decapping module 412. The decapping gripper 830 can also recap the cap 366 on a centrifuge tube 346. In the illustrated implementation, the centrifuge tube decapping module 412 also includes a tube presence sensor at the bottom of the receptacle for detecting the presence of a tube in the receptacle. The control unit 1000 is connected to the tube presence sensor for controlling decapping operations of the centrifuge tubes 346. It is contemplated that the decapping module 412 could be configured to hold and loosen the caps of tubes and containers other than centrifuge tubes 346. It is contemplated that the ACPS 100 could include other types of decapping modules 412 from the one shown in here.

As mentioned above, the ACPS 100 also includes one or more robotic arms 824 (FIG. 16) provided with decapping grippers 830 for decapping or recapping (by respectively unscrewing and rescrewing) the caps 366 of the centrifuge 346 tubes, as well as other containers such as reagent bottles 836. In the illustrated implementation, the decapping grippers 830 (described below in further detail) unscrew caps and covers from the containers as well as move the containers across the deck 910. In the illustrated implementation, each decapping gripper 830 is also associated with a barcode scanner (not shown) for reading identification labels of containers such the centrifuge tubes 346 which are being decapped or recapped. The barcode scanner is connected to the control unit 1000 for providing the scanned information thereto.

Figure 30B:
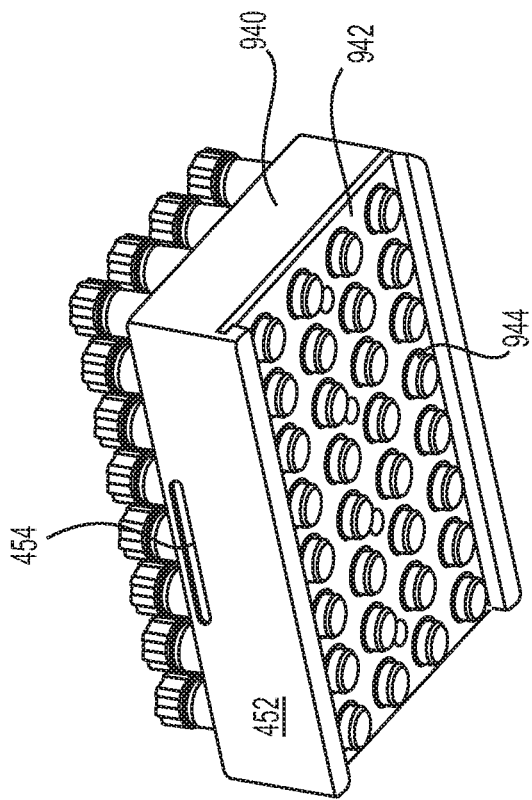
FIG. 30B is a perspective view, taken from a front, bottom and right side of the holder of FIG. 30A.

Another decapping module 414 (a Hamilton™ Labelite I.D. Decapper Part No. 193608 in the illustrated implementation) is located on a left end of the deck 910 near the quality control area 500 for decapping and recapping smaller vials such as the vials 884. The decapping module 414 includes a barcode scanner at the bottom of the unit for reading barcodes on the vials for tracking during cell processing. With reference to FIGS. 30B and 29C, the vial holder 452 is configured for holding vials 884 during decapping and recapping of the vials 884 by the decapping module 414. As can be seen in FIG. 30B, the holder 452 is made of a two-piece construction including a top portion 940 forming a housing with openings or receptacles for supporting an array of vials 884 and a bottom portion 942 in the form of a sheet metal forming the bottom of the housing. It is contemplated that the holder 452 could be constructed as a single piece. The bottom portion 942 has an array of openings 944, each opening 944 being configured to receive therethrough the bottom portion of the vial 884 which can be tagged with a barcode. The barcodes for the vials 884 can thus be read without removing the vial 884 from the holder 452. In addition, the bottom portion 942 has anti-rotation features in the form of notches that are complementary to the projections 946 near the bottom of the tube 884 (FIG. 29C). The notches in the bottom portion 842 engage the projections 946 of the tube 884 to prevent rotation of the tube 884 while the cap 948 is being screwed or unscrewed by the decapping module 414.

With reference to FIGS. 13 to 15, the ACPS 100 further includes a small tube gripper 812 configured to pick up individual microtubes from, for example, a microtube holder for an array of microtubes, and to move the picked-up microtube across the deck 910.

The various holders for tubes, bottles, pipettes, plates, etc. are specially designed to allow their manipulation (such as transport, decapping and capping) by universal gripping by several types of robotic arms. For example, some of the holders and containers (such as the vial holder 452 of FIG. 30A) are provided with an elongated notch 454 on two opposing sides to facilitate gripping by a robotic arm. The notches 454 help the robotic arm to lock onto the holder or container to prevent slipping of the holder/container (for example the vial holder 452) from the robotic arm.

A number of the stations or holders are positioned in specific locations to improve efficiency while performing various steps of cell processing. For example, two incubator transfer stations 153 (FIG. 4) for cell processing trays are located near the incubator 152 so that the robotic module 700 can drop-off one cell processing container 314 destined for the incubator 152 and pick-up another cell processing container 314 in one pass. Similarly the robotic arm of the incubator 152 can drop-off one cell processing container 314 and pick-up another cell processing container 314 in one pass back to the incubator 152 such that the incubator door selectively closing the port 172 is opened only once instead of twice. The robotic module 700 carries a first cell processing container 314 towards the incubator 152 and places the first cell processing container 314 on a first incubator transfer station 153 adjacent the incubator 152. An incubator robotic arm (not shown) inside the incubator 152 moves a second cell processing container 314 from the inside of the incubator 152 to a second incubator transfer station 153 adjacent the incubator 152 and retrieves the first cell processing container 314 from the first incubator transfer station 153 to move it inside of the incubator 152. The robotic module 700 then carries the second cell processing container 314 from the second incubator transfer station 153 to a station on the deck 910. In the absence of two incubator transfer stations 153, the first cell processing container 314 would be moved from the deck 910 to the incubator transfer station 153 (by the robotic module 700) and then from the incubator transfer station 153 into the incubator 152 (by the incubator robotic arm) in a first pass when the incubator door across the port 172 is opened a first time. A second pass with the incubator door across the port 172 being opened a second time would be required where the second cell processing container 314 would be moved from the incubator 152 to the incubator transfer station 153 (by the robotic arm) and then from the incubator transfer station 153 to the deck 910 (by the robotic module 700) in a second pass when the incubator door across the port 172 is opened a second time. In the illustrated implementation, each incubator transfer station 153 is provided with an incubator transfer station sensor for detecting when a container is positioned on the station. The control unit 1000 is connected to the incubator transfer station sensor for controlling cell processing steps involving the incubator 152.

With reference to FIGS. 4 and 10A to 11D, the ACPS 100 includes several modules for adding liquid, for example, cell culture media and/or other reagents, to cell processing containers 314.

Figure 10B:
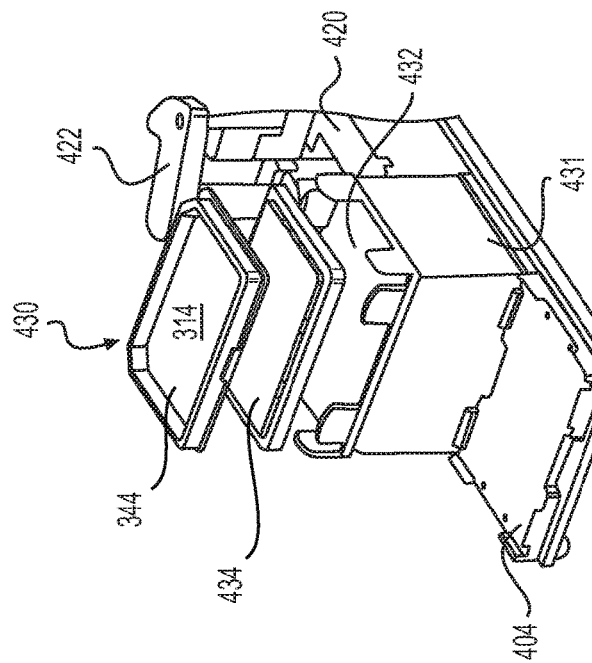
FIG. 10B is a close-up perspective view, taken from a front, top and left side, of the magnetic tilt module of FIG. 10A.
Figure 10D:
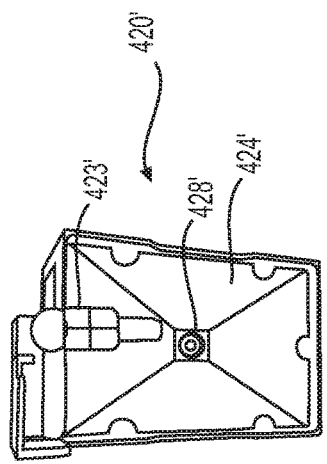
FIG. 10D is a perspective view of the media fill station of FIG. 10C with the dispensing tip in a fill position.
Figure 10A:
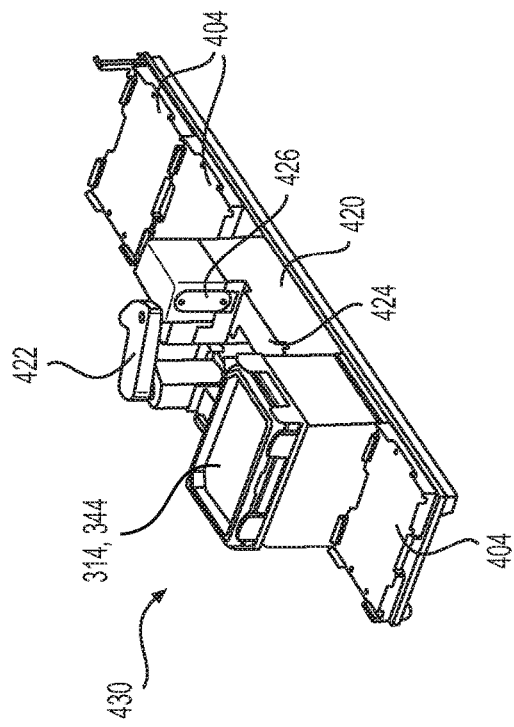
FIG. 10A is a perspective view, taken from a front, top and left side, of a portion of the deck 910 of FIG. 9 showing a media fill station and a magnetic tilt module.

With reference to FIGS. 4, 10A and 11A, several media fill stations 420 are provided on the deck 910. In one implementation, the media fill station 420 is connected via a media fill line to a media supply container (not shown) placed inside the refrigerator 160. Media stored in the media supply container is pumped to the media fill station 420 by a pump connected to the media fill station 420 and/or the media supply container. In some implementations, media can be heated in the media fill lines connecting the media fill stations to the media supply containers. With reference to FIGS. 4, 10A and 11A, the media fill station 420 includes a base 424 for supporting a cell processing container 314 and a movable robotic arm 422 having a dispensing tip. The robotic arm 422 is movable between a fill position where the dispensing tip is disposed over the base 424 for dispensing media into a cell processing container 314 placed on the base 424 to a load position (as seen in FIGS. 10A and 11A) where the dispensing tip is moved away from the base 424 to allow for loading and unloading of the cell processing container 314 onto the base 424. In the loading position, the dispensing tip and the robotic arm 422 allow unobstructed loading and unloading of the cell processing container 314 from the base 424.

In some implementations, the media fill station 420 has a sensor 426 to sense the presence of a cell processing container 314 on the base 424, and/or to sense that the cell processing container 314 is positioned correctly on the base 424 before dispensing media into the cell processing container 314. In some implementations, the media fill station 420 has a liquid level sensor for detecting the level of liquid in the cell processing container 314 positioned on the base 424 so as to stop dispensing liquid in the cell processing container 314 when the appropriate liquid level is reached.

Figure 10C:
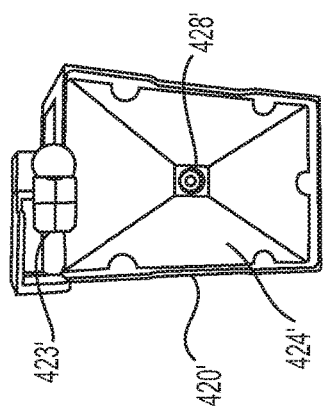
FIG. 10C is a perspective view of another implementation of a media fill station with a dispensing tip in a load position.

With reference to FIGS. 10C and 10D, in another implementation, a media fill station 420' has a base 424' with an overfill and spill protection feature as can be seen in FIG. 10C. A drain hole 428' is defined in the center of the base 424' with the surface of the base 424' sloping downwards from the edges of the base 424' towards the drain hole 428'. The drain hole 428' is connected to the waste receptacle 156 or 158 by fluid conduits. The dimensions of the base 424' are slightly larger than the dimension of the cell processing container 314 for which the media fill station 420 is configured so that any liquid spilling out of the cell processing container 314 fall into the base 424' and is directed to the drain hole 428' by the sloping surface of the base 424'. From the drain hole 428', the liquid is then drawn away into the liquid waste receptacle 158. The base 424' may further include a lip around the periphery to contain the liquid spilling out of the cell processing container 314 within the base 424'. The dispensing tip 423' can be rotated by 90° between a load position (FIG. 10C) where the dispensing tip 423' is moved away from the base 424' to allow for loading and unloading of the cell processing container 314 onto the base 424' to a fill position (FIG. 10D) where the dispensing tip 423' is disposed over the base 424' for dispensing media into a cell processing container 314 placed on the base 424'.

In the illustrated implementation, the media fill stations 420, 420' are configured for cell processing containers 314 in the form of cell processing trays 344, 344' and flasks 350, but it is contemplated that the media fill stations 420, 420' and/or the tilt modules 430, 430', 440 could be configured for containers 314 other than trays 344, 344' and flasks 350 (for example, spinner flasks, roller bottles and the like). It is also contemplated that the media fill station 420 could be configured for filling of reagent bottles such as the reagent bottle 836. The shape of the dispensing tip can also be configured for specific types of dispensing and spray patterns or for specific types of cell processing containers 314 or reagent bottles 836.

A media fill station 420 configured for filling of the reagent bottle 836 allows the reagent bottle 836 to be refilled directly from a reagent supply container stored outside the enclosure 110 without removal of the reagent bottle 836 from the enclosure 110. Reagent filled into the reagent bottle 836 can then be pipetted by a robotic pipettor 814 into a cell processing container 314 as needed during cell processing, cell harvesting or cell preparation. Media fill stations 420 configured for direct refilling of reagent bottles 836 from a reagent supply container stored outside the enclosure 110 eliminate the need for transferring reagent bottles 836 to and from the enclosure 110 for refilling, discarding reagent bottles 836 into waste 156 and introducing new reagent bottles 836 into the enclosure 110, and also reduce the need for storing in the enclosure 110 multiple reagent bottles 836 for the same reagent.

As will be described below with reference to FIG. 19, in the ACPS 100 of the illustrated implementation, one or more of the nine robotic arms 804 of the robotic module 800 is configured to be a continuous flow reagent dispenser 818 which is directly connected, via a peristaltic pump, to a reagent supply container stored inside or outside the enclosure 110, for example in the isolator 120 or in the refrigerator 160 connected thereto. The reagent dispenser 818 serves to dispense larger volumes of fluid in a continuous manner without having to stop and refill the pipette tip with fluid to be dispensed. The reagent dispenser 818 can therefore also be used to directly refill reagent bottles 836 from the reagent supply container stored outside the enclosure 110.

Media fill stations 420 and reagent dispensers 818 configured for direct refilling of reagent bottles 836 from a reagent supply container stored outside the enclosure 110 eliminate the need for transferring reagent bottles 836 to and from the enclosure 110 for refilling and also reduce the need for storing in the enclosure 110 multiple reagent bottles 836 for the same reagent.

It is contemplated that containers stored in the isolator 120 and/or refrigerator 160 from which media is directly pumped to media fill stations 420 and/or other dispensers (such as robotic dispenser 818) could be provided with a liquid level sensor connected to the control unit 1000 and configured for detecting liquid level in the container. For example, the liquid level sensor could be configured to detect when the liquid level is below a threshold level and to send a signal to the control unit to alert the control unit 1000 for replacement of the container. It is contemplated that these containers can also be stored in the enclosure 110.

With reference to FIGS. 10A, 10B and 11A to 11C, the ACPS 100 includes several tilt modules 430', 440 and magnetic separation modules 430 for facilitating effective removal of existing cell culture media from a cell processing container 314. The tilt modules 430, 430' and 440 also serve to hold the cell processing container 314 in a tilted position for adding or removing cell culture media or other solution (for example, trypsin) therein.

For example, FIGS. 11A to 11D show a tilt module 440 configured for transport trays 340. The upper surface of the transport trays 340 have, near one corner, an aperture sealed by a rubber insert 342 (best seen in FIG. 29A) which has to be pierced at a particular angle to inject media or cell culture into the transport tray 340. The tilt module 440 tilts the transport tray 340 such that a tip moving in a vertical direction (normal to the horizontal bottom wall 212) of the enclosure 110 contacts the transport tray 340 at the desired angle for piercing the insert 342. The tilting of the transport tray 340 enables efficient injection of cell culture into the transport tray 340 without modification of the robotic modules which are configured to move in the vertical and horizontal directions. The tilt module 440 includes a base 442, a pivot plate 444 pivotably connected to the base 442 and an adaptor 446 for retaining the transport tray 340 on the pivot plate 444 while the contents of the transport tray 340 is being tilted and when a tip inserted through the insert 342 is removed. In the illustrated implementation, the adaptor 446 is a generally rectangular frame shaped to extend along the periphery of the upper surface of the transport tray 340 except near the insert 342 where the adaptor 446 skirts inwardly away from the periphery and the insert 342. It is contemplated that the adapter 446 could have a rectangular frame shaped that follows the entirety of the periphery of the upper surface. It is also contemplated that the adapter 446 could have a shape other than that shown herein. The adaptor 446 is placed on the upper surface of the transport tray 340 positioned on the tilt module 440 before piercing the aperture 342 with a tip for injecting liquid into the transport tray 340. Once the transport tray 340 has been filled, the tip is withdrawn from the insert 342. The adaptor 446 is made of a suitable material so as to have a sufficiently large weight to prevent the lifting of the transport tray 340 during withdrawal of the tip from the aperture 342. The tilt module 440 is communicatively coupled to the control unit 1000 for controlling the pivoting of the pivot plate 444. In the illustrated implementation, the pivot plate 444 is configured to tilt by an angle of 30°. As can be seen in FIG. 11A, an adaptor station 450 for holding an adaptor 446 is disposed adjacent the tilt module 440 for convenience and efficiency. The adaptor 446 is placed on the adaptor station 450 when not being used on a transport tray 340 positioned on the tilt module 440.

With reference to FIGS. 10A and 10B, the ACPS 100 includes another tilt module in the form of a magnetic separation module 430. The magnetic separation module 430 includes a base 431 having a top plate 432 pivotably connected to the base 431 and a magnetic plate 434 disposed on the top plate 432. The base, 431, the top plate 432 and the magnetic plate 434 are configured to support a cell processing container 314 on its upper surface. In the illustrated implantation, the base, 431, the top plate 432 and the magnetic plate 434 are configured to support a cell processing container 314 in the form of a cell processing tray 344, 344' but it is contemplated that the magnetic separation module 430 could be configured for other types of cell processing containers 314, such as the flask 350 and transport container 340. The top plate 432 and the magnetic plate 434, which are shown in a horizontally extending position in FIGS. 10A and 10B, can be tilted so as to be disposed at an angle with respect to the horizontal upper surface of the base 431. In the illustrated implementation, the top plate 432 is configured to tilt up to an angle of 10° with respect to a horizontal plane but it is contemplated that the maximum tilt angle could be other than 10°.

The magnetic separation module 430 can be used for cell culture purification or cell separation or selection, or magnetic trasnfection. As an example, an antibody having an iron or other magnetic core can be used on either the desired cells or the undesired cells. The antibody can be selected for its ability to target either the desired cells or the undesired cells. The selected antibody is added to a cell processing container 314 containing the non-adherent cell culture (e.g., after trypsinization, or cell suspension culture) with the desired and undesired cells. When the cell processing container 314 is placed on the magnetic plate 434 of the magnetic tilt module 440, the cells tagged with the magnetic cores remain fixed to the bottom of the cell processing container 314 while the untagged cells without the magnetic cores remain in solution in the media. While the cell processing container 314 is placed on the magnetic plate 434 preferably in the tilted position, the media containing the untagged cells without the magnetic cores is aspirated with a robotic aspirator 812 (FIG. 15) or with a robotic pipettor 814 (FIG. 19) to remove the untagged cells from the cell processing container 314 while keeping the tagged cells tagged in the cell processing container 314. The tagged cells remaining in the cell processing container 314 could then be resuspended in new media (by adding new media to the cell processing container 314 using one of the media fill stations 420) for further processing if desired, or discarded if the tagged cells are the undesired cells. Alternately, in the case where the untagged cells are the desired cells, the pipetted media containing the untagged cells can be dispensed to another cell processing container 314 for further processing, etc. The ability to tilt the cell processing container 314 while aspirating the media from the cell processing container 314 allows for more efficient and thorough removal of media containing the untagged cells from the cell processing container 314, which allows for more efficient and thorough separation of tagged and untagged cells. The magnetic separation module 430 can also be used for other purposes such as magnetic transfection of adherent cells (e.g., Magnetofectamine™, Oz Biosciences), where e.g., a DNA plasmid in an iron core containing lipid is pulled down into the cell by the action of the magnet below.

The ACPS 100 of the illustrated implementation, also includes a tilt module 430' (FIGS. 9 and 11A) which is similar to the magnetic separation module 430 described above except that the magnetic plate 434 is omitted. The tilt module 430' is used to hold a cell processing container 314 in a tilted position during aspiration for efficient removal of liquid therefrom.

The positioning of a media fill station 420 adjacent a tilt module 440, 430' and/or a magnetic separation module 430 facilitates addition of fresh cell culture media and/or other reagents to the cell processing container 314 after removal of existing cell culture media from the cell processing container 314. Similarly, a reagent container holder 416 with reagent bottles 836 can also be placed adjacent a tilt module 440 (as seen in FIG. 9) and/or a magnetic separation module 430 to facilitate addition of fresh cell culture media and/or other reagents to the cell processing container 314 after removal of existing cell culture media from the cell processing container 314.

With reference to FIGS. 31A to 31D, another implementation of a cell processing tray 344' similar to the cell processing tray 344 (FIG. 29B) will now be described. The cell processing tray 344' has a base 510 and four walls 512, 514, 516, 518 extending upwards therefrom to define an interior volume 520 for containing the batch being processed. The base 510 is configured to have a SBS format footprint so that it can be used on the SB format stations of the ACPS 100 such as the tilt modules 430, 430' and the like. Two opposing walls 512, 516 are longer than the other two opposing walls 514, 518.

A linear notch 454 defined on each side of the base 510 below the corresponding wall 512, 514, 516, 518. The notches 454 allow the cell processing tray 344' to be gripped more securely by a robotic gripper such as the plate gripper 816. Opposing walls 512, 516 or 514, 518 of the cell processing tray 344' are held between the two arms of the gripper 816 such that each gripper arm is in contact with one of the opposing walls 512, 516 or 514, 518 and each gripper arm engages the notch 454 formed on the corresponding wall 512, 514, 516, 518 contacting the gripper arm. The cell processing tray 344' is thus held securely between the arms of the gripper 818 without risk of slippage. It is contemplated that the cell processing tray 344' could have a cover similar to the cover of the cell processing tray 344 of FIG. 29B and that each side wall of the cover could also have a notch similar to the notch 454 to enable secure gripping of the cover by the robotic gripper 816. It is also contemplated that the notch 454 could have a different configuration that matches the same or a different configuration of robotic gripper 816. It is contemplated that the cell processing tray with notches 454 could also contain several independent wells each having their own interior volumes, such as a 96-well plate.

The inner surface of the base 510 forming a floor 524 of the interior volume 520 is generally flat. The inner surfaces of the longer walls 512, 516 are also linear and extend parallel to each other. The longer walls 512, 516 have inner surfaces that extend perpendicular to the flat floor 524. A longitudinal centerplane 526 can be defined extending perpendicular to the floor 524 and equidistant between the inner surfaces of the walls 512, 156. A lateral centerplane 528 can be defined extending perpendicular to the longitudinal centerplane 526 and the floor 524, and bisecting the inner surfaces of the walls 512, 516.

In the illustrated implementation, the inner surface of each of the shorter walls 514, 518 is formed as two angled sections. The walls 514, 518 are mirror images of each other, as such, only the wall 514 will be described herein.

The inner surface of the wall 514 has two portions 530, 532 extending on opposite sides of the longitudinal centerplane 526. The wall portion 530 is not perpendicular to the inner surface of the wall 516 but angled at 110° to the inner surface of the wall 516 when viewed from the top as in FIG. 31A. It is contemplated that the angle could be an obtuse angle other than 110°. The wall portion 530 is also not perpendicular to the floor 524 but angled at an obtuse angle with respect thereto. It is contemplated that the wall sections 530, 532 could be perpendicular to the floor 524. The wall portion 532 is a mirror angle of the wall portion 530 and as such will not be described herein in detail. The wall portions 530, 532 intersect at the longitudinal centerplane to form a liquid collection region 534.

In the illustrated implementation, the wall 518, is a mirror image of the wall 514, having wall sections 530, 532 and a liquid collection region 534 defined near the intersection of the longitudinal centerplane 526 and the wall section 530, 532.

When the cell processing container 344' is placed on a tilt module, such as the tilt module 430', and tilted about a lateral tilt axis 536 (axis normal to the longitudinal centerplane 526), one of the walls 514, 518 is disposed lower that the other one of the walls 514, 518 causing liquid contents of the cell processing container to move towards the lower one of the walls 514, 518. The slope of the wall sections 530, 532 with respect to the inner surfaces of the walls 512, 516 and with respect to the floor 524 allows liquid content of the cell processing tray 244' to collect in the liquid collections region 534 when tilted about a lateral tilt axis. The slope of the wall sections 530, 532 with respect to floor 524 allows a pipette or aspirator tip easier access to the liquid collection region 534. The liquid contents of the cell processing tray 344' collected in the liquid collection region 534 can then be efficiently aspirated therefrom using, for example, the robotic aspirator 812, or one of the robotic pipettors 814.

The cell processing tray 344' is thus configured for improving efficiency of liquid collection therefrom and more throrough removal of liquid therefrom when placed on a tilt module such as the tilt modules 430, 430'.

In the illustrated implementations, each of the shorter walls 514, 518 forms a liquid collection region 534 but it is contemplated that only of the shorter walls 514, 518 could have a liquid collection region. It is contemplated that the liquid collection region 534 could be formed by any one or more of the walls 512, 514, 516, 518.

Figure 20A:
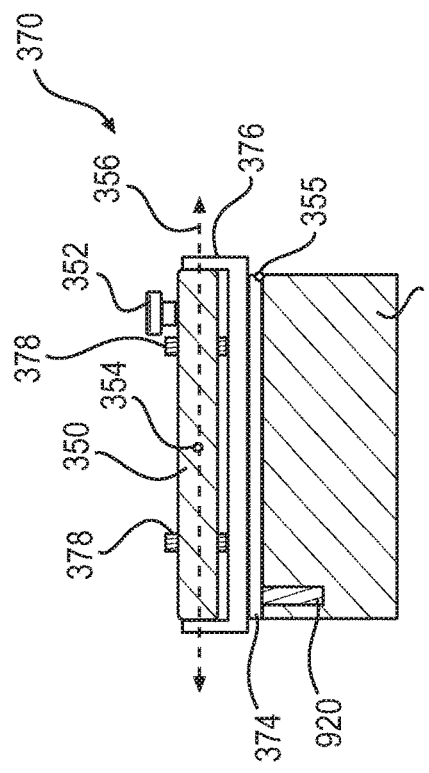
FIG. 20A is a perspective view, taken from a rear, top and right side of, a flask used in the ACPS of FIG. 3A.
Figure 20C:
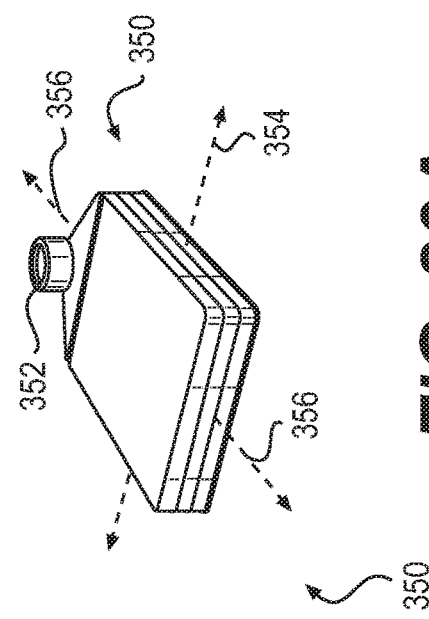
FIG. 20C is a front elevation view of the multilayer flask and multilayer flask tilt module of FIG. 20B with the tilt module being disposed in a tilt position with the multilayer flask being tilted about a longitudinal tilt axis.
Figure 20B:
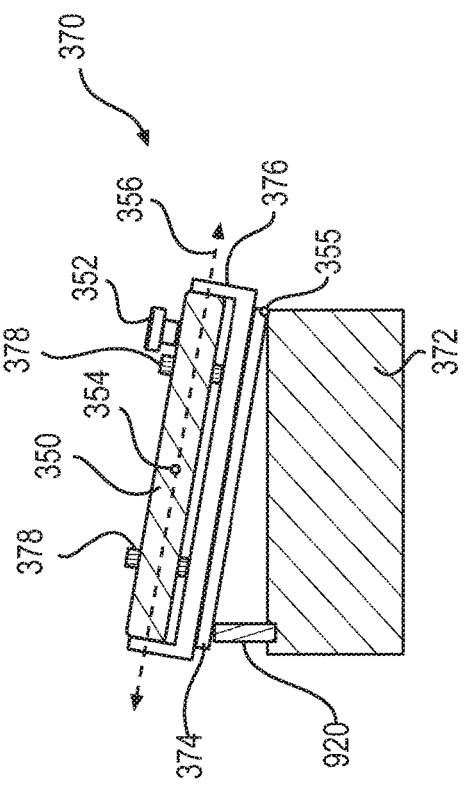
FIG. 20B is a right side elevation view of the flask of FIG. 20A placed on a tilt module with the tilt module disposed in an untilted position.
Figure 20D:
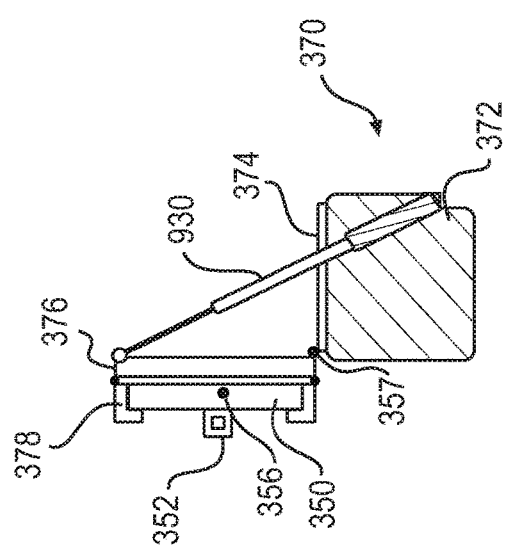
FIG. 20D is a right side elevation view of the flask of FIG. 20A placed on the multilayer flask tilt module of FIG. 20B with the multilayer flask tilt module being tilted about a lateral tilt axis.
Figure 21:
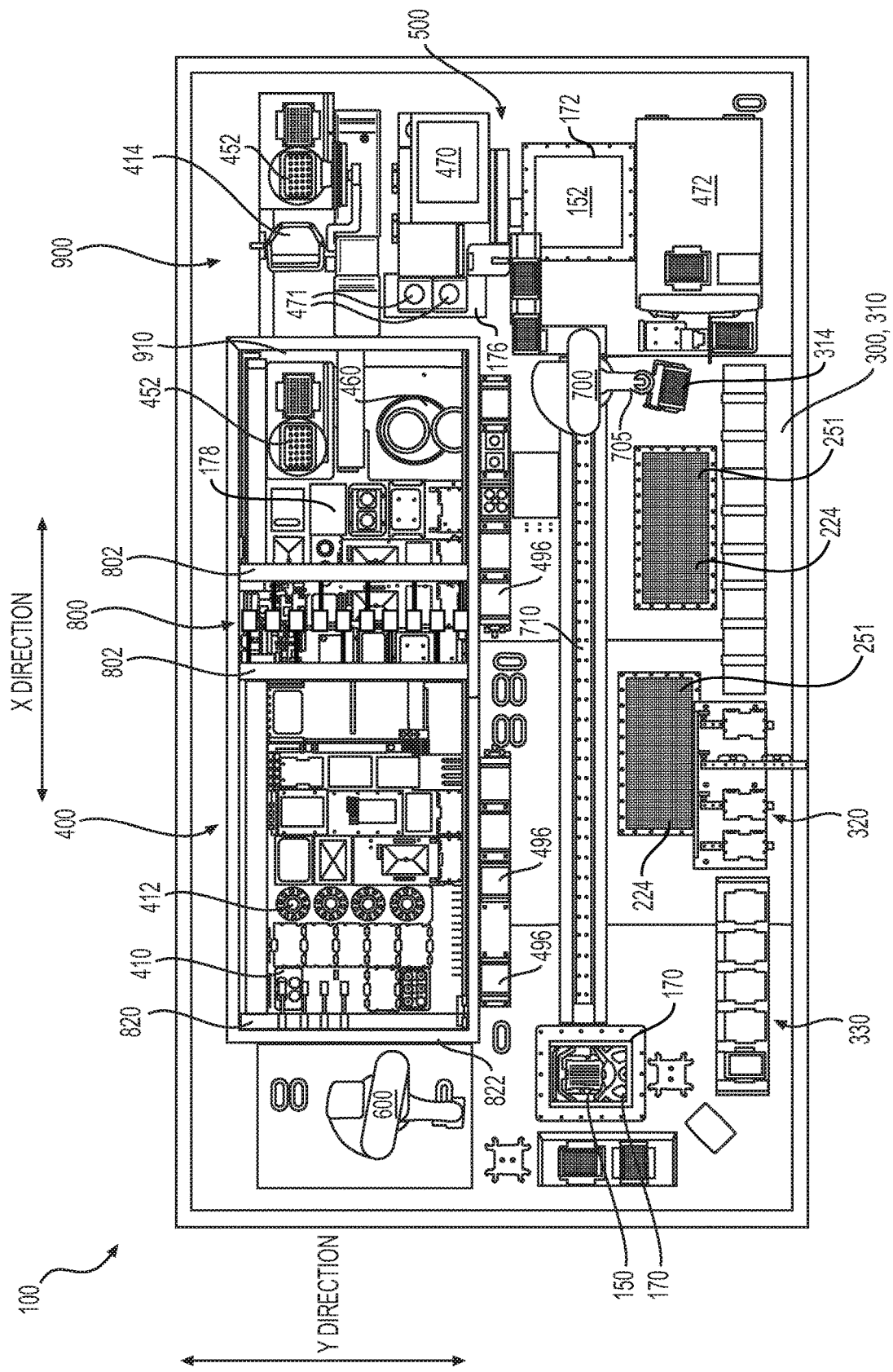
FIG. 21 is a top plan view of another implementation of a deck housed within the enclosure of FIG. 3A.

The ACPS 100 is also configured to handle cell processing containers 314 such as the flask 350 shown in FIGS. 20A to 20C. In the illustrated implementation, the flask 350 is a multilayer flask 350 having three layers but it is contemplated that the flask 350 could have one, two or more than three layers. Multilayer flasks 350 provide a larger surface area for growth of cells with ready access to pipetting via the upwardly facing capped opening 352. The cap 352 covering the capped opening facing vertically upwardly is convenient for decapping by any of the decapping modules provided on the deck 910, such as the decapper 830. The ACPS includes a two-axis tilt module 370 for the multilayer flask 350 in order to facilitate addition and movement of media into all the layers of the multilayer flask, after addition of media by the 350 by the robotic dispenser 818 or the robotic pipettor 814. The multilayer flask 350 defines a lateral axis 354 and a longitudinal axis 356. The two-axis tilt module 370 tilts the flask 350 about a lateral pivot axis 355 (FIG. 20B) parallel to the lateral axis 354 and about a longitudinal pivot axis 357 (FIG. 20C) parallel to the longitudinal axis 356 of the multilayer flask 350. The tilt module 370 includes a base 372 and a lower platform 374 disposed on the base 370 (in an untilted position of the tilt module 370) and pivotally connected thereto. The lower platform 374 is pivotably connected to the base 372 about the lateral pivot axis 355 and is pivotable about the lateral pivot axis 355 by a telescoping arm mechanism 920 as can be seen in FIGS. 20B and 20D. The telescoping arm 920 could be actuated, for example, electrically or pneumatically. It is contemplated that the mechanism for pivoting the lower platform 374 with respect to the base 372 could be other than as shown herein. The tilt module 370 includes an upper platform 376 disposed on the lower platform 374 (in an untilted position of the tilt module 370) and pivotally connected to the lower platform 374 about the longitudinal pivot axis 357. The upper platform 376 is pivotable about the longitudinal pivot axis 357 by a telescoping arm mechanism 930 as can be seen in FIG. 20C. The telescoping arm 930 could be actuated, for example, electrically or pneumatically. It is contemplated that the mechanism for pivoting the upper platform 376 with respect to the lower platform 374 could be other than as shown herein. A pair of retaining arms 378 extend upwards from the upper platform 374 (in an untilted position of tilt module 370). The multilayer flask 350 can be positioned on the tilt module 370 so as to be received between the arms 378. The arms 378 thereby retain the multilayer flask 350 on the tilt module 370 while the multilayer flask 350 is being tilted about the lateral pivot axis 355 and/or about the longitudinal pivot axis 357. The tilt module 370 allows tilting of the multilayer flask 350 about one or both of the lateral and longitudinal pivot axes 355, 357. The tilt module 370 is communicatively connected to the control unit 1000 for controlling the tilting of the multilayer flask during cell processing 2300. The tilt module 370 is included as a station on the deck 910 in some implementations of the ACPS 100.

The multilayer flask 350 has a heat-conductive surface to enable surface heating functionality for enzymatic release of adherent cells (for example, when trypsin or Accutase is used). It is contemplated that the upper platform 376 and/or the arms 378 could have heating functionality for heating the flask 350.

As mentioned above, a liquid sterilization station 556 (FIG. 9) is provided on the deck 910 for sterilization of individual objects, sterilization of the interior passages of aspirator and pipettor heads and tips, and for disposal of liquid waste. The liquid sterilization station 556 will be described below in further detail.

The ACPS 100 also includes a sterile filtration station 492 (FIG. 9) where materials are pushed through a sterile filter by air pressure or vacuum, for example for sterilization of reagents and media. In the illustrated implementation, the sterile filtration system 492 includes an air pressure sensor for sensing air pressure, the air pressure sensor being connected to the control unit 1000 for control by the control unit 1000 of the filtration operations. In the illustrated implementation, the sterile filtration system 492 is a Hamilton™ ML Star CVS Station.

A pipette volume dispense self-calibration station 490 for auto calibration of is provided on the deck 910. The self calibration station 490 is configured for calibration of a pipettors with respect to the volume of fluid dispensed by the pipettor.

The ACPS 100 also provides on the deck 910 several components for heating and cooling containers such as tubes, vials, reagent containers and cell processing containers 314. The ACPS 100 includes different stations and different modules for heating and cooling for different temperature ranges form −100° C. to +100° C. Examples of heating and cooling components include a heating and shaking module 494 (Hamilton™ HHS 3.0 which is used for temperatures from ambient to +105° C.), a heating and cooling module 495 (Inheco™ CPAC Ultraflat HT 2-TEC which operates for temperatures from +4° C. to +110° C.), and the like. In some implementations, such as that of FIG. 21, the ACPS 100 also includes several chilling stations 496 for storing containers thereon at temperatures +4° C. Each of the heating and cooling components 494, 495, 496 is provided with a temperature sensor connected to the control unit 1000 for control by the control unit 1000 of the heating and cooling operations.

The ACPS 100 includes some liquid storage tubes or bottles for storing heated or cooled liquids. The liquid storage tubes or bottles storing heated or cooled liquid are in temperature conducting holders (for example, the reagent container holder 416) and are positioned on custom racks that have a heated bottom plate and/or an on-board cooling station for respectively heating or cooling the tubes or bottles contained in the bottle/tube/vial holders. For example, certain substances such as media are stored at +4° C. in media storage bottles placed on custom racks having an on-board cooling station, while substances such as growth factors are stored at −20° C. in storage vials placed on custom racks.

The ACPS 100 includes a cryofreezer 460 for freezing a batch of cells, for example, after processing and before shipping and/or storage. In the illustrated implementation of the ACPS 100, the freezer 460 is a Grant™ EF600M Controlled Rate Freezer used for controlled freezing or heating of cells and other substances and products, including reagents and assays, in various containers 314 including trays, plates, tubes and the like. The freezer 460 is configured to hold small vials for freezing and disposed at the left end of the deck 910. The freezing of cell culture and/or other substances in the vials may be assisted by nucleation achieved by dipping a frozen tip (stored in the freezer module) into the cell solution in the vials at the right timepoint during the freezing process (e.g., at around −10° C.) depending on the cryopreservative solution being used. The cryofreezer 460 is installed in the recess 175 such that the majority of the cryofreezer 460 is disposed below the deck 910. This positioning of the cryofreezer 460 reduces the amount of condensation created on the deck 910 by the presence of the cryofreezer 460, and enables heat generated by the cryofreezer 460 to be dissipated outside the enclosure 110. The cryofreezer 460 includes a temperature sensor which is connected to the control unit 1000 for control by the control unit 1000 of the freezing or heating operations performed by the cryofreezer 460.

In some implementations, the ACPS 100 also includes on the deck 910, a −86° C. freezer in addition to, or instead of, the freezer 154.

Packaging Module

In some implementations, the ACPS 100 includes a packaging module 950 (shown schematically in FIG. 2) for preparing the final processed cell culture product for storage and/or shipping and transport 2600. In the illustrated implementation, the packaging module 950 is disposed outside the enclosure 110 and connected thereto by an access port (now shown). The packaging module 950 receives containers 314 of processed cell culture, for example, transport trays 340 (e.g., Petaka™ cassettes in illustrated implementations) which have had processed cell culture injected therein during harvesting 2400 (described below in further detail with reference to FIG. 28). The packaging module 950 is configured to place the transport trays 340 or cryovials 884 into containers or boxes appropriate for shipping along with temperature appropriate cryogenic or preserving material (for example, liquid nitrogen for cryovials 884, or cold packs or 37° C. heat packs for transport trays 340). The packaging module 950 includes holders for cryocontainers such as cryovials 884 in e.g. dry shippers, or for transport trays 340 in insulated boxes. For example, the transport trays 340 loaded with the final processed cell culture can be packaged for transport in temperatures ranging from +0° C. to +37° C., e.g., at 0° C., at +4° C., at room temperature, or at +37° C. In some implementations, the packaging module 950 may also be configured for labeling of containers with appropriate identifying information, and optionally process information, for the processed sample. In some implementations, the packaging module 950 may also be configured for addressing containers ready for shipment. In some implementations, the packaging module 950 is in part included inside the enclosure 110 and could include some of the harvesting modules. It is contemplated that the cryofreezer 460 could be a part of a packaging module 950. It is also contemplated that a larger volume cryofreezer for storing the final cell product in frozen cryovials could be a part of a packaging module 950. It is also contemplated that a fridge, freezer or other environmentally-controlled storage module for storing the final product (for example, antibodies, biologicals, proteins, and the like.) in vials or other containers could be a part of a packaging module 950.

The deck 910 also includes various other components which are understood by a worker skilled in the art and will not be described herein.

The quality control area 400 will now be described with reference to FIGS. 3B, 4 and 9. The quality control area 400 includes various quality control modules such as a flow cytometer 470, and an integrated microscope and plate reader module 472 for verifying the quality of the processed cells. Quality control modules are capable of quality control criteria such as verifying cell identity, cell purity, cell potency, and cell culture non-contamination (referred to as sterility in this application), and the like, some or all of which are required for compliance with GMP regulations. The configuration of the quality control modules may vary, for example two or more modules may be configured together in one unit or provided in separate units.

The flow cytometer 470 identifies and counts the number of cells of a particular kind in a cell culture. The flow cytometer 470 is used to measure cell number, cell viability and other cell markers for identity and purity. The flow cytometer 470 can be used to analyze cell characteristics, such as the cell diameter and cell density, along with specific cell marker expression, cell purity (ratio of the number of desired types of cells to the total number of cells and/or debris) and the like. The flow cytometer 470 can be used for in-process control analysis of the cell culture during cell processing and/or at the end, after cell processing has been completed. The flow cytometer 470 can be configured to perform one or more types of analyses and a number of reagent containers 471 are placed adjacent the flow cytometer 470 to enable the flow cytometer 470 to perform the analysis functions. The robotic arm 705 of the robotic module 700 is configured to pick up a cell processing container 314 from the deck 910 and place it on the platform of the flow cytometer 470 for analysis and to handle the reagent containers 471 for adding reagent to the cell culture tray when needed for the analysis. In some implementations, the flow cytometer 470 is used during cell processing to analyze progress of the cell development and to use the data obtained from the flow cytometer analysis to predict the time for next passaging and/or the time for end of the cell processing (i.e., to predict when the desired number of cells will be obtained). The flow cytometer 470 is configured to read a bar code, for example, the barcode on a cell processing container 314 including identifying information for the particular sample(s) in the cell processing container 314. The flow cytometer 470 is connected to the control unit 1000 to send the results of the analysis along with identification information to the control unit 1000. In the illustrated implementation of the ACPS 100, the flow cytometer 470 is a Miltenyi MACSQuant Analyzer 10 but it is contemplated that any suitable flow cytometer could be used.

In the illustrated implementation of the microscope and plate reader module 472, the fluorescent microscope is used to perform assays such as read-out assays for cell confluency and read-out assays for identity (e.g., by using antibody markers) and potency (e.g., for neural stem cells this can be measurement of tri-differentiation potential and neurite outgrowth), karyotype analysis, and the like, while the plate reader is used to perform assays for endotoxins, mycoplasma, protein quantification, telomerase activity, growth factor release quantification, and the like. In the illustrated implementation of the microscope and plate reader module 472, the fluorescence microscope is used to measure cell confluency, analyze cell morphology, measure and analyze cell growth and/or differentiation parameters, measure and analyze expression of cell surface or other markers, and/or perform karyotype analysis. The fluorescent microscope could also be equipped with a spectral camera for performing analyses such as karyotope analysis, and the like.

The microscope and plate reader 472 can be used for analysis of the cell culture during cell processing and/or at the end, after cell processing has been completed. In the illustrated implementation of the ACPS 100, the module 472 is a Molecular Devices i3x Reader and fluorescent microscopy module but it is contemplated that any suitable plate reader and microscopy module could be used. It is contemplated that the microscope could not be integrated with the plate reader as in the module 472 shown herein, and the system could be provided with separate microscope and plate reader modules. The robotic arm 705 of the robotic module 700 is configured to pick up a cell processing container 314 from the deck 910 and place it on the platform of the module 472 for analysis. The module 472 includes a sensor for detecting the presence of the cell processing container. The microscope and plate reader module 472 also includes a bar code reader or the like, for example, to read the barcode on a cell processing container 314 including identifying information for the particular sample(s) in the cell processing container 314. The microscope and plate reader module 472 is connected to the control unit 1000 and configured to send the results of the analysis along with identification information to the control unit 1000. In some implementations, the microscope and plate reader module 472 is used during cell processing to analyze progress of the cell development (e.g., by morphology and/or proliferation rate by confluency measures) and to use the data obtained from the analysis to predict the time for next passaging and/or the time for completion of the cell processing (i.e., to predict when the desired number of cells will be obtained).

In some implementations, the ACPS 100 is provided with a PCR machine (not shown) for performing analyses such as gene integration, diagnostics (e.g., detection of gene mutations), and telomerase activity.

In some implementations, the ACPS 100 includes in the quality control area 500, a microbial detector for determining microbial sterility (presence or absence of microbial contaminants, e.g., bacteria, bacteria spores, yeasts, molds, mold spores, etc.). An example of a microbial detector that could be included in the ACPS 100 is a Scan RDI® microbial detector manufactured by Biomérieux Industry™.

It is contemplated that quality control modules other than the flow cytometer 470, microscope and plater reader module 472, and PCR machine could be included in the ACPS 100. Each quality control module is connected to the control unit for sending the analytical results thereto. It is contemplated that one or more of the quality control modules shown herein (flow cytometer 470, microscope or plate reader module 472) could be omitted.

Particle Counter

The ACPS 100 includes a particle counter 190 for counting the number of particles inside the enclosure 110. As mentioned above, in the illustrated implementation, the enclosure 110 is maintained as a class 10 environment and is designed for performing cell processing in conformance with GMP guidelines. In the illustrated implementation, the particle counter 190 is a Light House SOLAR 3350 but it is contemplated that any suitable particle counter 190 could be used. The particle counter 190 is communicatively coupled to the control unit 1000 to enable the control unit 1000 to control the automated cell processing based on the particle count data received from the particle counter 190. For example, in some implementations, when the particle count exceeds a particular predetermined threshold, a cell processing container may not be removed from the incubator 152, or may not be opened for executing a particular step of the processing until the particle count is determined to have decreased below the predetermined threshold. The particle counter 190 reduces the risk of contamination and cross contamination during cell processing.

It is contemplated that the ACPS 100 may include one or more other environment sensors such as thermometers, humidity sensors, and the like.

Waste

With reference to FIGS. 2, 3A to 3C, and 12, the waste receptacle 156 is connected to a pump 194 (shown schematically in FIG. 2) so as to be maintained at negative pressure with respect to the enclosure 110. The pump 194 continuously pushes air from the waste receptacle 156 through a port 192 (shown schematically in FIG. 2) fitted with a HEPA filter into the room (or into the building HVAC return duct), thus preventing particles from migrating from the waste receptacle 156 into the enclosure 110. The waste receptacle 156 is configured for disposal of solid waste. It is contemplated that solid waste as well as liquid waste in containers could be discarded in the waste receptacle 156.

The enclosure bottom wall 212 has two waste ports 176, 178 (FIG. 3C) fluidly connected to the waste receptacle 156. It is contemplated that there could be one or more than two waste ports connected to the waste receptacle 156, or that there could be a plurality of waste receptacles 156. The waste receptacle 156 also has the port 192 (shown schematically in FIG. 2) connected to the pump 194 (shown schematically in FIG. 2) for maintaining the waste receptacle 156 at a sufficient negative pressure relative to the enclosure 110 to prevent any particles from migrating from the waste receptacle 156 into the enclosure 110.

Figure 12:
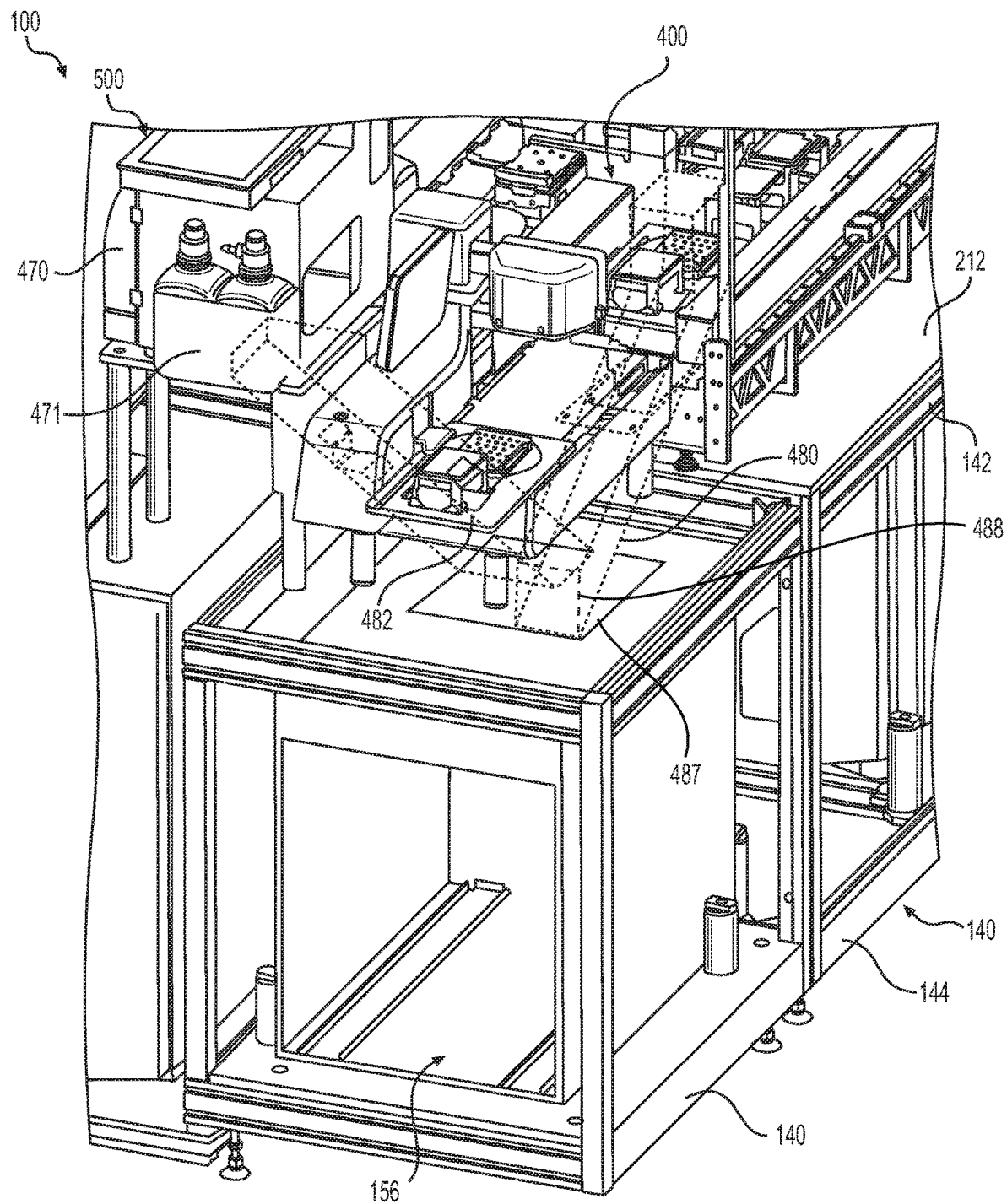
FIG. 12 is a perspective view, taken from a left, rear and top, of a portion of the ACPS of FIG. 3A with the upper wall and side walls of the enclosure being removed for clarity and showing the waste receptacle.

In the illustrated implementation, the ACPS 100 includes a waste chute 480 extending from the space inside the enclosure 110 through the waste port 176 to a port 487 defined on the top of the waste receptacle 156 and a waste chute 482 extending from the space inside the enclosure 110 through the waste port 178 to a port 488 defined in the right side wall of the waste receptacle 156 as shown schematically in FIG. 12. In the illustrated implementation, the upper ends of the chutes 480, 482 are open and disposed in the space inside the enclosure 110. In the implementation of FIGS. 3A to 12, the upper portion of each chute 480, 482 extends generally vertically and then each chute 480, 482 slants towards the waste receptacle 156. The ends of the chutes 480, 482 and/or the waste ports 176, 178 in the enclosure bottom wall 212 and/or the ports 487, 488 of the waste receptacle 156 can be closed for removal and replacement of the waste receptacle 156.

The openings of the waste chutes 480, 482 are disposed away from a center of the deck 910 and away from most of the processing stations and reagent containers in order to reduce the risk of contamination. It is contemplated that the upper ends of the chutes 480, 480 could be normally closed and opened only as needed for waste disposal. In the illustrated implementation, the upper ends of the chute 480 are disposed at a height above the enclosure bottom wall 212 and vertically higher than the components on the deck 910 such as the media fill stations 420 and the like. It is contemplated that the upper ends of the chutes 480, 482 could be disposed lower than the components on the deck

910. The slanting portion of the chute 480, 482 decreases the risk of backsplashing of contents dropped into the chute 480, 482. The negative pressure of the waste receptacle 156 with respect to the enclosure 110 also aids in preventing backsplash of waste and migration of any waste particles into the processing area 400.

Figure 25:
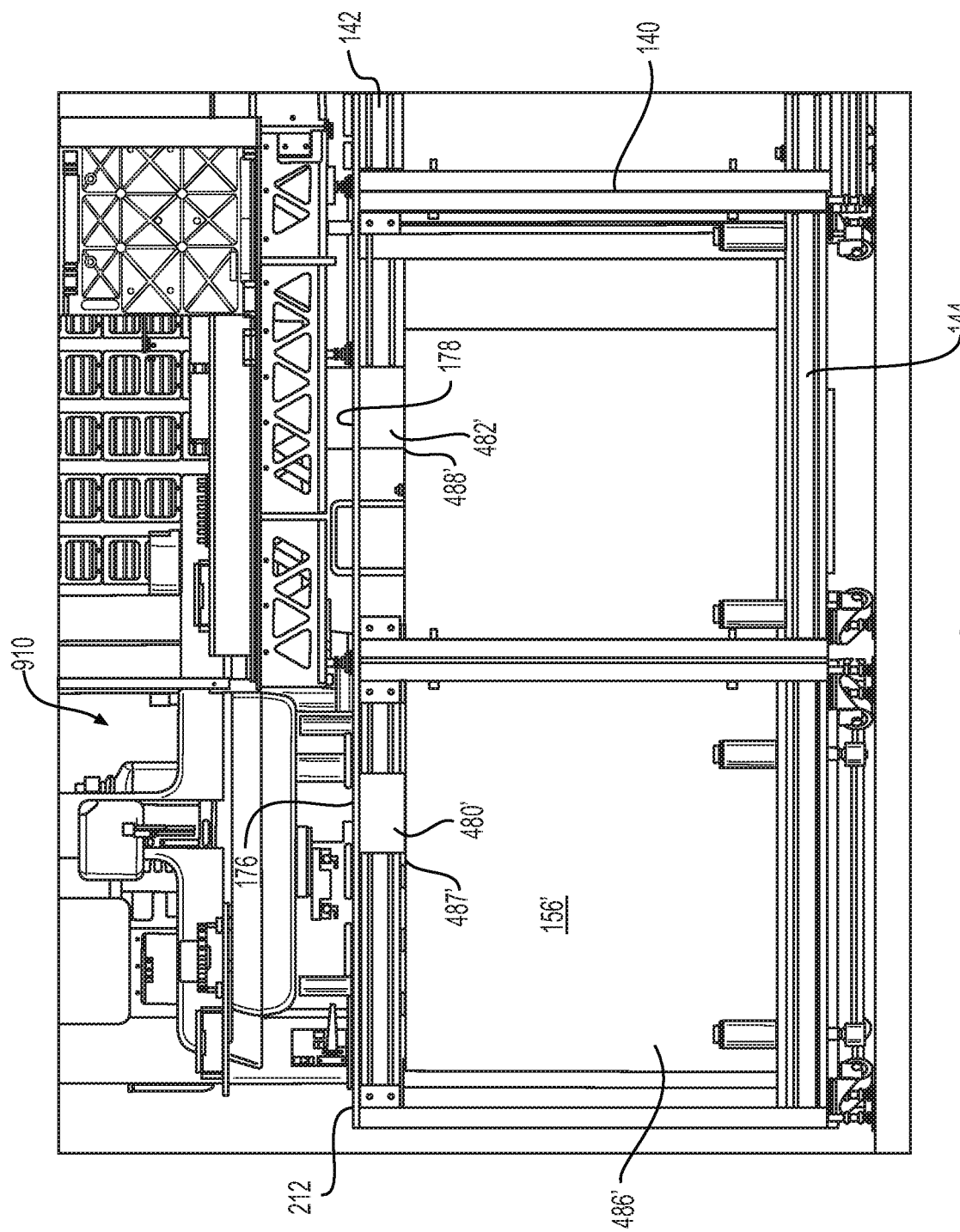
FIG. 25 is a rear elevation view of a portion of the ACPS of FIG. 3A showing another implementation of a waste receptacle and waste chutes.
Figure 26:
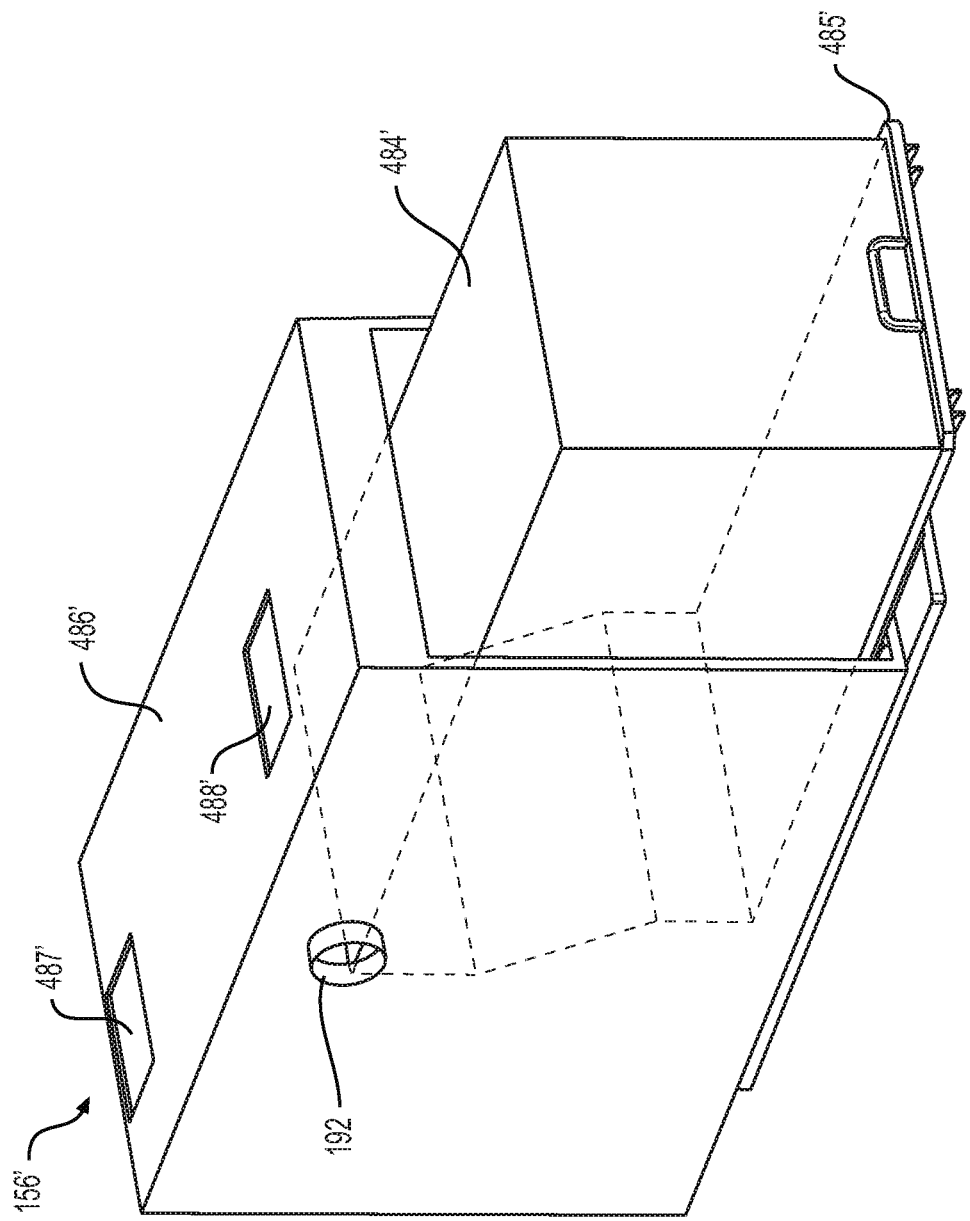
FIG. 26 is a perspective view, taken from a top, front and left side, of the waste receptacle of FIG. 25 shown in isolation.
Figure 27:
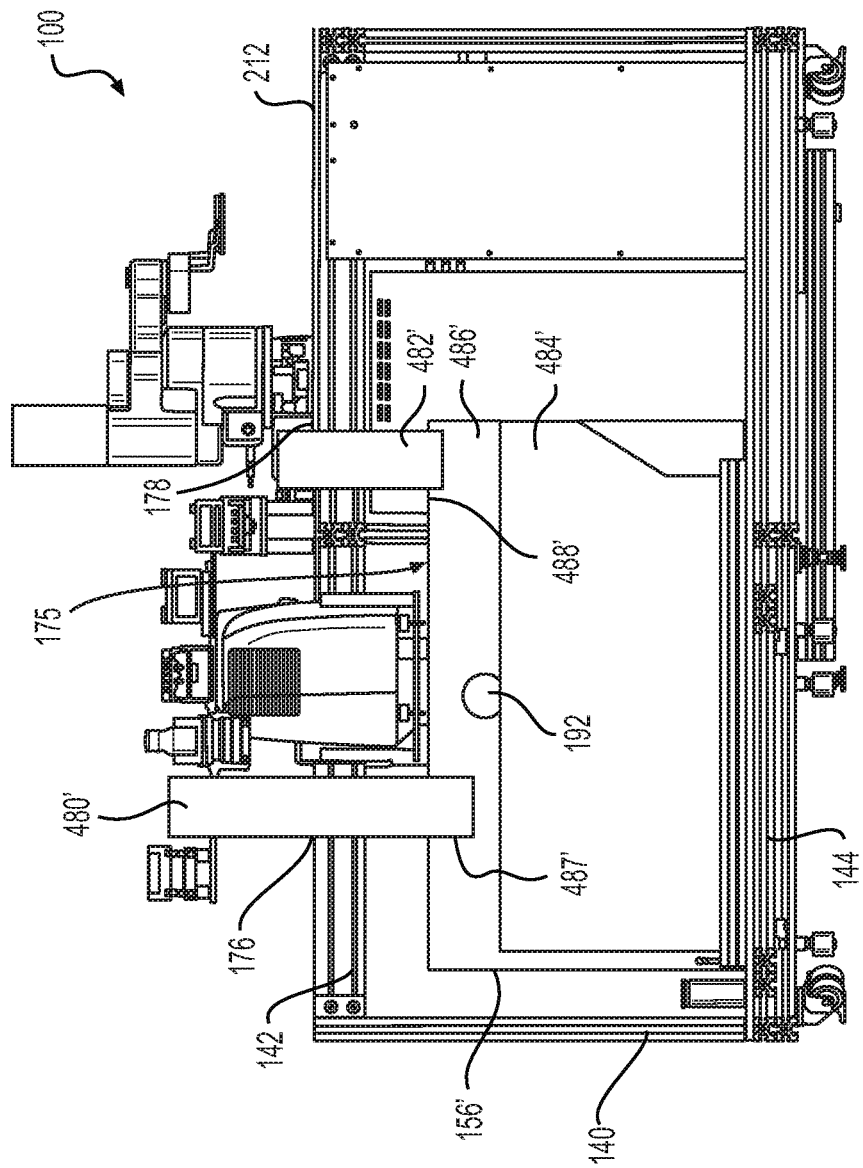
FIG. 27 is a cross-sectional view, taken along a plane extending vertically and laterally through the ACPS and the waste receptacle and waste chutes of FIG. 25.

FIGS. 25 to 27 show another implementation of a waste receptacle 156' and waste chutes 480' and 482'. The waste chutes 480' and 482' extend vertically downwards into the waste receptacle 156' in contrast to the waste chutes 480, 482 which slope downwards toward the waste receptacle 156. The waste receptacle 156' includes an inner container 484' nested inside an outer container 486'. The inner container 484' is mounted on a sliding platform 485' inside the outer container 486' so that the inner container 484' can be easily emptied by sliding the inner container 484' out of the outer container 486'. The waste chute 480' extends through the port 176 in the enclosure bottom wall 212 to the port 487' defined in the upper portion of the outer container 486'. The waste chute 482' extends through the port 178 in the enclosure bottom wall 212 to the port 488' defined in the upper portion of the outer container 486'. The inner container 484' has ports (not shown) which are aligned with the ports 487', 488' and the chutes 480', 482' when the inner container 484' is fully inserted within the outer container 486'.

The waste chutes 480, 482, 480', 482' are configured to have a cross-sectional area that is generally large enough to prevent waste from contacting the walls of the chute as the waste travels through the chutes 480, 482, 480', 482' to the waste receptacle 156, 156'.

The ACPS 100 also includes a liquid waste receptacle 158 (shown schematically in FIG. 2). The liquid waste receptacle 158 is under vacuum and maintained at a negative pressure relative to the enclosure 110 and the room in which the ACPS 100 is disposed. The liquid waste lines connecting from inside the enclosure 110 to the liquid waste receptacle 158 can be automatically sterilized with ethanol and bleach by the system under the control of the control unit 1000. In some implementations, the liquid waste lines lead directly to a liquid sterilization station 556 (FIG. 4) disposed on the deck 910. The liquid waste from the liquid waste lines is pumped out of the liquid sterilant station 556 along with the liquid sterilant contained therein.

In some implementations, liquid waste is removed by the robotic aspirator 812 and discarded in the liquid waste receptacle 158. In some implementations, liquid waste is placed in a closed container and the closed container containing the liquid waste is discarded in the waste receptacle 156 along with the solid waste.

Both the solid and liquid waste receptacles 156, 158 can be removed and replaced directly by persons in the room in which the enclosure 110 is located. A safety mechanism ensures that the waste receptacles 156, 158 cannot be removed unless the access port between the waste receptacles 156, 158 and the enclosure 110 is sealed, in order to prevent any entry of air or particles from the room into the enclosure 110 during waste removal.

The liquid waste receptacle 158 is provided with a liquid level sensor connected to the control unit 1000 and configured for detecting liquid level in the liquid waste receptacle 158. For example, the liquid level sensor in the liquid waste receptacle 158 could be configured to detect when the liquid level is above a threshold level and to send a signal to the control unit to alert the control unit 1000 for emptying of the liquid waste receptacle 158. In some implementations, where liquid waste contains a desired product (e.g., growth factors, antibodies, or other biologicals secreted by cells), the liquid waste may be saved for further processing to isolate the desired product. For example, where desired growth factors are produced by cells, the media in which the cells have been cultured may be collected by the robotic aspirator 812 and saved for subsequent processing to isolate the growth factors from the media.

Robotic Modules

As best seen in FIGS. 3B, 4 and 5, the robotic module 600 has a robotic arm 605 that can move up and down (Z-direction motion) relative to the bottom wall 212 of the enclosure 110. In a plane parallel to the bottom wall 212, the robotic arm 605 can also move in a direction parallel to the right side wall 208 (Y-direction motion) and in a direction parallel to the front wall 202 (X-direction motion). The robotic arm 605 of the robotic module 600 is provided with a sensor for sensing the size of objects (such as containers, and the like) carried by the robotic arm 605, the sensors being connected to the control unit 1000 for sending signals thereto. The robotic module 600 also includes sensors for detecting the X, Y and Z direction positions of the robotic arm 605, the sensors being connected to the control unit 1000 for sending signals thereto indicative of the current position of the robotic arm 605. The robotic arm 605 is provided with a gripper to facilitate gripping and rotating of caps of tubes and bottles. In the illustrated implementation, the robotic module 600 is a PAA PronedX Arm manufactured by Peak Analysis and Automation Inc. The robotic module 600 is disposed on a shelf forming the bottom of the recess 171 of the bottom wall 212 of the enclosure 110 in order for robotic module 600 to reach down to the bottom of the centrifuge 150 that is located below bottom wall 212. The height of the robotic module 600 is greater than that of the other robotic module 700 which has many similar features so that it can be used to access the interior of the centrifuge 150 all the way to the bottom of the centrifuge 150. The robotic arm 605 is used to access objects in the right side of the deck 910. The robotic arm 600 is used to transport holders and tubes between the centrifuge 150 and the deck 910, and to operate the caps and covers of containers disposed in the right side of deck 910. It is contemplated that, in some implementations, the robotic arm 605 could be configured to function as a pipettor or aspirator. It is contemplated that the robotic module 600 could be equipped with a bar code scanner to keep track of different containers and the like carried by the robotic arm 605. It is also contemplated that in some implementations, the robotic arm 605 could be configured to rotate about a vertical axis 602, exhibiting circular motion in a plane parallel to the bottom wall 212.

As best seen in FIG. 4, the robotic module 700 has a robotic arm 705 that can move up and down (Z-direction motion) relative to the bottom wall 212 of the enclosure 110. In a plane parallel to the bottom wall 212, the robotic arm 705 can move in a direction parallel to the right side wall 208 (Y-direction motion) and in a direction parallel to the front wall 202 (X-direction motion). The robotic module 700 is slidably mounted on a rail 710 extending along the X-direction parallel to the front wall 202, so that the robotic arm 705 can move by a larger distance along the X-direction than along the Y-direction (parallel to the side walls 206, 208). Thus, the robotic arm 705 of the robotic module 700 has a larger range of motion in the X-direction than in the Y-direction. The robotic module 700 includes sensors for detecting the X, Y and Z direction positions of the robotic arm 705, the sensors being connected to the control unit 1000 for sending signals thereto indicative of the current position of the robotic arm 705. The robotic arm 705 is used to access and transport objects throughout almost the entire width (X-direction) and length (Y-direction) of the enclosure 110. The robotic arm 705 of the robotic module 700 is provided with a sensor for sensing the size of objects (such as cell processing trays, media and reagent containers, and the like) carried by the robotic arm 705, the sensors being connected to the control unit 1000 for sending signals thereto. The robotic arm 705 is used to transport objects between the deck 910, the storage area 300, and the quality control area 500. The robotic module 700 is also used to transfer things to and from the incubator 152, tilt modules 440, magnetic separation modules 430 and media fill stations 420 and the like on the deck 910, the microscope and plate reader 472, the flow cytometer 470, and the like, as well as dispose of waste in the solid waste receptacle 156. In the illustrated implementation, the robotic arm 705 is a PAA PronedX Arm robotic arm manufactured by Peak Analysis and Automation Inc.

It is contemplated that, in some implementations, the robotic arm 705 could be provided with a gripper to facilitate gripping and rotating of caps of tubes and bottles. It is contemplated that, in some implementations, the robotic arm 705 could be configured to function as a pipettor or aspirator. It is contemplated that, in some implementations, the robotic module 700 could be equipped with a bar code scanner to keep track of different cell processing trays, media and reagent containers, and the like transported by the robotic arm 705. It is also contemplated that, in some implementations, the robotic arm 705 could be configured to rotate about a vertical axis 702 exhibiting circular motion in a plane parallel to the lower wall 212.

The robotic modules 800 and 820 will now be described with respect to FIGS. 3B, 4, 5, 13 to 16 and 19. In general, the robotic modules 800, 820 are used to manipulate (decap, transport, rotate, pipette, aspirate, etc.) many types of components included in the deck 910.

As best seen in FIG. 4, the robotic modules 800 and 820 are mounted to a frame 840 extending above the deck 910 around a periphery thereof. As best seen in FIGS. 3B, 4 and 5, the frame 840 includes four vertical frame members 841 extending upwards at each corner of the deck 910 and four horizontal frame members 842, 844, 846, 848. The front horizontal frame member 842 connects between the front vertical members and extends across the front of the deck 910 parallel to the front and rear enclosure walls 202, 204. The rear horizontal frame member 844 connects between the rear vertical members and extends laterally across the rear of the deck 910 parallel to the front and rear enclosure walls 202, 204. The right horizontal frame member 846 extends along a right side of the deck 910 and connects the right end of the front frame member 842 to the right end of the rear frame member 844. The left horizontal frame member 848 extends along a left side of the deck 910 and connects the left end of the front frame member 842 to the left end of the rear frame member 844.

With reference to FIG. 4, the robotic module 800 is mounted on a left side of the robotic module 820. The robotic module 800 includes a pair of rails 802 that are suspended between the front and rear frame members 842, 844. In the illustrated implementation, as can be seen in FIG. 19, the robotic module 800 has ten robotic arms 804 mounted to the rails 802 and extending downward therefrom. Each of the ten robotic arms 804 is configured to perform a specific function. The rails 802 are fixed to one another and can slide together laterally (in the X-direction) along the frame members 842, 844 between the left frame member 848 and the robotic module 820 mounted on a right side of the robotic module 800. Five robotic arms 804 are mounted on each rail 802 such that all ten robotic arms 804 have the same X-direction position. In the Y-direction, consecutive robotic arms 804 are mounted alternatingly on the left and right rails 802. The robotic arms 804 mounted to the rails 802 can slide longitudinally along the rail 802 towards the front and rear of the deck 910. Each robotic arm 804 can also move up and down towards and away from the surface of the deck 910. The robotic module 800 can thus access most of the deck 910, for performing the functions that each robotic arm 804 is configured for. It is contemplated that all ten robotic arms 804 could be mounted on a single rail 802.

Figure 19:
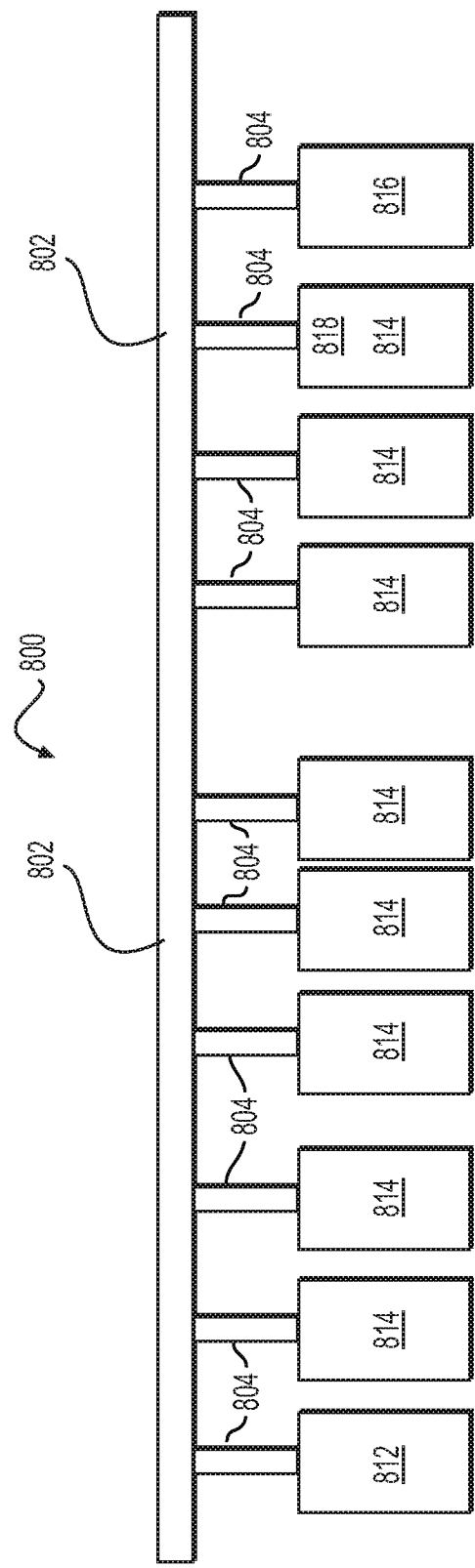
FIG. 19 is a schematic illustration of an example robotic module of the ACPS of FIG. 4.

FIG. 19 is a schematic illustration of the robotic module 800 in one implementation of the ACPS 100. The robotic module 800 has one robotic aspirator/gripper 812, eight robotic pipettors 814 and one plate gripper 816 mounted to the rail 802. It is contemplated that the robotic module 800 could include more or fewer than ten robotic arms 804, and that one or more of the robotic arms 804 could be configured for functions different than that described herein. For example, one of the robotic arms 804 could be configured for reading barcodes, as a pH sensor, or as a particle sensor.

The robotic aspirator/gripper 812 will now be described with reference to FIGS. 13 to 15. The robotic gripper/aspirator 812 has a body 862 and a central axis 861 which defines the axis of vertical motion for the aspirator/gripper 812. The gripper/aspirator 812 moves up and down relative to the rail 802 along the central axis 861.

The body 862 has a base 864 and a tube 868 extending axially downward from the base 864. The central axis 861 of the body is coaxial with the central axes of the base 864 and the tube 868. The base 864 has an upper surface 863 and a lower surface 865. A tube 866 in the form of a nipple extends upwards from the upper surface 863. The central opening of the tube 866 is connected to the central opening of the tube 868 via a conduit (not shown) formed in the interior of the base 864. A hose 867 (shown schematically in FIGS. 13 to 15) is connected around the tube 866 to connect the tube 866 to a pump (not shown) or a pumped line for evacuating the tube 868 in order to provide suction for gripping of objects or to perform aspiration.

Four prongs 872 extend downward from the lower surface 865 of the base 864. The prongs 872 are distributed circumferentially around the tube 868. The prongs 872 are disposed spaced from the tube 868 and disposed close to the outer edge of the lower surface 865. It is contemplated that the number of prongs 872 could be two, three or more than four. Each prong 872 is pivotally mounted to the base 864 so as to be able to pivot radially outwardly with respect to the central axis 861 from a radially inward position (FIG. 14) to a radially outward position (FIG. 15). As can be seen best in FIG. 14, each prong 872 has an upper portion 874 extending below from the base 864, a lower portion 876 and a central portion 878 connecting the upper portion 874 to the lower portion 876. When the prong 872 is disposed in the radially inward position, the upper portion 874 extends downwardly from the base 864 in a generally axial direction, the central portion 878 extends downwardly and radially inwardly from the upper portion to the lower portion 876, and the lower portion 876 extends downwardly from the central portion 878 in a generally axial direction.

Figure 30A:
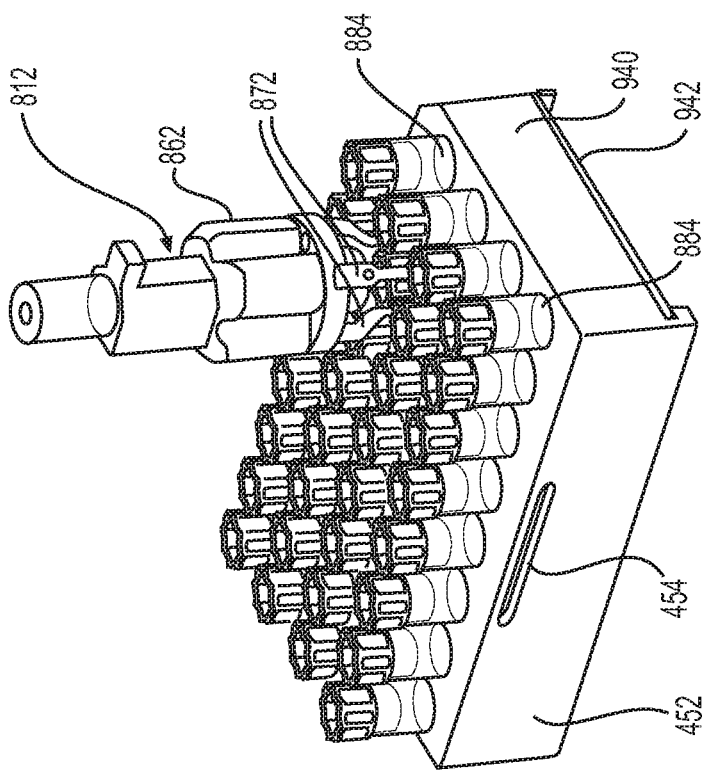
FIG. 30A is a perspective view, taken from a front, top and right side, of a holder for the storage tubes of FIG. 29C showing one of the storage tubes in the holder being gripped by the robotic aspirator/gripper of FIG. 14.

The shape of the prongs 872 allows the prongs 872 to grip objects (such as tubes and vials, for example) of a wide range of diameters as well as to grip objects disposed with narrow clearance spaces as shown in FIG. 30A. For gripping, objects of relatively small diameter are engaged by the lower portions 876 of the prongs 872 as can be seen in FIG. 14, while objects of relatively large diameter are engaged by the upper portions 874 as can be seen in FIG. 15. In the lower portion 876 of each prong 872, the surface facing radially inwardly towards the axis 861 is a grooved surface 880 to facilitate gripping of objects. A set screw 882 extends through the upper portion 874 in each prong 872 in a radial direction. The set screw 882 allows the prongs 872 to grip objects of relatively larger diameter between the upper portions 874 of the prongs 872 when the prongs 872 are pivoted outwards to the respective radially outward positions as can be seen in FIG. 15. The aspirator/gripper 812 of the illustrated implementation is very effective as a small tube gripper. For example, with reference to FIG. 15, in the aspirator/gripper 812 of the present implementation, the prongs 872 are configured to be able to grip a single tube 884 having a diameter of 8.2 mm from an array of 8.2 mm diameter tubes 884 arranged to have a clearance 886 of 2.3 mm between adjacent tubes.

The prongs 872 are operatively connected to a motor 899 (shown schematically in FIG. 13) that can be activated to control the radial position of the prongs 872 for gripping objects of different diameters and/or widths. Each prong 872 has its upper portion 874 connected to a bracket 890 which extends above the base 864 through a slot (not shown) defined in the base 864. A lower end of the bracket 890 is rotatably mounted to the base 864 by a pin 892. The bracket 890 is thus rotatable about the pin 892 (about an axis extending perpendicular to the radial and axial direction defined by the axis 861). An upper portion of the bracket 890 has a roller 894 rotatably mounted thereto. The roller 894 is rotatable about an axis parallel to the axis of the pin 892. The roller 894 is in contact with the outer surface of a centrally mounted shaft 896 extending axially along the axis 861. The diameter of the shaft 896 increases continuously in an upward or downward direction. The shaft 896 can be moved upwards or downwards relative to the base 864 by rotating an actuating shaft 898. The actuating shaft 898 is connected to the motor 899 for rotation thereof about the axis 861. The motor 899 rotates an axle 912 which is operatively connected to the actuating shaft 898 by means of an endless belt 914 for rotating the actuating shaft 898 about the axis 861. As the shaft 896 moves upward (or downwards), the roller 894 contacting the outer surface of the shaft 896 is pushed radially inward or outward due to the changing diameter of the shaft 896. When the roller 894 moves radially outwards or inwards, the lower portion of the bracket 890 mounted to the pin 892 rotates accordingly about the pin 892 causing a pivoting of the prong 872 either towards or away from the axis 861. The prongs 872 can thus be pivoted inwardly to grip objects and outwardly to release gripped objects. In the illustrated implementation, when the roller 894 moves radially outwardly, the corresponding prong 872 pivots radially outwardly away from the axis 861. A torsion spring 899 mounted around the pin 894 biases the mounting bracket 890 towards a position in which the prongs 872 are disposed in the radially inward position of FIG. 14. In some implementations, the motor 899 is configured such that direction of rotation of the axle 912 depends on the polarity of electric current supplied to the motor 899. Thus, the direction of rotation of the actuating shaft 898 about the axis 861 can be reversed by reversing the polarity of electric current to the motor 891.

In the illustrated implementation, the motor 899 is configured to control the radial position of the prongs 872. It is contemplated that the motor 899 could control the gripping force exerted by the prongs 872 in a direction towards the axis 861. It is further contemplated that the prong 872 could not be spring loaded or be biased towards the radially outward position instead of the radially inward position. It is contemplated that the shape of the prongs 372 could be different than as shown herein. It is also contemplated that the mounting of the prongs 372 and the actuation mechanism for pivoting the prongs 372 could be other than that shown herein.

As can be seen in FIG. 15, the robotic aspirator/gripper 812 can be used with an aspirator tip 870 so as to function as a robotic aspirator to aspirate liquid from a container, such as a cell processing container 314. In operation, when aspiration is desired, the robotic arm 804 extends downwards towards an aspirator tip holder disposed on the deck 910. Once the robotic arm 804 is positioned over a selected position of the aspirator tip holder having a selected aspirator tip 870, the robotic arm 804 is lowered with the prongs 872 being pivoted outwardly to receive the tip 870 between the prongs 872 and dispose the tube 868 inside the upper end of the lumen of the selected aspirator tip 870. The prongs 872 are then pivoted inwardly to grip the tip 870 with the set-screws 882. Once the tip 870 is gripped by the prongs 872, evacuation of the hose 867 is commenced (by opening the connection between the hose 867 and a pump or a pumped line) to hold the tip 870 fixed in place around the tube 868. The tip 870 is sealed against the outer surface of the tube 868. It is also contemplated that the tip 870 could be configured to seal against the lower surface 865 of the base 864. The robotic aspirator/gripper 812 is then moved to a position above the container to be aspirated and lowered therein to aspirate the contents of the container. The liquid aspirated from a container is suctioned up through the aspirator tip 870 into the tube 868 and then via the tube 866 and hose 867 into the pumping lines (not shown). In some implementations, the robotic aspirator/gripper 812 includes a one-way valve device (not shown) to prevent aspirated liquid from flowing back into the container from which it was aspirated. After aspiration has been completed, the aspirator tip 870 is discarded. For disposal of the aspirator tip 870, the robotic arm 804 is positioned over one of the waste chutes 480, 482 connected to the waste receptacle 156 and the connection between the hose 867 and the pump or pumped lines is turned off. Once the pressure inside the tip 870 slowly equilibrates, the tip 870 releases and drops into the waste receptacle 156. If the tip 870 does not release from the tube 868 within a predefined time after the fluid disconnection of the hose 867 from the pump, the robotic arm 804 is moved to gently tap a sterile portion of the outside of the aspirator tip 870 against the walls of the chute 480, 482 and to thereby release the tip 870 from the tube 868.

In the illustrated implementation, the vacuum or pumping of the tube 866 is maintained at the same level during aspiration as for picking up the aspirator tip 870. It is however contemplated that the pumping of the tube 866 could be regulated differently during aspiration than for gripping of the aspirator tip 870 prior to aspiration from a container. In some implementations, containers which are to be aspirated are provided with downholders to prevent the container from attaching to the aspirator tip and to thereby ensure that only the contents of the container are suctioned into the aspirator tip 870. (FIG. 11A to 11D show a downholder 446 for a container in the form of a transport tray 340 (e.g., a Petaka™ tray).

The aspirator tips 870 used are sterile and disposable to reduce contamination. The sterile disposable aspirator tip 870 is replaced between the processing of each batch or the processing of a different substance that is aspirated. The possibility of cross contamination due to back-flow or dripping of the aspirated contents from the aspirator tip 870 is further reduced by continuing pumping of the tube 868 to maintain continuous negative pressure through the tip orifice 874 (FIG. 15) until the aspirator tip 870 is discarded. The interior passages of the tubes 868 and 866 and the hose 867 can be sterilized as desired or at regular intervals by aspirating sterilant from a sterilization station 556 (FIG. 4) provided on the deck 910.

In the illustrated implementation, integrating the prongs 872 with the evacuated tubes 866, 868 makes the aspirator/gripper 812 function more effectively as an aspirator by ensuring more efficient and fast installation of the tip 870 around the tube 868. The prongs 872 additionally enable gripping of a variety of objects using the same robotic arm 804 as the aspirator. The integrated aspirator/gripper 812 is space-saving as well as versatile and more effective. It is contemplated that the ACPS 100 could include robotic aspirators that are configured differently than that shown herein. It is contemplated that the prongs 872 could be omitted and the robotic arm 804 having the body 862 with base 864, and tubes 866 and 868 could function only as an aspirator instead of being an integrated aspirator/gripper as shown herein.

The robotic module 800 also has eight robotic pipettors 814 (shown schematically in FIG. 19) that can hold a sterile and disposable pipette tip (not shown) for aspirating liquid from and dispensing liquid into a container, such as a cell processing container 314. The liquid aspirated by the robotic pipettor 814 from a container is suctioned up into the sterile disposable tip and can subsequently be dispensed into another container or discarded in the liquid waste receptacle 158 of the sterilization station 556 (that is then pumped out into a liquid waste receptacle). In the illustrated implementation, the pipette tips are also provided with a filtering membrane. The robotic pipettors 814 are thus configured to reduce risk of contamination during processing. It is contemplated the filtering membrane could be omitted. In the illustrated implementation, robotic pipettors 814 are HAMILTON™ STAR Line pipettors and configured for use with HAMILTON™ 300 µl, 4 ml and 5 ml conductive sterile filter disposable pipette tips. In the illustrated implementation, the pipette tips are configured for dispensing up to 5 ml of liquid at a time, but it is contemplated that the tips could be configured for different volumes of liquid other than 300 µl, 4 ml and 5 ml.

In some implementations, the robotic pipettors 814 can detect liquid density, and can thus be used to detect changes in density of liquid in the container into which the pipette tip is inserted. This allows for measuring of liquid levels in containers, or separation of liquids of varying densities from each other, including aspirating the supernatant above the pellet of a centrifuged cell culture sample so the pellet and supernatant are collected separately.

The robotic pipettor 814 can be used to perform a variety of other functions. For example, the injecting of cell culture into the transport tray 340 mounted on a tilt module 440 is performed using a robotic pipettor 814. As another example, the robotic pipettor 814 can also be used to initiate nucleation for freezing of cell culture in a vial placed on the cryofreezer 460 by inserting an appropriate frozen pipettor tip held by the robotic pipettor 814 into the vial placed on the cryofreezer 460.

In the illustrated implementation, one of the robotic arms 804 is additionally configured as a reagent dispenser 818 by mounting a dispensing head (not shown) to the robotic arm 804. The dispensing head is connected via a fluid conduit (not shown) and a peristaltic pump (not shown), to a supply container stored outside the enclosure 110, for example in the isolator 120 or in the refrigerator 160 connected thereto. The reagent dispenser 818 serves to dispense larger volumes of fluid in a continuous manner without having to stop and refill the pipette tip with fluid to be dispensed. The reagent dispenser 818 can therefore be used to efficient and fast filling of reagent containers, such as the container 836, disposed within the enclosure 110 and without having to remove the reagent container 836 from the enclosure for the filling thereof. In some implementations, the reagent dispenser 818 can be used to dispense media.

One robotic arm 804 of the robotic module 800 is configured to function as a gripper 816 for gripping and transporting objects such as the transport tray 340, the pipette tip holder 418, centrifuge tube holder 410 and the like. In the illustrated implementation, the gripper 816 is a Hamilton™ iSWAP Gripper (Hamilton Robotics, Reno, Nev., USA) configured to grip SBS format containers and other objects having similar length and width dimensions. It is contemplated that the plate gripper 816 could be configured to hold horizontally-extended objects of varying dimensions.

The robotic module 820 will now be described with reference to FIGS. 4 and 16. The robotic module 820 includes a rail 822 that is suspended between the front and rear frame members 842, 844. With reference to FIG. 16, one or more robotic arms 824 can extend downward from the rail 822. The rail 822 can slide laterally along the frame members 842, 844 between the robotic module 800 and the right frame member 846. The robotic arms 824 mounted to the rail 822 can slide longitudinally along the rail 822 towards the front and rear of the deck 910. Each robotic arm 824 can move vertically up and down towards and away from surface of the deck 910 along a vertical axis 826 defined by the robotic arm 824. The robotic module 820 can thus access most of the deck 910. Furthermore, each robotic arm 824 is also rotatable about the axis 826.

In the illustrated implementation, the robotic module 820 includes four robotic arms 824 which are each configured as a rotating cap gripper 830, referred to hereinafter as decapper 830 for convenience. Each decapper 830 rotates about the vertical axis 826 for opening and closing of various tube and bottle caps that are on the deck 910. The grippers 830 unscrew caps and covers from the containers, screw caps and covers onto containers, as well as move containers across the deck 910.

With reference to FIG. 16, each decapper 830 includes a body 832 defining a central axis 831. The body 832 is mounted to the robotic arm 824 such that the axis 831 is coaxial with the axis 826 and the body 832 is rotatable about the axis 826. Each robotic arm 824 includes four prongs 834 pivotally connected to the outer surface of the body 832 (surface facing away from the axis 831). It is contemplated that the number of prongs could be two, three or more than four. It is further contemplated that the prongs 834 could have different dimensions instead of all having the same dimensions. The prongs 834 can be controlled to pivot radially inwardly and outwardly for gripping and releasing objects such as caps and tubes. For decapping, the robotic arm 824 is lowered towards the cap 838 of the container 836 to be decapped with the prongs 834 being pivoted outwardly. Once the prongs 834 are disposed around the cap 838, the prongs 834 are pivoted radially inwardly to grip the cap 838 of the container 836 to be decapped. The robotic arm 824 is then rotated in the appropriate direction to unscrew the cap 838 from the container 836. As will be understood, the container 838 can be capped by rotating the cap 838 placed on the container 836 in a reverse direction as that used for capping.

In the implementation of FIG. 16, the container 836 has a square cross-section and is disposed inside a complementary square receptacle 840 which aids decapping and capping of the container 836 by preventing rotation of the container 836 while the cap 838 is being rotated by the decapper 830. Thus, for effective decapping and capping, containers 836 can be configured to be rotationally asymmetric (for example, non-circular in cross-section as in the implementation of FIG. 16) and disposed in complementary receptacles that prevent rotation of the container 836 when the cap 838 is being rotated by the prongs 834. In other implementations, the containers 836 may not be rotationally asymmetric but are otherwise retained in the receptacle to prevent rotation with the cap 838.

In the illustrated implementation of the robotic module 820, the prongs 834 of each of the four decappers 830 are configured for gripping objects within a particular range of sizes. The range of sizes associated with each decapper 830 is different than that associated with the other three decappers 830. Thus, together the four decappers 830 form a universal decapper for decapping caps and covers of a wide range of sizes.

It is contemplated that the robotic module 820 could have more than or fewer than four robotic arms 824. It is contemplated that one or more of the robotic arms 824 could also be configured to function as a pipettor or aspirator. It is further contemplated that the robotic module 820 could, in some implementations, also include robotic arms configured for other functions such reading barcodes, analyzing pH or particle counts, and the like.

Sterilization System

The ACPS 100 includes an automated enclosure sterilization system for performing a global sterilization of the enclosure 110 and all exposed surfaces housed therein. The automated enclosure sterilization system is configured for automatic sterilization of the enclosure 110 without requiring human intervention. It is contemplated that the automated enclosure sterilization system could also be used for sterilization of the isolator 120 and BSC 130.

The automated enclosure sterilization system includes a sterilization unit 550 (shown schematically in FIG. 2) for purging the enclosure 110 with an appropriate sterilant for automated sterilization of the enclosure 110. The enclosure 110 includes a sterilant inlet 230, a catalytic converter inlet 231, a sterilant outlet 232, and a catalytic converter outlet 233 as mentioned above. The sterilization unit 550 is connected to the sterilant inlet 230 and outlet 232 for respectively introducing sterilant into and removing sterilant from the enclosure 110. The sterilant inlet 230 is configured to deliver the sterilant received from the sterilization unit 550 into the interior of the enclosure 110 as a spray or vapor mist. The sterilant outlet 232 is connected to a pump of the sterilization unit 550 which neutralizes the sterilant removed from the enclosure 110 before releasing to the atmosphere. The ACPS 100 includes impellers (not shown) inside the enclosure 110 for circulating the sterilant received from the sterilant inlet 230 and for increasing dispersion of the sterilant throughout the interior of the enclosure 110.

The sterilization unit 550 injects sterilant into the sterilant inlet 230 for an appropriate amount of time to sterilize the surfaces of enclosure 110, after which the sterilization unit 550 stops injecting sterilant into the sterilant inlet 230, and instead injects air into the sterilant inlet 230 to purge the enclosure 110 of any remaining sterilant particles.

In the illustrated implementation, the sterilization unit 550 is STERIS™ VHP 1000ED Mobile Biodecontamination System (STERIS Corporation, Mentor, Ohio, USA) configured to inject hydrogen peroxide vapor (such as Vaprox™ Sterilant, STERIS) as the sterilant but it is contemplated that any appropriate sterilization unit and sterilant could be used instead of that shown herein. The sterilization unit 550 of the illustrated implementation is also connected to the catalytic converter inlet and outlet 231, 233 to introduce a catalytic converter into the enclosure 110 in order to convert the sterilant vapor to harmless and biodegradable water vapor and oxygen at the end of the sterilization procedure.

Sterilization of the enclosure 110 is performed after it has been opened to the outside environment (for example, after repairs and maintenance) or after suspected or detected contamination in enclosure 110, so that all the exposed surfaces inside the enclosure 110 as well as the enclosed air is sterilized from any live biological contaminating particles. The enclosure 110 could also be sterilized between processing of batches, at periodic intervals, or as desired.

Before the interior of the enclosure 110 is sterilized by introducing sterilant into the enclosure 110, all the cell processing containers 314 containing cells and/or culture are generally transferred from the enclosure 110 to an area that can be sealed from the enclosure 110 (such as the incubator 152, for example), and the enclosure 110 is automatically sealed.

Automatically sealing the enclosure 110 includes automatically closing the air inlet 222, the air outlets 224, and the ports 176, 178, connected to the waste receptacle 156. In addition, the insulation door of the freezer 154 is automatically closed to provide greater insulation from the cold temperatures of the freezer 154 in order to reduce the possibility of sterilant condensation on and around the freezer door. Any other ports connected to other system components exterior to the enclosure 110 (such as the isolator connection port 220 connected to the isolator 120, the access port 170 connected to the centrifuge 150, the access port 172 connected to the incubator 152, the access port 174 connected to the freezer 154, and the like) are verified to be closed and/or closed automatically if determined to be open. The system 100 also verifies that all reagent containers are closed. Access ports connecting to system components that do not lead to the outside environment could also be controlled to remain open for sterilization. For example, the access port 170 could remain open to sterilize the inside of the centrifuge 150, or the access port 220 could remain to sterilize the inside of isolator 120.

In addition to the automated enclosure sterilization system for performing a global sterilization of the enclosure 110, the ACPS 100 includes a liquid sterilization station 556 (FIG. 9) disposed on the deck 910 for sterilizing individual objects inside the enclosure 110. The sterilization station 556 includes a container connected via fluid lines to a pump and a sterilant liquid source via fluid lines. The sterilization station 556 is thereby configured to circulate sterilant liquid (for example, bleach as in the illustrated implementation, or any other appropriate sterilizing liquid) therethrough. Objects to be sterilized such as media fill tips, aspirator tips 870 and pipette tips, for example, can be dipped into the sterilization station 556 for an appropriate period of time by one of the robotic arms of one of the onboard robotic modules 800 or 820 while the sterilant fluid is circulated. The sterilization station 556 allows sterilization of individual objects without removal of the object from the enclosure 110 which helps to minimize interruptions in the processing sequence and reducing risk of cross contamination within the enclosure 110.

System components such as the incubator 152 are also equipped with their own respective automated sterilization units. Before sterilization of a particular system component by the associated sterilization unit, the access port connecting the system component is closed and containers stored within the system component are typically removed therefrom, unless the containers are desired to also be sterilized. For example, the incubator 152 is associated with an automated incubator sterilization unit 552 (FIG. 3C) for sterilizing the interior of the incubator 152. Before the interior of the incubator 152 is sterilized by the incubator sterilization unit 552, the access port 172 is closed and any sample containers stored within the incubator 152 are removed therefrom. In the illustrated implementation, the automated incubator sterilization unit 552 is a SafeErase $ClO_2$ Decontamination System manufactured by MPB Industries Ltd which uses ethylene oxide as a sterilant but any suitable sterilization unit and sterilant could be used.

It is contemplated that the isolator 120 and the BSC 130 could also be connected to the sterilization unit 550 or to another sterilization unit similar thereto for automatic sterilization of the enclosed interior space.

The described sterilization systems and procedures are effective for ensuring minimal contamination due to exposure to the exterior environment while also allowing the system 100 to function without intervention by a human operator. It is contemplated that the sterilization of the enclosure 110 or one of the system components could also be initiated as a result of user input from an operator of the system 100. It is further contemplated that one or more of the steps (for example, closing of the air outlets) that have been described above as being automated could be capable of execution with the aid of a human operator, in addition to automated execution.

Tracking System

As mentioned above, all of the cell processing containers 314, centrifuge tubes, vials and transport trays 340 and many of the others containers (such as reagent containers and the like) have barcodes. The ACPS 100 includes a barcode scanner 498 (shown schematically in FIG. 2) inside the enclosure 100 to facilitate tracking of batches introduced into the enclosure 110. Many of the processing modules such as the Hamilton decapper and the incubator 152 have barcode scanners to verify the identity of containers being processed. The control unit 1000 is connected to the modules having the barcode scanners, to the robotic modules 600, 700, 800, 820 transporting the containers mentioned above, to the storage racks 310, 320, 330 storing the containers, and to many of the processing modules such as the media fill stations 420 and incubator 152 which can receive the containers mentioned above. Thus, the control unit 1000 can track the location (position) of each container as well as track each movement of each container and thereby each step of the processing of each container.

All containers can thus be tracked via positional memory and bar codes to comply with GMP guidelines. The control unit 1000 keeps records associated with particular stations or system components (for example, the incubator 150 or centrifuge 150) to identify and track cell processing containers 314 located within the station/component providing a positional memory for the particular container. The control unit 1000 also keeps records associated with each container (identified by the associated bar code) or batch as the container is moved through various processing steps.

The ACPS 100 includes a camera 497 (shown schematically in FIG. 2) for obtaining images (along with an current timestamp) of activity occurring within the enclosure 110. The camera 497 could be obtaining images continuously or intermittently. It is contemplated that the camera 497 could be a plurality of cameras disposed at different locations to capture activity in different parts of the enclosure 110. It is also contemplated that activity in the isolator 120 and the BSC 130 could be recorded with the same camera 497 or with other camera(s) 497. The camera 497 is connected to the control unit 1000 and the images provided by the camera 497 are stored in a memory associated with the control unit 1000 or connected to the control unit 1000. In some implementations, images obtained by the camera 497 are associated with the sample(s) being currently processed and included along with, or as part of, the sample processing logs associated with a sample.

Control Unit

Figure 18:
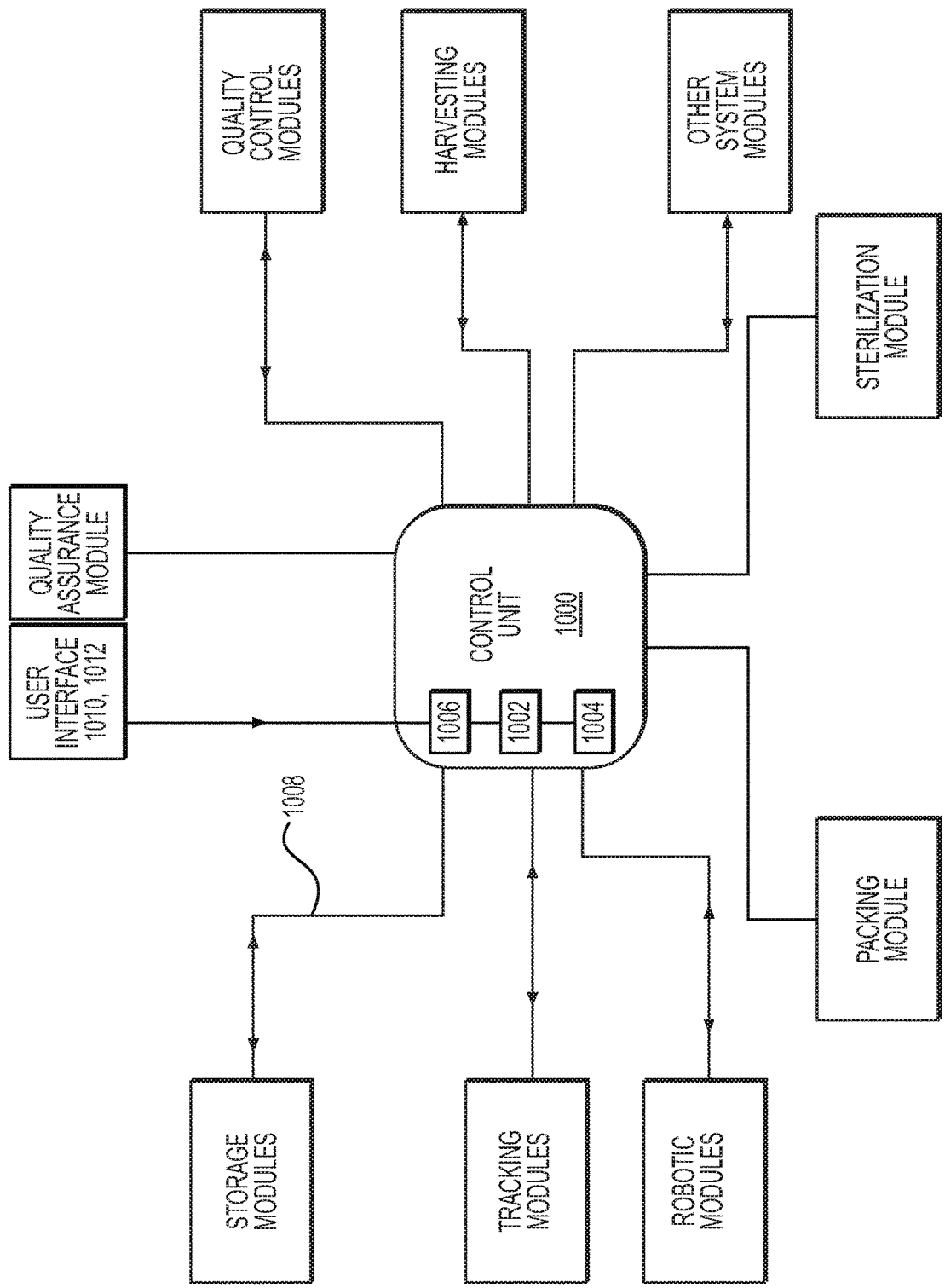
FIG. 18 is a schematic view of the control unit of the ACPS 100 for executing a method in accordance with an implementation of the present technology.

With reference to FIG. 18, the control unit 1000 in the illustrated implementation is a computer which is communicatively coupled to various modules of the ACPS 100 in order to facilitate automated processing of cells. The control unit 1000 is communicatively coupled to various storage modules (storage racks 310, 320, and transport trays 322). The control unit 1000 is communicatively coupled to various processing modules (media fill stations 420, incubator 152, decapping module 414, and the like). The control unit 1000 is communicatively coupled to various tracking modules of the tracking system. The control unit 1000 is communicatively coupled to various robotic modules 600, 700, 800, 820. The control unit 1000 is communicatively coupled to various quality control modules (cytometer 470, microscope and plate reader 472, and the like). The control unit 1000 is communicatively coupled to various harvesting modules (transport tilt holder tilt module, freezer 460, and the like). The control unit 1000 is also communicatively coupled to other miscellaneous components particle counter 190, gates across access ports, and the like. The control unit 1000 is coupled to system components such as the electric actuator 256 for opening and closing the air outlets 224.

The control unit 1000 obtains and processes information from all the communicatively coupled modules which allows the control unit 1000 to control cell processing, to track and monitor cell processing, and to create a record of the cell processing. The record could be used for Quality Assurance purposes as will be described below. The control unit 1000 thus facilitates conformance of the cell processing to GMP guidelines.

The following is an example of the control unit 1000 controlling a cell processing step involving incubation 152. The control unit 1000 instructs the robotic arm 705 to pick up a cell processing container 314 from one of the media fill stations 420 and move it to a specified location disposed above the incubator access port 172. The control unit 1000 tracks the position of the robotic arm 705 based on the signals received from the various sensors coupled to the robotic module 700. When the cell processing container 314 is moved by the robotic arm 705 to the specified location disposed above the incubator access port 172, the control unit 1000 sends a signal to the incubator 152 causing a gate in the incubator 152 to be opened. The control unit 1000 then causes the incubator robotic arm inside the incubator 152 to extend upward through the incubator access port 172 to receive the cell processing container 314 from the robotic arm 705, the barcode on the cell processing container 314 is read by the barcode scanner inside the incubator 152 which then sends a signal to the control unit 1000 indicative of the barcode identification. The incubator robotic arm places the cell processing container 314 on a shelf inside the incubator 152 and closes the gate thereby sealing the enclosure 110 from the incubator 152. The incubator 152 is controlled by the control unit 1000 to incubate the cell processing container 314 at a predetermined temperature, at predetermined $CO_2$ and $O_2$ levels, and for a predetermined period of time. When the predetermined period of time ends, the control unit 1000 sends a signal to the incubator 150 causing the gate for accessing the incubator 152 to be opened and the cell processing container 314 to be moved by the incubator robotic arm, towards the incubator access port 172. The barcode on the cell processing container 314 is read by the incubator barcode reader and a signal indicative of the barcode identification is sent to the control unit 1000. The control unit 1000 sends a signal to the robotic arm 705 of the robotic module 700 to retrieve the cell processing container 314 from the incubator robotic arm and to place the cell processing container 314 on one of the tilt modules 430. The control unit 1000 updates the process records for the particular cell processing container 314 to reflect that the cell processing container 314 has completed the incubation step and is undergoing a particular processing step. The control unit 1000 further updates a record associated with the tilt module 430' indicating the particular tilt module 430' (identified by its location) currently holds a particular cell processing container 314 (optionally further identified by its barcode).

As the processing continues, in this example processing sequence, the control unit 1000 causes removal of the lid of the cell processing container 314, and for the robotic aspirator 872 to pick up an aspirator tip 870 to aspirate the old media in the cell processing container 314, followed by placing of the cell processing container 314 onto a media fill station 420 to fill it with fresh media, along with adding a reagent with the robotic pipettor 814 by picking up a new sterile filtered tip and aspirating the reagent from a predetermined container and dispensing it into the cell processing container 314, followed by placing of the lid back onto the cell processing container 314. The control unit 1000 further updates, at each step, the record associated with cell processing container 314 as well as the tilt module 440 and/or media fill station 420 indicating the particular tilt module 440 and/or media fill station 420 (identified by its location). The control unit 1000 then causes the robotic arm 705 to move the cell processing container 314, and transporting of the cell processing container 314 back to the incubator 150 as detailed above in addition to updating the record associated with the cell processing container 314 as well as incubator 150.

In some implementations, the control unit 1000 is configured to enable Quality Assurance (QA) in the automated cell processing. The control unit 1000 generates a comprehensive record of various details of the cell processing steps and including information obtained from the quality control analysis performed during the cell processing or after the cell processing is completed.

In some implementations, the control unit 1000 is further configured to verify that the processing and/or the end product of the cell processing is in accordance with a predetermined specification for the process and/or the product. The control unit 1000 could be provided with a predetermined checklist, and be configured to verify satisfaction of criteria on the pre-determined checklist. For example, the checklist could include criteria to ensure that one or more steps were performed correctly, or that particular events did not occur during a step of the processing, or that one or more product parameters are within a specified range. In an example where the cell processing is for a cell therapy application, the checklist could be designed to verify that the end product is ready for release to the patient.

In some implementations, the control unit 1000 is further configured to make processing decisions, e.g., to decide which steps to execute in order to produce a desired end product. For example, in some implementations the control unit 1000 is configured to determine one or more subsequent step for execution based on results of analyzing one or more characteristics. In an illustrative implementation, the control unit 1000 is configured to determine that further incubation of a batch is required based on determination of low cell number or confluency using the flow cytometer 470 or the microscope and plate reader 472, and accordingly to execute such further incubation in the incubator 152. In another illustrative implementation, the control unit 1000 is configured to determine that gene repair is needed and accordingly to execute a gene editing process for gene repair, based on diagnostic assay results indicating the cells in a batch possess a disease-causing gene mutation obtained using an antibody specific to the gene mutation or by primers specific to the gene mutation run an analyzed by a qRT-PCR machine. In another illustrative implementation, the control unit 1000 is configured to determine that removal of dead cells is desired and to execute such processes, based on determining low viability using the flow cytometer 470. In another illustrative implementation, the control unit 1000 is configured to select a desired cell potency or to purify desired cells in a batch, for example by magnetically sorting cells expressing a certain marker, to achieve a desired potency or purity using a magnetic tilt module 440 provided with an adequately strong magnet 434. It should be understood that the control unit 1000 can be configured to make a variety of such processing decisions using the results of analyzing one or more characteristics, without human intervention during the processing.

With reference to FIG. 18, the control unit 1000 includes a processor 1002 coupled to a network communication interface 1004. The processor 1002 is configured to execute various methods, including those described herein. To that end, the processor has a memory 1006 (in the form of Random Access Memory (RAM), flash memory, or the like), or is communicatively coupled to the memory 1006 that stores computer readable commands which, when executed, cause the processor to execute the various methods described herein. In some implementations, the memory 1006 also stores process logs, process records and other information related to the execution of methods described herein. In some implementations, the control unit 1000 includes or has access to one or more other data storage devices for storing such process logs, process records and other information related to the execution of methods described herein The network communication interface 1004 (such as a modem, a network card and the like) is configured for two-way communication with other components of the ACPS 100 over an ACPS communication network 1008. In the illustrated implementation of the present technology, the ACPS communication network 1008 is a local area network (LAN). In other implementations of the present technology, the ACPS communication network 1008 could be other than LAN, such as the Internet, a wide-area communication network, a local-area communication network, a private communication network and the like. The ACPS communication network 1000 could be a plurality of communication networks 1008. In the ACPS communication network 1008, communication could occur over various types of communication links such as wireless links (such as the Wireless Fidelity, or WiFi® for short, Bluetooth® or the like) or wired links (such as a Universal Serial Bus or USB-based connection or Ethernet based connection, for example).

In the implementation of FIGS. 1A to 2, the control unit 1000 includes a user interface comprising a user input device 1010 for receiving user inputs and a user output device 1012 for conveying information to a user. In the implementation of FIGS. 1A to 2, the user input device includes a keyboard and mouse but it is contemplated that the user input device could be in the form of any suitable user input device such as a keyboard, a mouse, a touch pad, a touch screen, microphone, trackball, joystick, a finger-tracking, pen-tracking or stylus tracking element and the like. In the implementation of FIGS. 1A to 2, the user output device 1012 is in the form of a display screen. The control unit 1000 also includes other forms of user output devices 220 such as a speaker, a printer and the like for providing other types of visual, auditory or tactile outputs to the user.

In the illustrated implementation, the control unit 1000 is shown as a single desktop computer. It is however contemplated that the control unit 1000 could include a plurality of desktop computers and/or other computing devices, each computing device having a processor 1002 associated with a memory 1006 and a network communication interface 1004. The processor 1002 could be a single shared processor, or a plurality of individual processors, some of which may be shared. Each processor 1002 could be associated with one or more memory 1006.

The control unit 1000 comprises hardware and/or software and/or firmware, as is known in the art, to execute various tasks, such as receiving a signal from a sensor, system component or module, processing the received signals, determining a subsequent step for cell processing based on the received signal, generating control signals (instructions) for controllable system modules and/or components such as quality assurance module, the incubator, and the like, and sending control signals to the controllable system components for executing the determined subsequent step.

The term "module" as used herein could refer to software, hardware or any combination thereof. For example, the quality assurance module is a software module residing in a memory 1006 of the control unit 1000. The quality assurance software module comprises code which when executed by the processor 1002 executes quality assurance functions as described herein. It is contemplated that a quality assurance module could be a hardware module comprising a separate dedicated computing device with its own processor, memory and network communication interface.

In some implementations, the ACPS communication network 1008 is not the internet and the control unit 1000 is not connected to the internet in order to prevent unauthorized entry into the control unit 1000 which could compromise the product or test results. In some implementations, the control unit 1000 is configured to provide system messages (such as error messages, alerts or prompts) indirectly via an external communication network (for example, a cellular communication network), i.e. a communication network that is not the ACPS communication network 1008. It is contemplated that the control unit 1000 could be configured to turn on/off the power to a particular element or outlet where a separate detector senses the loss in power and, as a response to the loss in power, sends a pre-determined message. As another example, the control unit 1000 could display a predetermined pattern (for example, a two-dimensional barcode) on a monitor which is configured to be read by a camera connected to a communication network. The camera could transmit appropriate messages via the communication network based on the pattern displayed by the monitor. Thus, the control unit 1000 is configured to cause transmission of appropriate messages to appropriate recipients via an external communication network without being directly connected to the external communication network.

Integration of Multiple Systems

Figure 17:
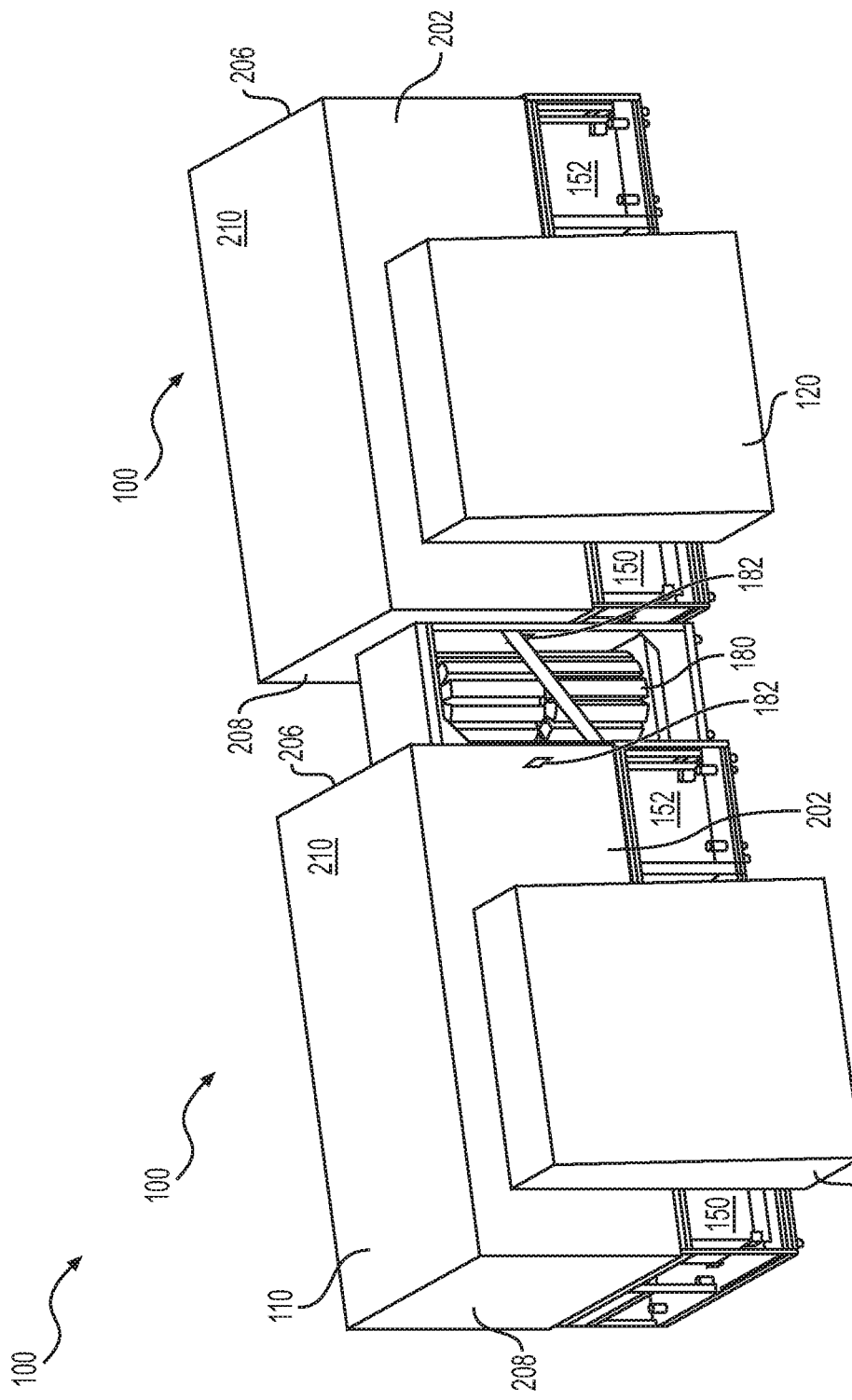
FIG. 17 is a perspective view, taken from a front, top and right side a first ACPS connected to a second ACPS.

With reference to FIG. 17, an integrated system 10 including two or more ACPS 100 such as the ACPS 100 described above can be connected together. The illustrated implementation of FIG. 17 shows a dual integrated ACPS 10 including a left ACPS 100 having an enclosure 110 and an isolator 120. A right ACPS 100 also includes an enclosure 110 and an isolator 120. Each ACPS 100 is connected to an incubator 180. The left enclosure 110 has an access port 182 on its right side wall 208 which is connected to an access port in the left side wall of the incubator 180. The right enclosure 110 has an access port 182 on its left side wall 208 which is connected to an access port in the right side wall of the incubator 180. The connection between the incubator 180 and each enclosure 110 is sealed. Cell processing containers 314 can be passed between the incubator 180 and each of the enclosures 110. Cell processing containers 314 can thus be passed between the left and right enclosures 110 via the incubator 180 without being removed outside the ACPS 10. The integrated ACPS allows better utilization of valuable resources by sharing of resources without increasing the risk of contamination within each ACPS 100.

In some implementations, the isolator 120 of each ACPS 100 above in the integrated system 10 above is connected to the same BSC 130. In some implementations, the isolator 120 of the left ACPS 100 would be connected to a first BSC 130 and the isolator 120 of the right ACPS 100 would be connected to a second BSC 130 that is different from the first BSC 130.

In some implementations, each ACPS 100 above in the integrated system 10 above is controlled by the same control unit 100. In some implementations, the left ACPS 100 would be controlled by a first control unit 1000 and the right ACPS 100 would be controlled by a second control unit 1000 that is different from the first control unit 1000.

Sequential Processing of a Plurality of Batches

The ACPS 100 is configured for processing of multiple batches at one time without cross-contamination between the batches.

The processing of multiple batches at one time without cross-contamination between the batches is enabled in part by factors such as the structure and layout of the enclosure 110, the air flow system, the waste systems 156, 158, the relative physical placement of various components within the enclosure 110, the configuration of the connection between the enclosure 110 and various equipment (such as the centrifuge 150, and the like) outside the enclosure, the presence and particular configuration of the isolator and the BSC, and the like.

In addition, the control unit 1000 is configured to ensure that at any one time, only one batch is exposed to the environment inside the enclosure 100. As the control unit 1000 tracks the position, movement and processing of each cell processing container 314, the control unit 1000 can control the processing of multiple batches within the enclosure 110 at the same time such that when one cell processing container 314 is open to the environment, for example, for addition of reagent, other cell processing containers 314 belonging to a different batch are disposed remotely from the open cell processing container 314. In other words, the control unit 1000 is configured to allow a cover of a given cell processing container 314 to be removed only when all of the cell processing containers 314 belonging to a different batch are disposed remotely from the given cell processing container 314. Thus, while closed cell processing containers 314 belonging to different batches may be placed next to each to each other in the incubator 152, or in the freezer 154, two cell processing containers 314 belonging to different batches may not be found on separate media fill stations 420 on the deck 910.

In some implementations, the control unit 1000 is further configured to ensure that a cell processing container 314 is not left uncovered except during addition or removal of materials to and from the cell processing container 314. Thus, cell processing containers 314 generally remain covered except during addition or removal of materials to and from the cell processing container 314.

In some implementations, after closing a cell processing container 314 for a first batch, a cell processing container 314 for another batch is opened only when the particle count as measure by the particle counter 190 is below a threshold level.

In some implementations, as mentioned above, the space inside the enclosure 110 can be divided into separate spaces by a laminar airflow wall. The laminar airflow wall could be constructed, in some implementations, to allow simultaneous processing of multiple batches in the separated spaces within the enclosure 110 by reducing the risk of contamination between the separated spaces.

For example, in the presence of a laminar airflow wall that divides the space within the enclosure 110 into a first space and a second space, it is contemplated that a first batch could be processed in the first space while a second batch is being processed in the second space. Thus, in this example, it is contemplated that a cell processing container 314 of a first batch could be opened for filling reagent therein in the first space, while a second cell processing container 314 of a second batch is opened for filling reagent therein in the second space. The separation of first space from the second space by the laminar airflow wall reduces the risk of, or prevents, contamination between the first batch and the second batch.

Methods and systems provided herein are designed to process a large number of batches at the same time without cross contamination between batches using sequential processing of batches. As used herein, the term "sequential processing" means that when a plurality of batches are undergoing processing in the ACPS 100 at the same time, only one batch at a time is open to the environment, i.e., only one batch on the deck 910 or in the enclosure 110 is open at a time. It should be understood that many of the batches may be at different steps or stages of processing, for example one batch may have just started processing, whereas another batch is near completion. Further, not all batches are necessarily processed in the same way; for example, one batch may comprise a first type of cell (e.g., fibroblasts) being reprogrammed to a second type of cell (e.g., neural stem-like cells) using a first set of reprogramming agents, whereas another batch comprises a third type of cell (e.g., bone marrow stromal cells) being reprogrammed to a fourth type of cell (e.g., dermal hair stem-like cells) using a different set of reprogramming agents. Different batches can therefore be simultaneously subjected to different processing. In practice, sequential processing means also that each processing station on the deck 910 processes only one batch at a time. A processing station may process a plurality of batches one after the other, in sequence, so long as no more than one batch is open to the environment at a time (e.g., only cell processing containers 314 from one batch at a time are opened to the environment). One batch will be opened, processed as required, and then closed, before the next batch is opened for processing, etc. In this way the plurality of batches may each be at the same or different steps or stages of processing, all of the batches being processed in the ACPS 100 at the same time but with only one batch at a time open to the environment, such that cross contamination between batches is prevented.

By way of illustration, consider an example where three batches are undergoing processing at the same time in the ACPS 100, the ACPS 100 having four processing stations. The first batch is introduced into the ACPS 100 as described and processing commences. The first batch is processed at the first processing station and then placed in the incubator 180. The second batch is then introduced into the ACPS 100, processed at the first processing station, and then placed in the incubator 180. The first batch is then retrieved from the incubator 180 and processed at the second processing station and the third processing station. While the first batch is undergoing processing at the third processing station, the second batch is retrieved from the incubator 180 and brought to the second processing station. However the second batch is held (i.e., not opened) until processing of the first batch at the third processing station is completed. Once the first batch has been closed after processing at the third processing station, then the second batch may be opened and processed at the second processing station and the third processing station.

During processing of the second batch at the second and third processing stations, the third batch is introduced into the system and taken to the first processing station, where it will be opened and processed only after the first and second batches are closed (e.g., in the incubator 180). The third batch may then be taken straight to the fourth processing station for processing, without first being processed at the second and third processing stations, depending on the particular processing parameters for the third batch. In this way each processing station processes batches in sequence, one after the other, and each batch undergoes a distinct sequence of processing steps, with the processing of the batches being coordinated to ensure that only one batch is open to the environment at a time.

It should be apparent that this sequential processing of batches is distinct from previous systems in which one batch must be processed to completion before processing of another batch can commence. In previous systems, for example, the first batch is introduced into the system and undergoes processing in its entirety, e.g., processing at the first, second, third, and fourth processing stations until the end product is obtained. The end product for the first batch is released from the system before the second batch is introduced into the system; the second batch will then be processed to completion until the end product for the second batch is released from the system; only after the second batch has been removed from the system can the third batch be introduced for processing; and so on. In such previous systems complete cleaning and sterilization is generally required between batches to prevent cross contamination, in contrast to sequential processing systems provided here.

Method

For further understanding of the technology, the ACPS 100 as described above is now described with reference to an automated method 2000 for cell processing.

However, it should be understood that this description is provided for illustrative purposes only, and is not meant to be limiting. The ACPS 100 may be used for a wide variety of methods including for example cell processing and processes for manufacturing biological products such as proteins, antibodies, vaccines, growth factors, tissue matrices, and the like. Further, the ACPS 100 may be used for other types of cell processing than the one illustrated below, such as growth or expansion of cell lines, gene editing, manufacture of induced pluripotent stem cells (iPSCs), embryonic stem cells, and the like. It is contemplated that the ACPS 100 may have application in a wide range of such methods and can be adapted according to the needs of a particular method to be performed.

In the illustrative example provided here, the ACPS 100 as described above is configured to execute an automated method 2000 for transforming cells of a first type into cells of a second type. The automated method 2000 described here is an end-to-end method for cell processing, without handling by a human operator of any components within the enclosure 110 during processing.

Figure 28:
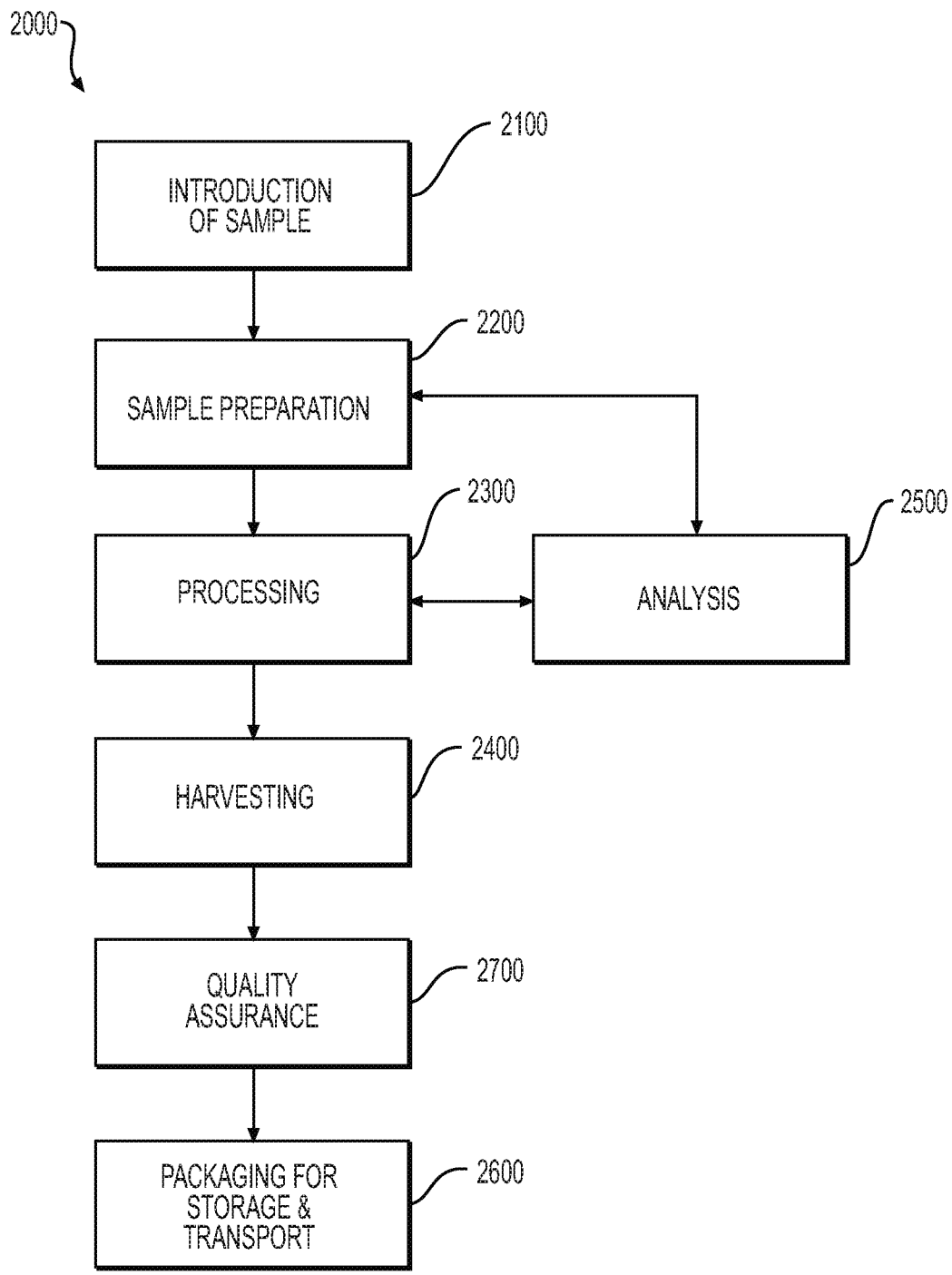
FIG. 28 is a schematic illustration of the automated method 2000 for cell processing.

With reference to FIG. 28 which shows a flow schematic of the automated method 2000 for cell processing, the automated method 2000 includes introduction 2100 of the sample into the enclosure 110, automatically preparing 2200 the sample after introduction 2100 of the sample, automatically processing (e.g., treating or expanding) 2300 the cells following sample preparation 2200, automatically harvesting 2400 cells after cell processing 2300 and automatically analyzing 2500 during cell processing 2300. The method 2000 may also include analysis 2500 of the sample during sample preparation 2200 and before cell processing 2300. The method 2000 may also include analysis 2500 of the sample during or after harvesting 2400. In addition, the automated method 2000 may include automatically packaging the cells for storage and/or transport 2600 after automatically harvesting 2400. Further, the automated method 2000 may include quality assurance (QA) 2700 analysis of the sample and/or review of all executed steps of the automated method 2000 for a batch to determine conformity with pre-determined acceptance criteria. The entire method 2000 from introduction of the sample 2100 to packaging 2600 is executed automatically without handling by a human operator.

In the illustrative example provided here, the ACPS 100 receives 2100 into the enclosure 110 a sample that is designated as a batch comprising cells of a first type, and after executing sample preparation 2200 and cell processing 2300 as described below, the ACPS 100 provides as an end product, the batch containing cells of a second type in a form ready for shipping and/or storage.

A "batch" as used herein refers to the material, whose derivation starts from a particular source, for example, from a particular cell or tissue sample obtained from a patient, a particular cell culture, a particular cell line, etc., that is processed by the ACPS 100 in a particular way to provide a particular end product. The size of a batch may increase during processing as, e.g., cells grow and multiply. For example, a batch may initially comprise one cell processing container 314 of cells derived from one cell or tissue sample obtained from a patient. When processing is complete, the same batch may comprise a plurality of cell processing containers 314 (for example, 2, 4, 8, 16, 20, 24, 32, etc.), all the cell processing containers 314 in the batch containing cells derived from the same initial cell processing container 314 and processed in the same way. Thus, roughly speaking a batch may refer to the cells from one patient, or the antibody from one cell line, etc., depending on the nature of the biological sample being processed. As used herein, a "biological sample" refers to the starting materials for processing. In some embodiments, a biological sample is a cell or tissue sample obtained from a patient. A biological sample is referred to as a "batch" when it has been introduced into the ACPS 100 for processing. Thus each batch is derived from one biological sample.

In some implementations, the ACPS 100 is provided 2100 with a batch including isolated cells of the first type. In some implementations, the ACPS 100 is provided 2100 with a batch including the cells of the first type, in an unisolated form, such as a biopsy taken from a patient. In the implementation where the ACPS 100 is provided with unisolated cells of the first type, an initial sample preparation step 2200 is performed (either within the isolator 120 by a human operator or automatically within the enclosure 110) for obtaining a batch containing the cells of the first type in an isolated form, suitable for processing 2300.

The method 2000 includes automatically processing 2300 a batch in the enclosure 110. As will be understood, automatically processing 2300 a batch could involve suspending cells in a cell culture medium in a cell processing container 314, adding one or more reagents to the batch at particular times and in particular amounts, refreshing the cell culture medium as needed, transferring the batch from a first processing station (for example, a media fill station 420) to a second processing station (for example, a heater 494) and as the cell line divides, passaging the cell culture from one cell processing container 314 into multiple cell processing containers 314 for continued processing of the batch.

The method 2000 includes automatically analyzing 2500 one or more characteristics of the batch (for example using one or more of the flow cytometer 470, the microscope and plate reader 472, and the like). The batch could be analyzed 2500 after completion of automatically processing 2300 and/or before or during the automatic processing 2300. In some implementations, the method 2000 includes using the results of analyzing one or more characteristics to predict a rate of progress of the processing, and thereby to determine a time for one or more subsequent steps of the processing, or a time for completion of the processing. In some implementations, the method 2000 includes using the results of analyzing one or more characteristics to determine one or more subsequent steps, for example, whether to incubate, passage, apply treatment, etc., to the batch.

The method 2000 also includes automatically harvesting 2400 the batch after processing 2300 is completed. Automatically harvesting 2400 the batch as used herein refers generally to preparing the batch for receipt outside the enclosure 110 or for packaging 2600 or for storage. Thus, in some implementations, the cells are resuspended in fresh media (optionally from one cell culture dish, or a portion of the cells in a cell culture dish, put aside and used for Quality Control (QC) analysis) and placed in a suitable container such as a cell culture dish, transport tray 340, cryovial (optionally including controlled rate cryofreezing of the sample), and the like. Once harvested 2400, the batches are moved out of the enclosure 110 either through the isolator 120 or through an access port other than the isolator access port 220.

The method 2000 also includes automatically packaging 2600 the batch for storage and/or transport. In some implementations, the batch is placed in containers 314 for transport (for example, transport trays 340) or in containers designed for storage, for example in cryovials 884. In some implementations, the batch may be frozen and the frozen cryopreserved cells may be transferred onto a frozen cryovial holder that is then quickly transferred to the isolator 120 where a human user can pick up the batch and place it into a cryofreezer for storage or in a container (e.g., a LN2 Dry Shipper) for shipment, e.g., to a clinical site, or perform any other step as required. In another implementation, the cryopreserved cells are transferred automatically into a storage cryofreezer, such as the freezer 162 for example. In another implementation, the fresh vialed cells are transferred automatically (for example, via one or more robotic modules of the packaging module 950, or by one of the robotic module 600, 700 in the enclosure 110) into a controlled rate cryofreezer for optimally cryofreezing the cells and then automatically transferred into a storage cryofreezer for optimal cryopreservation of the cells. In one implementation, these are connected to the automated packaging module 950 so that cryofrozen cells are automatically packaged into LN2 containers or dry shippers for transport and continuously maintaining the cells at an optimal temperature for optimal cryopreservation until reaching their final destination.

Automatic packaging 2600 is optional. Further, in some implementations harvesting 2400 and packaging 2600 are combined together into one step. For example, the batch may be harvested directly into a cryovial for freezing and storage. In other implementations harvesting 2400 and packaging 2600 are separate steps. For example, the batch may be harvested into transport tray 340 which is transferred to the packaging module 950 for packaging in a container for shipment.

Automatic quality assurance 2700 is also optional. In some implementations, quality assurance 2700 may be conducted before, during or after harvesting 2400 and/or packaging 2600. The entire method 2000 executed for a batch is reviewed, from introduction 2100 of sample into the enclosure 110 to packaging the cells for storage and/or transport 2600, to determine if pre-determined acceptance criteria are met. If all the acceptance criteria are met, the batch is released for shipment or storage. If not all the acceptance criteria are met, then the batch is flagged, not released for shipment and ultimately discarded in the solid waste receptacle 156 or another waste area from the packaging module 950. In some implementations, quality assurance 2700 can initiate analysis 2500 for sterility and/or contaminants (such as, endotoxin and/or mycoplasma) using microscope and plate reader 472 or other analytical instruments. It is contemplated that other tests desired by quality assurance may be conducted, and that analysis 2500 desired by quality assurance 2700 could be conducted at any stage of the method 2000 and as often as desired during the method 2000. In some implementations, quality assurance 2700 includes preparation of a report providing all details of the quality assurance 2700 results, a detailed listing of every step of the method 2000 and results of analysis 2500 executed for a batch, and the like. Such reports may be provided to a user in a variety of forms (e.g., printed, data file, etc.) and are not meant to be particularly limited. Further, different reports may be made for different batches depending on the type of processing 2300 required and the particular needs of the user. In some implementations, quality assurance 2700 verifies whether GMP conditions have been met.

While the batches are being processed 2300 in the enclosure 110, there is no handling of components within the enclosure 110 by a human operator. The method 2000 is entirely automated and executable without any human intervention. It is however contemplated that a human operator may monitor the process flow via a user interface 1200 connected to the control unit 1000. In some implementations, the ACPS 100 and the method allow an authorized human operator to modify or affect one or more of the processing steps via the control unit 1000. For example, based on one or more process parameters, a human operator may be able to prolong one or more processing steps, skip one or more processing steps, or temporarily suspend processing of the batch.

In some implementations, the entire method 2000, from introduction 2100 of sample into the enclosure 110 to packaging the cells for storage and/or transport 2600, is entirely automated and executable without any human intervention.

EXAMPLES

The present technology will be more readily understood by referring to the following examples, which are provided to illustrate the invention and are not to be construed as limiting the scope thereof in any manner.

Unless defined otherwise or the context clearly dictates otherwise, all technical and scientific terms used herein have the same meaning as commonly understood by one of ordinary skill in the art to which this invention belongs. It should be understood that any methods and materials similar or equivalent to those described herein can be used in the practice or testing of the invention.

Example A

I. Introduction of Sample.

Step 1. Transfer tray 322 transfers a biological sample (batch)(e.g., a cell, tissue, biological (such as a protein or antibody), or other sample), stored in a cell processing container 314 placed into a container holder (for example, tube holder 410, 452) from isolator 120 into the enclosure 110. The container holder 410 is transferred by the robotic module 700 from the transfer tray 322 to a pre-determined location on the deck 910 (or into storage area 300 until ready to be transferred on the deck 910)

The remaining description is using a cell or tissue sample (requiring two days between replacing of media with fresh media during incubation) as the batch and is for illustration purposes only. A person skilled in the art will understand how a biological, chemical or other sample can be processed by the system by reading the descriptions below and throughout the rest of this application.

II. Sample Preparation.

Step 2. Robotic decapper 830 opens the sample container and pipettor 814 uses first pipette tip to determine the volume of sample in the sample container.

If the sample is a tissue requiring enzymatic digestion, the pipettor 814 dispenses enzymatic solution with a second pipette tip into the sample container (e.g., cell processing container 314) containing the batch and the robotic module 700 transfers the sample container onto a heater shaker 494 for enzymatic digestion of the tissue sample into a liquid cell solution. Gripper 816 then transfers the sample container containing the enzymatically digested tissue batch to filtration station 492 where the batch is vacuum-filtered through one or more (e.g., several) desired filter pore diameters (e.g., 110 μm followed by 25 μm) to generate a liquefied sample containing starting cells of interest. The cells can be further separated by density gradient separation in centrifuge 150. Vacuum or positive pressure filtering may also be used to generate micronized tissue homogenates and cells/tissues/materials of a certain size (having size exclusions), and the like.

If the sample is a cell solution or other solution (or once the sample is in the form of a solution), the pipettor 814 uses the second pipette tip to collect the sample.

Step 3. Robotic pipettor 814 transfers batch from container 314 into first 50 ml centrifuge tube 346 using second pipette tip (in the case where the sample was in the form of a solution, and the second pipette tip was used to collect the sample). Robotic dispenser 818, or pipettor 814 with a third pipette tip, adds saline, PBS or media into the first 50 ml centrifuge tube 346 containing the batch to dilute the batch.

Step 4. Robotic module 600 transfers the first 50 ml centrifuge tube 346 containing the batch into centrifuge 150. Centrifuge 150 is controlled by control unit 1000 to centrifuge at 800×g for 15 minutes. Robotic module 600 transfers first 50 ml centrifuge tube 346 from centrifuge 150 to tube holder on deck 910.

Step 5. Robotic pipettor 814 which can detect minute changes in liquid density uses fourth pipette tip to transfer desired liquid layer from first 50 ml centrifuge tube 346 on tube holder 410 into empty second 50 ml centrifuge tube 346.

Step 6. Robotic dispenser 818, or pipettor 814 with a fifth pipette tip, adds saline, PBS or media into second 50 ml centrifuge tube 346 containing the batch to dilute the batch.

Step 7. Robotic module 600 transfers the second 50 ml tube containing the batch into centrifuge 150. Centrifuge 150 is controlled by control unit 1000 to centrifuge second 50 ml tube at 200×g for 10 minutes. Robotic module 600 transfers second 50 ml tube from centrifuge 150 to tube holder 410 on deck 910.

Step 8. The robotic aspirator/gripper 812 aspirates the resulting supernatant from the second 50 ml tube into the liquid waste receptacle 158.

Step 9. Robotic dispenser 818, or pipettor 814 with a sixth pipette tip, resuspends the cell pellet by adding 30 ml of saline, PBS or media to the second 50 ml tube.

Step 10. Robotic module 600 transfers the second 50 ml tube containing the batch into centrifuge 150. Centrifuge 150 is controlled by control unit 1000 to centrifuge second 50 ml centrifuge tube 346 at 200×g for 5 minutes. Robotic module 600 transfers second 50 ml tubes from centrifuge 150 to tube holder 410 on deck 910.

Step 11. The robotic aspirator/gripper 812 again aspirates the resulting supernatant from the second 50 ml tubes into the liquid waste receptacle 158.

Step 12. Robotic dispenser 818, together with pipettor 814 resuspends the cell pellet in the desired cell culture media by using a seventh pipette tip to add the desired cell culture media to the second 50 ml tubes.

III. Processing (Cell Expansion in this Example).

Step 13. Robotic pipettor 814 dispenses the resuspended cell pellet onto one or more first cell processing container 314 (for example, a cell culture plate or dish) positioned on a cell processing container station of the deck 910.

Step 14. Robotic module 700 transfers the first cell processing container 314 from the cell processing container station to the incubator 152 to be incubated for 2 days at 37° C. temperature with e.g. 5% $CO_2$ and 5% $O_2$.

Step 15. Robotic module 700 transfers one of the first cell processing container 314 to the microscope and plate reader 472 to determine the cell number and/or confluency. If the desired cell number and confluency has not been reached, robotic module 700 transfers the first cell processing container 314 onto a tilt module 430 on the deck 910. If the cells are an adherent culture, the media is aspirated with the aspirator 812 (with a new sterile aspirator tip) and new media added to the cell processing container 314 either with the robotic dispenser 818, media fill station 420, or with pipettor 814 using media from a bottle 838, and the cell processing container 314 is then returned back to the incubator 152. If the cells are a non-adherent culture, the cell suspension is collected with pipettor 814 using a sterile tip and dispensed into a 50 ml tube that is centrifuged at 200×g for 5 minutes as above, followed by aspiration of the supernatant and resuspension of the pellet in fresh media as above, with the resulting cell solution transferred to the same or a new cell processing container 314 with pipettor 814 using a new sterile tip, and finally the cell processing container 314 is then returned back to the incubator 152. After further incubation for 1 day the cell processing container 314 is analyzed for cell number and/or confluency by the microscope and plate reader 472. If the sample has still not reached the desired cell number/confluency, the sample is returned into the incubator 152 for an additional day. If it has still not reached the desired cell number/confluency, the above steps of from changing the media onwards are repeated until the desired cell number/confluency is reached.

Step 16. Once the desired cell number and/or confluency has been reached, robotic module 700 transfers the first cell processing container 314 onto the tilt module 430. If the cells are an adherent culture, the additional steps are performed: the robotic aspirator/gripper 812 removes all or most of the media into the liquid waste receptacle 158 (which may be collected for downstream processing and purification of an antibody, biological or other protein of interest in the media), the robotic pipettor 814 uses a new sterile pipette tip to pipette a cell dissociation solution (e.g., trypsin) into the first cell processing container 314, and the robotic module 700 transfers the first cell processing container 314 onto the heater and shaker module 494 for shaking the first cell processing container 314 while warming to 37° C. to activate the cell dissociation solution, the robotic pipettor 814 pipettes the cell solution up and down to help dissociate the cell clumps into smaller cell clumps using a new sterile or non-cross contaminated pipette tip, and finally the robotic pipettor 814, robotic dispenser 818, or media fill station 420 adds media to the first cell processing container 314 to neutralize the cell dissociation solution.

Step 17. Robotic pipettor 814 removes the media+cells from the first cell processing container 314 using a sterile pipette tip and dispenses into a 50 ml tube (along with a small sample that is transferred to the microscope and plate reader 472 and/or flow cytometer 470 for cell count, viability, antibody staining and characterization analysis of the cells, etc.) that is centrifuged at 200×g for 5 minutes as above, followed by aspiration of the supernatant (which may be collected for downstream processing and purification of an antibody, biological or other protein of interest in the supernatant) or collection with pipettor 814 using a sterile tip for sterility, endotoxin and/or mycoplasma analysis by an appropriate assay in the system (which may be either inside enclosure 110 or an adjacent contained module to which the robotic module 700 can transfer the sample for analysis).

The cell pellet is then resuspended in fresh media (+supplements (if applicable)) from previously introduced vials decapped using Decapper 414 and using pipettor 814 with a new sterile pipette tip) as above, with the resulting cell solution transferred to two or more new second cell processing containers 314 with pipettor 814 using a new sterile pipette tip.

Step 18. Robotic module 700 transfers second cell processing container 314 into the incubator 152 for incubation for 2 days.

Steps 15 to 18 are repeated until the desired total number of cells for the batch has been obtained.

IV. Harvesting.

Step 19. Steps 15 to 17 are repeated. Robotic pipettor 814 resuspends the cell pellet either in media suitable for transporting cells and injects the cells into one or more transport tray 340 placed on tilt module 440, or in a cryopreservation solution and injects the cells into one or more cryovials 884 that are then capped by the Decapper 414 and transferred to the cryofreezer 460 for controlled rate freezing of the cells for cryopreservation.

V. Storage or Transport.

Step 20. Robotic module transfers transport tray 340 or cryovial 884 to the packaging module 950. Packaging module 950 boxes and labels transport tray 340 or cryovial 884 for transport. Packaging module 950 can optionally also store the transport tray 340 or cryovial 884.

VI. Quality Control and Quality Assurance.

Step 21. The cell sample from step 17 is analyzed in the microscope and plate reader 472 and/or flow cytometer 470 for pre-determined pass/fail criteria. The supernatant sample from step 17 is analyzed for pass/fail criteria on sterility, endotoxin and/or mycoplasma by the microscope and plate reader 472 or other analytical instrument (which may be inside or connected to enclosure 110, and is reachable by robotic arm 605, 705 or gripper 816). A separate Quality Assurance control module checks all the sample preparation, processing, harvesting, packaging (and storage, if applicable), and analysis steps (e.g., steps 1 to 20 in this example) and results for conformity to pre-determined acceptance criteria; if all the acceptance criteria are met the batch is released for shipment, if not all the acceptance criteria are met the batch is flagged and not released for shipment and ultimately discarded in the solid waste receptacle 156 or another waste area from the packaging module 950.

A. Material Flow

Cell and tissue samples (e.g., obtained from a patient) and all reagents and consumables, including plasticware (tubes, dishes, trays, etc.), are introduced into the ACPS 100 through the BSC 130. In the BSC 130 they are surface cleaned and sterilized, for example with ethanol or isopropanol.

Once the outside surfaces of all incoming materials have been cleaned and sterilized, the sliding gate of the access port 262 of the BSC 130 is closed. HEPA-filtered air is allowed to circulate through the BSC 130 to decrease the number of particulates in the air inside the BSC 130. After a certain period of time, the isolator connection port 260 of the BSC (and/or the BSC connection port 244 of the isolator 120) is opened and the material from the BSC 130 is transferred into the isolator 120. It should be noted that the access port 262 of the BSC 130 stays closed whenever the isolator connection port 260 is open and vice versa.

Once materials are placed inside the isolator 120, the outer protective pouch of sterilized materials is opened (if applicable). Materials are placed on pre-designated trays which are placed on the transfer trays 322 to be passed through the enclosure access port 240 and isolator access port 220 of the enclosure 110 into the enclosure 110. Some materials could be placed on a transfer tray 322 directly without being placed on predesignated trays. Inside the enclosure 110, the robotic arm 705 of the robotic module 700 picks up and sorts all the materials on the trays 322. The enclosure 110 provides an enclosed, sterile/aseptic environment in which all cell processing steps are performed robotically or automatically, without human or hands-on intervention. In some cases, materials received in very large containers are poured into smaller sterile containers that are then placed on the pre-designated trays and/or transfer trays 322. The screw caps of some containers may need to be loosened a little, while the caps of other containers may be removed completely, before being placed on the pre-designated trays. Cell culture media and other high volume materials (such as phosphate buffered saline (PBS)) that are introduced into the isolator 120 in large media bags are typically placed in the +4° C. refrigerator and clipped onto designated media lines for being pumped and heated as needed by media-fill stations 420 in the enclosure 110. In some cases, media bags are clipped onto designated media lines in the isolator 120, and then moved into +4° C. refrigerator adjacent to the isolator 120 for storage; media can then be filled in the media fill station 420 directly from the media bags in the refrigerator via the media lines (i.e., tubes).

Once in the enclosure 110, the pre-designated trays are stored either: (i) in racks 332 inside the enclosure 110 at ambient enclosure air (this will predominantly consist of plasticware such as plates, pipette tips, and tubes); (ii) at +4° C. (this predominantly consists of various reagents and media in smaller volumes); or (iii) at −20° C. in the freezer 154 (this predominantly consists of various reagents such as media supplements and antibodies for analysis).

It is noted that in some implementations, finished products in enclosed containers (e.g., a batch of cells for which processing is complete) are removed from the enclosure 110 in the reverse order in which they were introduced, e.g., in the reverse order from what is described above for entry into the enclosure 110. In other implementations, finished products (i.e., finished batches) in enclosed containers leave the enclosure 110 from an access port other than the isolator connection port 220 described above. For example, rather than exiting through the isolator 120 and the BSC 130, finished products may exit into a freezer (such as the freezer 180 of FIG. 17) or through another accessport at a separate location.

During cell processing, liquid waste is generally removed by a liquid aspiration system (robotic aspirator/gripper 812) that uses sterile disposable tips 870. In addition, the inside passages of the tube 868 and liquid waste lines can be sterilized with ethanol and bleached by the robotic processing systems inside the enclosure 110. Solid waste is placed into the negative pressure waste receptacle 156 (pressure is negative relative to the enclosure 110). The negative pressure solid waste receptacle 156 continuously pushes air through a HEPA filter into the room (or into the building's HVAC return duct), thus preventing particles from migrating from the solid waste receptacle 156 back into the enclosure 110. Both the solid and liquid waste receptacles can be removed and replaced directly by persons in the room in which the system is located. A safety mechanism ensures that a solid or liquid waste container cannot be removed unless the opening between the waste container and the enclosure 110 is sealed, in order to prevent any entry of air or particles from the room into the Enclosure 110 during waste removal.

In some implementations, the enclosure 110 has a Class 10 or higher environment, and is at positive pressure relative to the Isolator 120 and/or the solid waste receptacle 156. The isolator 120 is at positive pressure relative to the BSC 130. The BSC 130 and the solid waste receptacle 156 are at positive pressure relative to the room. The liquid waste receptacle 158 is under vacuum and segregated by liquid line tubes, and is under negative pressure relative to the enclosure 110 and the room. The incubator 152 is sealed from the enclosure 110 and at slight negative pressure relative to the enclosure 110 when open. Further, in some implementations the incubator 152 may be constructed in a way that prevents contamination (e.g., with a full copper alloy chamber to inhibit microbial growth, with HEPA filters, with a sterile water vapour generator instead of a water pan placed inside, and the like).

In some implementations, the enclosure 110 and isolator 120 may be further sterilized by hydrogen peroxide (H2O2) vapor using the sterilization unit 550, while the cells are protected inside the incubator 152. The incubator 152 can also be sterilized, for example using ClO2 gas, while the cells are in a secondary incubator or in the enclosure 110.

The step-wise movement of materials into and out of the ACPS 100 in combination with the built-in interlock systems for preventing operator error, is designed to prevent contamination from the outside environment or on the surface of materials and items introduced into the ACPS 100. All introduced items introduced into the ACPS 100 are either inside of a sterile container such as a bag, or the outside surfaces are aseptically wiped down and cleaned before introduction into the ACPS 100. The items then go through an air environment cleaning cycle in the BSC 130, after which items are transferred from the BSC 130 into the isolator 120. In the isolator 120, the sterile/aseptic items are loaded onto sterile custom containers that are then transferred into the enclosure 110. Inside the enclosure 110, all items are handled robotically.

B. Robotic Manufacturing Process Flow.

After entry into the enclosure 110, the batch (i.e., the liquid cell or tissue sample introduced into the enclosure 110) is transferred into 50 ml centrifuge tubes 346 that have a separation membrane and are pre-loaded with a density gradient medium (e.g., histopaque at density 1.077 g/ml, available commercially as Lymphoprep™ Tube, Axis-shield cat. #1019817 or 1019818, also provided by STEMCELL Technologies Inc., Vancouver, Canada) for density gradient separation of the starting cells of interest. As an example, if Lymphoprep™ Tube is used, the batch is diluted 1:1 in saline or PBS and 30 ml of the diluted batch is pipetted into the Lymphoprep™ Tube, and then centrifuged in the centrifuge 150 at 800×g for 15 mins.

It is noted that the robotic pipettors 814 can detect the volume of liquid in the original batch (i.e., the liquid cell or tissue sample introduced into the enclosure 110), allowing determination of the appropriate volume of saline, PBS or other desired solution with which to mix the batch, using a built-in algorithm, as well as splitting the total volume after mixing into the required number of Lymphoprep™ Tubes. Mix volumes and the number of required tubes are generally determined using the following equation: TOTAL VOLUME/30 ML rounded up to the next whole NUMBER; this number is then used to calculate the volume for each tube by the equation: TOTAL VOLUME/NUMBER.

In some implementations, a batch introduced into the ACPS 100 that comprises a tissue sample may be enzymatically digested first, and then vacuum-filtered through one or more (e.g., several) desired filter pore diameters (e.g., 110 µm followed by 25 µm) to generate a liquefied sample containing starting cells of interest for density gradient separation. Vacuum filtering may also be used to generate micronized tissue homogenates, cells/tissues/materials of certain size (having size exclusions), and the like.

After density gradient centrifugation, the desired liquid layer is transferred into an empty 50 ml centrifuge tube 346, either by the robotic pipettor 814 which can detect minute changes in liquid density or by transferring the entire liquid on top of the Lymphoprep™ Tube membrane. The liquid layer is then diluted 1:1 in saline or PBS and centrifuged at 200×g for 10 mins. The resulting supernatant is aspirated into the liquid waste receptacle 158, and the cell pellet is resuspended in 30 ml of saline or PBS and then centrifuged at 200×g for 5 mins. Again the resulting supernatant is aspirated into the liquid waste receptacle 158, and the cell pellet is resuspended in the desired cell culture media and plated onto one or more a cell processing container 314 (such as, e.g., cell culture plate or dish). The cell processing containers 314 are then placed into the incubator.

In the final resuspended cell pellet, the total number of live cells as well as the number of desired cells in the batch can be estimated using either the microscope 472 or the flow cytometer 470, allowing the use of an algorithm to determine appropriate dilution of the resuspended cell pellet and the number of cell culture dishes on which the resuspended cell pellet(s) should be plated.

It is noted that the desired cell culture media may be either pumped from the media fill station onto the cell culture dishes (or pipetted from one), or pipetted from a media bottle that is pre-warmed to a desired temperature (e.g., 37° C.) by the on-board media heaters. The media can also be supplemented by desired cytokines and other supplements that are stored on board and pipetted at the required concentration into the media bottle or media troughs, or directly onto the cell processing container 314.

Cell culture media may be partially or fully replaced at set time points. This typically consists of moving (by the robotic module 600) a cell processing container 314, e.g., plate, from the incubator 152 onto the deck 910, preferably onto a tilt module 440, removing the lid, and aspirating the old media into liquid waste receptacle 158 using the robotic aspirator 872 and/or robotic pipettor 814. The cell processing container 314 is then moved onto the media fill station 420 and filled with the desired amount of fresh media. Any required supplements are added by the robotic pipettors 814. The lid is then placed back on the cell processing container 314 and the cell processing container 314 is moved back into the incubator 152.

Cells can be purified or selected using standard techniques known in the art. For example, cells may be purified or selecting using magnetic cell selection or a cell sorter, e.g., with antibodies that either target the desired cells or the non-desired cells. As an example of magnetic cell separation, an antibody with an attached iron or similar core is added to floating cells that are placed in a cell processing container 314 (for example, tube or flask or in a cell culture tray 344, 344'), after which the cell processing container 314 (which may be, e.g., a tube, flask, or plate) is placed on a magnetic tilt module 430 provided with an adequately strong magnet 434 that pulls all the cells to the bottom of the cell processing container 314 (e.g., to the bottom of a plate, and/or the sides of a tube or flask, etc.). For example, an antibody with an attached iron core that recognizes a neural marker such as Sox2 or Nestin can be used to select for neural stem cells after trypsinization of all adherent cells. The media with the remaining cells is then aspirated to the liquid waste receptacle 158 from the cell processing container 314 such that the desired cells remain in cell processing container 314. The cell processing container 314 is then removed from the magnet. The cells are resuspended in fresh media and plated and grown in a cell processing container 314. Alternatively, the procedure may be used for cell depletion in a mixed cell population whereby an antibody is used for recognizing cells that are desired to be removed, and instead of aspirating the media with the cells into the waste, the media with the cells is collected and plated directly into a cell processing container 314. In some implementations, the magnet may be placed on a tilt module 440 that allows better removal of the media with non-magnetically attached cells.

Cells can be transformed or reprogrammed with, e.g., a DNA plasmid, an RNA, a protein, a small molecule, or another reprogramming agent. In the example of a DNA plasmid, the DNA plasmid may be mixed with a lipid cocktail (e.g., Lipofectamine LTX & Plus reagent, Invitrogen) or a magnetic transfection kit (e.g., a Magnetofection kit such as LipoMag, Oz Biosciences), and then added to the cells (optionally in media, or the media may be added afterwards). The media with the DNA-lipid complex (with or without the magnetic iron or other particles) is then removed and replaced with fresh media after the desired number of hours, and then placed back into the incubator.

In some cases, supplements are frozen and/or stored at −20° C. in the freezer 154. In this case they may be moved out of the freezer 154, thawed inside the enclosure 100, and then uncapped for access by the pipette tips before the cell culture media replacement process starts.

In some implementations, an on-board particle counter 190 ensures that the air environment is adequately clean, or essentially sterile/aseptic before any processing step is performed on a batch of cells (e.g., on a cell culture dish). This monitoring of the air environment by the particle counter 190, and coordination of cell processing and air monitoring, serves to prevent contamination, especially cross-contamination between batches. Furthermore, all components that come into contact with cells or media are designed to be kept sterile. This is achieved partly by use of sterile disposable parts that are replaced between processing of each batch; the remaining parts either do not come into contact with a batch or are sterilized each time before coming into contact with each batch. These procedures also serve to prevent contamination, especially cross-contamination between batches, and to maintain aseptic processing conditions at all times.

In some implementations, a cell culture dish of adherent cells may be observed by a robotic microscope before media replacement to determine the % confluency and morphology and health of the cells (e.g., as an in-process control). If the % confluency is above a certain value, e.g., above about 80%, then the Passaging protocol will be initiated instead (described in further detail below).

For floating cultures, the on-board flow cytometer 470 may be used to determine the cell number, viability and even the identity of the cells using fluorescent staining (as an in-process control). If the cell number per dish is above a certain value, e.g., above about 10 million cells, then the Passaging protocol will be initiated (described in further detail below).

When the on-board microscope 472 determines that the adherent cells are above a certain % confluency, e.g., above about 80% confluency, or the flow cytometer determines that the floating cells are above a certain number, e.g., above about 10 million cells, then the Passaging protocol will be initiated. Passaging generally involves dividing the cells in the cell culture dish into two or more cell culture dishes.

For floating (i.e., non-adherent) cultures, passaging may involve simply removing a portion (e.g., half) of the media containing the cells in the cell processing container 314 with a pipette 814 and then pipetting the removed media+cells into a fresh cell processing container 314. For example, ¾ of the media+cells may be removed, and each ¼ may then be pipetted into a fresh cell processing container 314, with each cell processing container 314 then being filled with an adequate amount of fresh media (including any required supplements, which may be added in the media, or added separately). A more complex protocol may be used in the case of cell clumps, involving tilting the cell processing container 314 and removing all the media with cells by pipette, transferring media+cells to a 50 ml centrifuge tube 346, centrifuging to pellet the cells (e.g., at 200×g), removing the supernatant with the aspiration tool into waste, resuspending the cell pellet in a cell dissociation solution (e.g., trypsin, Accutase®, or other cell detachment solution) with optionally warming the tube and either shaking or spinning the tube or pipetting the cell solution up and down to help dissociate the cell clumps into smaller cell clumps or individual cells, then neutralizing with media, and either plating this into two or more cell culture dishes or centrifuging one more time, removing the supernatant with the aspiration tool into waste, resuspending the cell pellet in media, and then plating the cells into two or more cell culture dishes. Any additional media and supplements can then be added additionally into each cell processing container 314 (if applicable) before moving the cell processing containers 314 into the incubator 152.

For adherent cultures, the cell processing container 314 is placed onto the tilt module 440, all or most of the media is removed with the aspiration tool into waste, a cell dissociation solution (e.g., trypsin, Accutase®, etc.) is pipetted into the cell processing container 314 which is then placed onto the shaker with optionally warming the cell processing container 314 and or pipetting the cell solution up and down to help dissociate the cell clumps into smaller cell clumps or individual cells, then neutralizing with media, and either plating this into two or more cell processing container 314 or pipetting into a 50 ml tube and centrifuging, removing the supernatant with the aspiration tool into waste, resuspending the cell pellet in media, and then plating the cells into two or more cell processing container 314. Any additional media and supplements can then be added additionally into each cell processing container 314 (if applicable) before moving the cell processing containers 314 into the incubator 152.

When the desired total number of cells has been obtained for a batch, the cells for that batch are Harvested. Harvesting involves either moving all the cell processing containers 314 (optionally except for one, which is used for Quality Control (QC) analysis) for a batch out of the system to a human recipient or to another robot (either before or after the Passaging protocol above), or initiation of the Passaging protocol above up to the step just before the cells are resuspended in fresh media (again, optionally with one cell processing container 314, or a portion of the cells in a cell processing container 314, put aside and used for Quality Control (QC) analysis). In the latter case, the Passaging protocol is either (i) continued to the step just before plating the cells into the cell processing containers 314 (either using the same or a different media, supplements and/or concentrations), with the cells then injected into transport trays 340 (e.g., Petaka cell culture cassettes) or another transportable cell culture system; or (ii) the cell pellet is resuspended in a cryopreservation solution, pipetted into cryovials 884 and placed onto a temperature controlled cryofreezer 460 (such as a Grant EF600M Controlled Rate Freezer), optionally with no caps to allow nucleation to be performed with a small sterile pipette tip from the −20° C. freezer; cryovials 884 are then capped at the end of the freezing process, and the frozen cryopreserved cells are transferred into a cryofreezer 460. Alternatively, the frozen cryopreserved cells may be transferred onto a frozen cryovial holder that is then quickly transferred to the isolator 120 where a human user can pick up the batch and place it into a cryofreezer (for example cryofreezer 162) for storage or in a container (e.g., a LN2 Dry Shipper) for shipment, e.g., to a clinical site, or perform any other step as required.

C. Robotic Quality Control Process Flow.

Various analytical assays can be performed on the cells, cell cultures, conditioned media and reagents using the on-board microscope 472, flow cytometer 470 and/or plate reader 472. Non-limiting examples of such analytical assays are described here:

Cell confluency. Cell confluency can be analyzed by the on-board microscope to trigger cell passaging when the cells are at the desired confluence, e.g., above about 80% confluency. Correct cell morphology can also be analyzed by the on-board microscope as an in-process and/or end-process quality control (QC) read-out.

Cell number and viability. Cell number and viability as well as live cell markers can be rapidly analyzed by the on-board flow cytometer, which can be used at each passage for in-process QC (i.e., after trypsinization) and/or as an end-process QC read-out. Cell counts and cell confluency can be used by the on-board software to calculate the growth curves of the cells that can predict the time of the next passaging and when the desired number of cells (in total) will be ready at the end of the process.

Cell diameter, density, and marker expression. The flow cytometer can analyze cell diameter and cell density along with specific cell marker expression. For example, fluorescent live stains or antibodies can be used to identify the desired cells and to determine the purity of the batch (e.g., by determining what percentage of the cells and/or particles are the desired cells). These assays can be performed as an in-process and/or an end-process QC read-out.

Cell potency and identity. A sample of the cells in a batch can be placed in other media and/or other conditions to determine their behavior, either as a potency or identity assay using the on-board microscope and software algorithms. For example, neural stem cells can be placed in differentiation media and differentiated into neurons, astrocytes and oligodendrocytes, and the lengths of the axons of the resulting neurons can be measured.

Safety. Assays to determine safety, such as a tumor-colony formation assay, can be performed and analyzed using the on-board microscope and software algorithms.

Other assays. Endotoxin, mycoplasma and sterility in-process and end-process QC read-out assays can be performed using the plate reader, along with numerous other assays such as, e.g., assays for protein quantification and for telomerase activity.

Karyotype analysis can be performed using the on-board microscope 472 with a spectral camera and a software algorithm.

Gene integration and short tandem repeat (STR) analysis can be performed using an on-board PCR machine (not shown) and the plate reader 472.

D. Robotic Reagents Process Flow.

All reagents enter the enclosure 110 through the BSC 130 and the isolator 120 as described above. In some implementations, reagents are robotically introduced into the enclosure 110 from the isolator 120. Reagents are aliquoted into smaller volumes and placed into vials inside the enclosure 110. Generally an aliquot corresponds to the amount of reagent required for a certain time period, for a certain assay, or for a single use. For example, reagents may be aliquoted into smaller volumes required per day, per assay, and the like. Aliquoted reagents are stored as appropriate, for example they may be placed in the freezer 154 at −20° C. or a −86° C. on-board freezer, in a +4° C. on-board refrigerator or other cooling location, or may be stored at room temperature, as needed.

In some implementations, reagents are introduced into the enclosure 110 in the containers received from the manufacturer, and robotically opened and aliquoted, without ever being opened by a human operator.

Reagents can be filter sterilized by the on-board 0.22 µm sterile filtration system 492 prior to being aliquoted or prior to being added to cells or media.

It is noted that fluorescent antibodies and stains, and any other light sensitive materials, are handled while the lights are turned off inside the enclosure 110.

When frozen aliquots are to be used, they are moved out of the freezer 154 and placed on the deck 910 at room temperature to thaw slowly, or placed on heaters for faster thawing and/or warming or placed on shaker-heaters for even faster thawing and/or warming, as desired. Once ready, the caps of the container storing the frozen aliquots are removed by the decapper (generally using the robotic aspirator/gripper 812 for 0.5-4 ml vials, and using the decappers 830 for 50 ml tubes, 100 ml or 125 ml flasks and the like), and the desired volume is then retrieved using the robotic pipettor 814.

As mentioned above, many reagents are directly filled from reagent supply containers stored within the enclosure 110 into cell processing containers 314 within the enclosure 110 using the robotic pipettor 814. Direct aliquoting and long term storage of reagents within the enclosure 110 obviates the need for continuous introduction of reagent containers into the enclosure 110 and the ability to quality control and store a large batch of a reagent thus reducing quality control time and cost over e.g., a two-year period for reagents.

Also, many solutions are directly filled from solution supply containers stored outside the enclosure 110 into cell processing containers 314 within the enclosure 110 using a media fill line connected to media fill stations 420 and the robotic pipettor reagent dispenser 818. Direct filling of solutions obviates the need for storage of additional solution containers within the enclosure 110 and the need for their periodic refilling.

Robotic handling of reagents as described above aids in reducing the risk of contamination and cross contamination between batches.

Reagents and chemicals can be processed at the same time as cells as long as the reagents and chemicals will not come in contact with other cells. In other to avoid cross-contamination between batches, the ACPS 100 is designed to allow cell processing of only one batch at a time, e.g., only cell processing containers 314 for one batch can be open at any given time. Similarly, reagents and chemicals are processed at the same time as a batch of cells only if the reagents and chemicals will not come in contact with other batches, otherwise reagents and chemicals must only be processed when no cell processing containers 314 are open or undergoing processing, to avoid cross-contamination.

E. Summary.

The methods and systems described above may have one or more of the advantages discussed here.

First, the methods and systems may prevent or avoid contamination, including contamination from infectious agents such as endotoxins, mycoplasma, microbes, viruses, etc. The system is designed to provide several layers of separation between the essentially sterile/aseptic enclosure 110 and the exterior, provided by the isolator 120 and the BSC 130. Consumables such as reagents, media, plasticware and the like can thus be resupplied to the enclosure 110 via the isolator 120 and the BSC 130 without disturbing the sterility of the enclosure 110. Air flows in the ACPS 100 are designed to push particles and contaminants out and away from processing stations. Continuous monitoring by on-board particle counters 190 and automatic pausing of processing should a predetermined level be reached also ensures that processing steps are only performed under essentially sterile/aseptic conditions. In some implementations, end-to-end processing is capable of being performed without hands-on human intervention inside the enclosure 110. In some implementations, the design ensures sterility to such an extent that the ACPS 100 need not be operated inside a cleanroom.

Next, the methods and systems are designed to prevent cross-contamination between batches. Batches are processed sequentially, under conditions where no more than one batch is "open" or undergoing processing at the same time (i.e., only cell processing containers 314 from one batch at a time are opened to the environment). Further, either disposable sterile equipment (such as pipette tips) is used or equipment is sterilized between processing of each batch. Particle counters 190 may continuously monitor particle number within the enclosure 110, and if at any time the particle number rises above the acceptable threshold, then processing is paused until the number of particles returns to an acceptable level. Waste receptacles 156, 158 may be placed away from cell processing stations (i.e., stations where cell processing containers 314 are opened to the environment) and may be configured so as to prevent any splash-back or other contamination from the waste back into the cell processing containers 314, the reagents, or any part of the enclosure 110. In these ways, the design of the system may prevent or avoid cross-contamination between batches. This design also allows the ACPS 100 to manage a plurality of batches within the ACPS 100 at the same time through sequential processing and without cross-contamination between batches. In some implementations, the ACPS 100 is designed to have the capability of processing a plurality of batches within the ACPS 100 at the same time under GMP conditions, i.e., under conditions such that GMP guidelines and regulations are met.

Further, in some implementations, the ACPS 100 is capable of providing end-to-end processing in an essentially sterile/aseptic enclosure without hands-on human intervention. This may provide a high speed and/or efficiency of processing at an affordable cost.

In addition, in some implementations the ACPS 100 is capable of providing quality control (QC) and quality assurance (QA) data and information required for GMP guidelines and regulations. In some implementations, quality assurance (QA) of the end product and/or end product release is performed without requiring a human operator. In some implementations, the product is stored after completion of QC and QA without requiring a human operator.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The contents of all documents and references cited herein are hereby incorporated by reference in their entirety.

What is claimed is:

1. An automated method for processing a plurality of batches of cells in a closed and sterile enclosure, the plurality of batches of cells each being derived from a biological sample introduced into the enclosure, the plurality of batches of cells each comprising one or more cell processing container, the automated method comprising:
controlling an air pressure inside the enclosure to be greater than an air pressure outside the enclosure during processing of the plurality of batches of cells;
receiving a plurality of biological samples and/or reagents into an isolator through a first access port of the isolator, wherein the isolator is selectively fluidly connected to the enclosure via an enclosure access port on the enclosure and a second isolator access port on the isolator;
controlling at least one of
a first gate that reversibly covers an opening between the enclosure access port on the enclosure and the second isolator access port on the isolator, and
a second gate that reversibly covers the first access port of the isolator, so that the enclosure is sealed at all times from the outside when the biological samples or reagents are transferred from the outside to inside the enclosure;
transferring the plurality of biological samples and/or reagents from the isolator to the enclosure through the opening between the enclosure access port and the second isolator access port;
automatically processing the plurality of batches of cells with one or more reagents;
controlling with a control unit (CU), opening of at least one auxiliary gate between the enclosure and a sterile incubator, centrifuge, refrigerator and/or freezer, wherein the enclosure is selectively fluidly connected to the incubator, centrifuge, refrigerator and/or freezer, wherein the incubator, centrifuge, refrigerator and/or freezer are outside of the enclosure but accessible from inside the enclosure through the at least one auxiliary gate;
automatically transferring the plurality of batches of cells from the enclosure to the sterile incubator or centrifuge, or the plurality of reagents from the enclosure to the refrigerator or freezer, through the at least one auxiliary gate and closing of the at least one auxiliary gate;
incubating the plurality of batches of cells in the incubator, centrifuging one or more of the plurality of batches of cells in the centrifuge, and/or storing one or more of the reagents in the refrigerator or freezer;
controlling with the CU, opening of the at least one auxiliary gate and automatically transferring the plurality of batches of cells from the incubator or centrifuge to the enclosure, and/or opening of the at least one auxiliary gate and automatically transferring the plurality of reagents from the refrigerator or freezer to the enclosure;
automatically analyzing at least one characteristic of the plurality of batches of cells, wherein the automatically analyzing at least one characteristic of the plurality of batches of cells comprises analyzing at least one of: a cell confluency, a cell number, a cell viability, a cell density, a cell diameter, a marker expression, a morphological characteristic, a cell differentiation characteristic, a cell potency, a cell purity, a cell sterility, and a cell identity;
electronically tracking the plurality of batches of cells and/or reagents after their introduction to the enclosure, and
disposing of waste to a waste receptacle, wherein the waste receptacle is connected to the enclosure in a configuration that prevents particles in the waste receptacle from entering the enclosure, wherein an air pressure in the waste receptacle is lower than an air pressure inside the enclosure;
wherein the CU is configured to ensure that only one gate that fluidly connects the enclosure to the outside can be opened at a time;
wherein the automated method is capable of processing the plurality of batches of cells within the enclosure at the same time, without cross contamination between batches of cells, wherein the plurality of cell processing containers are not left uncovered during said automated processing except during addition or removal of materials and wherein only cell processing containers from one batch of cells at a time are opened to the environment, such that only one batch of cells is exposed to the environment inside the enclosure at any one time, such that cross-contamination between the plurality of batches of cells is prevented.

2. The method of claim 1, wherein the plurality of batches of cells are processed in compliance with good manufacturing practice (GMP) guidelines.

3. The method of claim 1, wherein the automated method is executable without any handling by a human operator.

4. The method of claim 1, further comprising measuring a particle count inside the enclosure.

5. The method of claim 1, wherein:
a first batch of cells includes a first type of cells, and the processing of the first batch of cells transforms the first type of cells into cells that are differentiated from the first type of cells; and
a second batch of cells includes a second type of cells, and the processing of the second batch of cells transforms the second type of cells into cells that are differentiated from the second type of cells.

6. The method of claim 5, wherein the cells differentiated from the first type of cells are different from the cells differentiated from the second type of cells.

7. The method of claim 5, wherein cells differentiated from the first type of cells are the same as the cells differentiated from the second type of cells.

8. The method of claim 4, wherein:
a second batch of cells is introduced into the enclosure responsive to the particle count satisfying a predetermined criterion, or
the first batch of cells and the second batch of cells are automatically processed based on the particle count satisfying a predetermined criterion.

9. The method of claim 1, further comprising:
automatically sterilizing the enclosure between introducing the first and second batches of cells into the enclosure.

10. The method of claim 1, further comprising:
automatically disposing waste material in a waste receptacle selectively fluidly connected to the enclosure at a location remote from a majority of processing stations in the enclosure.

11. The method of claim 1, wherein automatically processing the plurality batches of cells with one or more reagents comprises:
automatically performing a passaging protocol for placing the cells from a first cell processing container to a plurality of second cell processing containers.

12. The method of claim 1, further comprising controlling an environment in the enclosure to maintain the enclosure as at least a class 10 environment.

13. The method of claim 1 further comprising:
introducing the biological sample into the enclosure;
automatically preparing the plurality of batches of cells from the biological sample after introduction of the biological sample and before processing of the plurality of batches of cells.

14. The method of claim 1, further comprising:
automatically sterilizing the enclosure, without removing the plurality of batches of cells from the enclosure.

15. The method of claim 1, further comprising:
automatically conducting quality assurance analysis, wherein the quality assurance analysis comprises:
automatically reviewing the steps executed for the plurality of batches of cells and determining if pre-determined criteria were met during the processing of the plurality of batches of cells, and/or
automatically producing a quality assurance report.

16. The method of claim 15, wherein the pre-determined criteria are GMP regulations.

17. The method of claim 1, comprising a step of direct filling a liquid from a supply container disposed inside or outside the enclosure into the plurality of cell processing containers disposed inside the enclosure.

18. The method of claim 1, wherein after automatically processing the plurality of batches of cells, the method further comprises automatically harvesting the plurality of batches of cells for reception outside the enclosure, wherein the automatically harvesting comprises preparing the plurality of batches of cells for receipt outside the enclosure or for packaging or for storage, or placing the plurality of batches of cells in a transport container.

19. The method of claim 17, wherein the liquid is media.

20. The method of claim 17, wherein more than 5 mL of liquid is dispensed at a time.

* * * * *